United States Patent [19]

Hirosaki

[11] 4,300,229

[45] Nov. 10, 1981

[54] TRANSMITTER AND RECEIVER FOR AN OTHOGONALLY MULTIPLEXED QAM SIGNAL OF A SAMPLING RATE N TIMES THAT OF PAM SIGNALS, COMPRISING AN N/2-POINT OFFSET FOURIER TRANSFORM PROCESSOR

[75] Inventor: Botaro Hirosaki, Tokyo, Japan

[73] Assignee: Nippon Electric Co., Ltd., Tokyo, Japan

[21] Appl. No.: 121,943

[22] Filed: Feb. 15, 1980

[30] Foreign Application Priority Data

| | | | |
|---|---|---|---|
| Feb. 21, 1979 | [JP] | Japan | 54/19364 |
| Feb. 21, 1979 | [JP] | Japan | 54/19365 |
| Feb. 21, 1979 | [JP] | Japan | 54/19366 |
| Dec. 27, 1979 | [JP] | Japan | 54/170724 |

[51] Int. Cl.³ ............... H04J 11/00; H04J 1/02
[52] U.S. Cl. ............... 370/20; 370/70
[58] Field of Search ............... 370/20, 70, 19, 23

[56] References Cited

U.S. PATENT DOCUMENTS 3,891,803  6/1975  Daguet et al. ............... 370/23

OTHER PUBLICATIONS

"Performance of an Efficient Parallel Data Transmission System" by Saltzberg, IEEE Trans. on Comm. Theory, vol. COM-15, No. 6, Dec. 1967, pp. 805-811.
"An Improved Method for Digital SSB-FDM Modulation and Demodulation" by Maruta et al., IEEE Trans. On Comm., vol. COM-26, No. 5, May 1978, pp. 720-725.
*Theory and Application of Digital Signal Processing* by Rabiner et al., 1975, pp. 552-555, and 596-621.
*Digital Signal Processing* by Peled et al., 1976, pp. 145, 153, 155 and 156.

*Primary Examiner*—Douglas W. Olms
*Attorney, Agent, or Firm*—Sughrue, Mion, Zinn, Macpeak and Seas

[57] ABSTRACT

In a transmitter for digitally converting PAM signals, 2L in number, of a common slow sampling rate of 1/T hertzes to an orthogonally multiplexed QAM signal of a fast sampling rate of N/T hertzes, N/2-point input data into which the PAM signals are pre-processed with addition thereto of dummy signals, only (N/2-L) in number, are supplied to at least one N/2-point ODFT (offset discrete Fourier transform) processor (61), a pair of which (61, 62) must have been an N-point ODFT processor accompanied by switches controlled at a T/2-second period. After caused to pass through respective filter units of a bank (71), N/2-point output data are time-division multiplexed into the QAM signal. The filter units may either be complex band-pass or real low-pass filter units. A receiver comprises similar parts and carries out entirely reversed operation.

17 Claims, 27 Drawing Figures

FIG. 1
PRIOR ART

COMPLEX BAND-PASS FILTER BANK

TRANSMITTER AND RECEIVER FOR AN OTHOGONALLY MULTIPLEXED QAM SIGNAL OF A SAMPLING RATE N TIMES THAT OF PAM SIGNALS, COMPRISING AN N/2-POINT OFFSET FOURIER TRANSFORM PROCESSOR

BACKGROUND OF THE INVENTION

This invention relates to a transmitter for digitally processing a plurality of baseband PAM (pulse amplitude modulated) signals having a common baud or sampling rate and synchronized with one another into an orthogonally multiplexed QAM (quadrature amplitude modulated) signal and a receiver for digitally processing an orthogonally multiplexed QAM signal generated from a plurality of baseband PAM signals having a common sampling rate and synchronized with one another into replicas of the last-mentioned PAM signals. As the case may be, a transmitter and/or a receiver will be referred to as a converter in the following.

It is already known that the baseband PAM signals of the type specified above, when equal in number to an even number, are conveniently dealt with as baseband complex PAM signals, reduced to a half in number. An analog-processing type orthogonally multiplexed QAM signals transmission or communication system for such baseband complex PAM signals is effective in raising the efficiency of information transmission and is already described, for example, in an article that Burton R. Saltzberg contributed to IEEE Transactions on Communication Technology, Vol. COM-15, No. 6 (December 1967), pages 805–811, under the title of "Performance of an Efficient Parallel Data Transmission System."

Due to recent developments in digital integrated-circuit techniques and digital signal processing technology, a TDM-FDM (time-division multiplex-frequency-division multiplex) transmultiplexer for carrying out conversion between SSB (single-side-band) signals and an FDM signal in an FDM terminal station and like digital transmission systems have become known as digital-processing type FDM transmission systems. If desired, reference should be had to article contributed by Rikio Maruta and Atsushi Tomozawa to IEEE Transactions on Communications, Vol. COM-26, No. 5 (May 1978), pages 720–725, under the title of "An Improved Method for Digital SSB-FDM Modulation."

It has, however, been difficult to realize a digitally processing orthogonally multiplexed QAM signal transmission system for the baseband complex PAM signals because it is inconvenient to apply the techniques developed for a TDM-FDM transmultiplexer that inherently deals only with analog signals, such as voice signals. Furthermore, direct application of the digital signal processing to the orthogonally multiplexed QAM signal transmission system is defective, as will later be described with reference to a few of about two dozens of figures of the accompanying drawing, in that a considerable amount of digital calculation, such as digital multiplication, is necessary and in that the circuitry is accordingly complicated, particularly, because of the indispensable intricate control.

SUMMARY OF THE INVENTION

It is therefore a general object of the present invention to provide a transmitter for digitally processing a plurality of baseband PAM signals of the type specified hereinabove into an orthogonally multiplexed QAM signal and a receiver for digitally processing an orthogonally multiplexed QAM signal generated from a plurality of baseband PAM signals of the above-specified type into replicas of the last-mentioned PAM signals.

It is a specific object of this invention to provide a transmitter and a receiver of the type described, which are operable with a least possible amount of digital calculation and with accordingly simplified circuitry.

It is another specific object of this invention to provide a transmitter and a receiver of the type described, for which intricate control is unnecessary.

According to this invention, there is provided a converter for digitally carrying out conversion between a plurality of baseband real PAM digital signal sequences, 2 L in number, having a slow sampling rate of 1/T hertzes and synchronized with one another and an orthogonally multiplexed real QAM digital signal sequence of a fast sampling rate of N/T hertzes, where N represents an even integer that is not less than 2 L, said converting being operable as a predetermined one of a transmitter for converting said real PAM digital signal sequences to said real QAM digital signal sequence and a receiver for converting said real QAM digital signal sequence to said real PAM digital signal sequences and comprising: first means for digitally carrying out conversion between said real PAM digital signal sequences and a plurality of first-type complex digital signal sequences of twice said slow sampling rate, equal in number to a predetermined one of N and N/2 and to N/2 when said converter is operable as said transmitter and said receiver, respectively; N/2-point offset discrete Fourier transform processing means for subjecting prescribed ones of said first-type complex digital signal sequences and a plurality of second-type complex digital signal sequences of twice said slow sampling rate, equal in number to a prescribed one of N and N/2, to N/2-point offset discrete Fourier transform processing at a period of T/2 second to produce said second-type and said first-type complex digital signal sequences when said converter is operable as said transmitter and said receiver, respectively; filter means comprising a plurality of digital filter units, equal in number to said prescribed one of N and N/2, said digital filter units being operable at twice said slow sampling rate and having a predetermined effective bandwidth and linear phase slopes stepwise different from one another among a bank of the digital filter units, N/2 in number, for carrying out band limitation on preselected ones of said second-type complex digital signal sequences and a plurality of third-type complex digital signal sequences of twice said slow sampling rate, respectively, said third-type complex digital signal sequences equal in number to N/2 and to said predetermined one of N/2 when said converter is operable as said transmitter and said receiver, respectively, said filter means thereby producing said third-type and said second-type complex digital signal sequences when said converter is operable as said transmitter and said receiver, respectively; and second means for digitally carrying out conversion between said third-type complex digital signal sequences and said real QAM digital signal sequence.

In the next preceding paragraph, the letter "L" is used to represent the number of channels of baseband complex PAM digital signal sequences, which are directly derived from or to be converted directly to the baseband real PAM digital signal sequences. Consequently, the letter "L" represents a positive integer.

BRIEF DESCRIPTION OF THE DRAWING

FIG. 1 is a block diagram of a conventional analog-processing type orthogonally multiplexed QAM signal transmission system;

FIG. 11, depicted on the right side of FIG. 6, is a block diagram of a slow real low-pass filter for use in the transmitter illustrated in FIG. 9;

FIG. 4, is a block diagram of a demultiplexing circuit for use in the receiver illustrated in FIG. 16;

FIG. 12, is a block diagram of a circuit unit of a post-processor for use in the receiver illustrated in FIG. 16;

DESCRIPTION OF THE PREFERRED EMBODIMENTS

Figure 1:
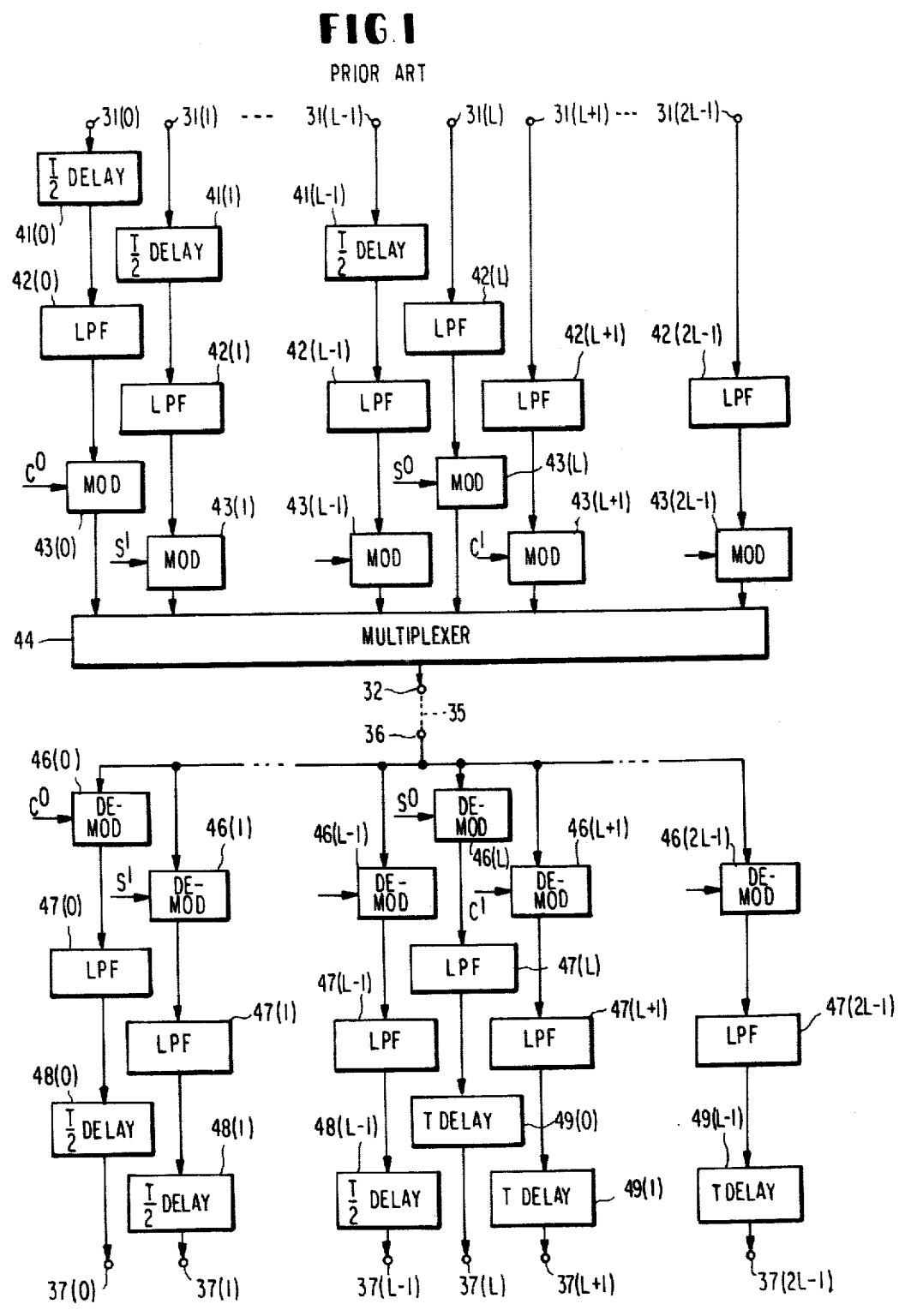
Figure 2:
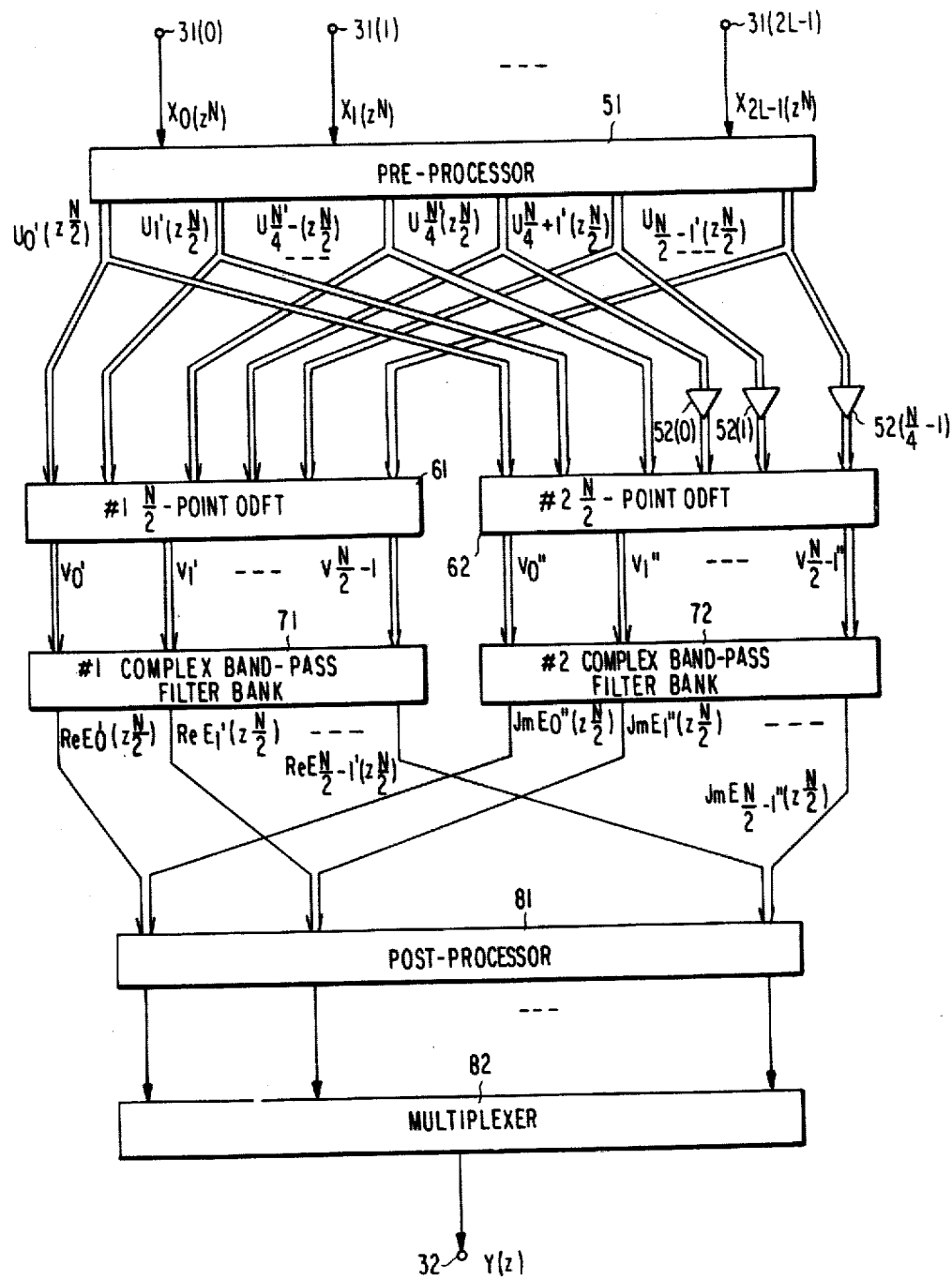
FIG. 2 is a block diagram of a digital-processing type orthogonally multiplexed QAM signal converter according to a first embodiment of the instant invention, which converter is operable as a transmitter.

Referring to FIG. 1, an analog-processing type orthogonally multiplexed QAM signal transmission system, such as taught in the above-referenced Saltzberg article, will be described at first in order to facilitate an understanding of the present invention. Zeroth through $(2L-1)$-th input PAM signals having a common sampling frequency or rate of $1/T$ hertzes and synchronized with one another, are supplied to zeroth through $(2L-1)$-th transmitter input terminals $31(0), 31(1), \ldots$, and $31(2L-1)$ of a transmitter of the system, respectively. Responsive to the PAM signals, the transmitter delivers an orthogonally multiplexed output QAM signal to a transmitter output terminal 32 of the transmitter, Through a transmission channel 35, the QAM signal reaches a receiver input terminal 36 of a receiver of the system as an orthogonally multiplexed input QAM signal. Responsive to the input QAM signal, the receiver reproduces the RAM signals and delivers zeroth through $(2L-1)$-th reproduced PAM signals to zeroth through $(2L--1)$-th receiver output terminals $(37 (0), 37(1), \ldots,$ and $37(2L-1)$ of the receiver, respectively. As would have been understood from the above, it is surmised that the number of baseband signal channels is 2L, where L represents a positive integer. When the actual number of baseband signal channels is an odd number, use of an additional dummy baseband channel readily renders it possible to make the system deal with the baseband signal channels, 2L in number.

The transmitter comprises zeroth through $(L-1)$-th transmitter delay circuits $41(0), 41(1), \ldots,$ and $41(L-1)$ for producing zeroth through $(L-1)$-th delay PAM signals by giving a common delay of $T/2$ second to selected ones of the zeroth through the $(2L-1)$-th input PAM signals, respectively. It is possible to assume for simplicity of description and yet without loss of generality that the zeroth through the $(L-1)$-th input PAM signals are supplied to the delay circuits 41(0) through 41(L-1), respectively. When one of zero through $(L-1)$ is represented by K, it is possible to deal the K-th delayed PAM signal and the $(L+K)$-th input PAM signal as real and imaginary parts of a K-th input complex PAM signal of a second sampling rate of $2/T$ hertzes. In this manner, various complex signals will be used as the description proceeds. The input PAM signals supplied to the transmitter input terminals 31(0) through $31(2L-1)$, the QAM signals at the transmitter output terminal 32 and the receiver input terminal 36, and the reproduced PAM signals delivered to the receiver output terminals 37(0) through 37(2L−1) will therefore be referred to as real signals, when desired.

The transmitter further comprises zeroth through (2L−1)-th transmitter baseband filters 42(0), 42(1), . . . , and 42(2L−1) for producing zeroth through (2L−1)-th transmitter filter output signals by subjecting the zeroth through the (L−1)-th delayed PAM signals and the L-th through the (2L−1)-th input PAM signals to band limitation and waveform shaping, respectively, zeroth through (2L−1)-th modulators 43(0), 43(1), . . . , and 43(2L−1) for the zeroth through the (2L−1)-th filter output signals, respectively, and a transmission carrier generator for generating zeroth through (L−1)-th transmission quadrature or complex carriers. The carriers, when numbered k, consist of k-th transmission inphase and quadrature-phase carriers cos $2\pi f_k t$ and sin $2\pi f_k t$ of zeroth through (L−1)-th transmission carrier frequencies $f_k$, which may be related to one another by $f_{k+1} - f_k = 1/T$ (hertzes). Inasmuch as the zeroth through the (L−1)-th carriers are numbered k for the time being, $0 \leq k \leq L-1$ although the L-th complex carrier is not used. The frequency $f_0$ of the zeroth complex carrier may be selected in consideration of the frequency band allotted to the transmitter. One of the inphase carriers and the equally numbered quadrature-phase carrier are real and imaginary parts of a complex carrier.

The zeroth through the (L−1)-th complex carriers are supplied to the modulators 43(0) through 43(L−1) to be orthogonally amplitude modulated by the filter output signals into zeroth through (2L−1)-th modulated signals. It is again possible to presume that the k-th complex carriers are modulated by the k-th complex filter output signals, respectively. More particularly, the zeroth inphase and quadrature-phase carriers, the first quadrature-phase and inphase carriers, and so on are supplied to the zeroth and the L-th modulators 43(0) and 43(L), the first and the (L+1)-th modulators 43(1) and 43(L+1), and so forth as indicated by symbols $c^0$, $s^1$, . . . , $s^0$, $c^1$, . . . along those short lines with arrowheads which may be considered to represent in combination the transmission carrier generator. The (L−1)-th and the (2L−1)-th modulators 43(L−1) and 43(2L−1) are supplied with the (L−1)-th inphase and quadrature-phase carriers and the (L−1)-th quadrature-phase and inphase carriers, respectively, according as the number L is even and odd, respectively.

The transmitter still further comprises a multiplexing circuit 44 responsive to the zeroth through the (2L−1)-th modulated signals for delivering the orthogonally multiplexed output QAM signal to the transmitter output terminal 32. It is known in the art that the k-th and the (L+k)-th modulated signals become k-th QAM signals of center frequencies equal to the transmission carrier frequencies $f_k$, when combined together at the multiplexing circuit 44.

The receiver comprises a local or demodulation carrier generator for generating zeroth through (L−1)-th demodulation complex carriers, of which real and imaginary parts are k-th demodulation inphase and quadrature-phase carriers cos $2\pi f_k t$ and sin $2\pi f_k t$ of frequencies equal to the k-th transmission carrier frequencies $f_k$, respectively. Zeroth through (2L−1)-th demodulators 46(0), 46(1), . . . , and 46(2L−1) are supplied with the demodulation complex carriers in correspondence to the respective modulators 43(0) through (43(2L−1) to demodulate the orthogonally multiplexed input QAM signal into zeroth through (2L−1)-th demodulated signals, respectively. The receiver further comprises zeroth through (2L−1)-th receiver baseband filters 47(0), 47(1), . . . , and 47(2L−1) for producing zeroth through (2L−1)-th receiver filter output signals by subjecting the zeroth through the (2L−1)-th demodulated signals to band limitation and waveform shaping, respectively, zeroth through (L−1)-th receiver delay circuits of a first kind 48(0), 48(1), . . . , and 48(L−1) for producing the zeroth through the (L−1)-th reproduced PAM signals by giving a common delay of T/2 second to the zeroth through the (L−1)-th receiver filter output signals, respectively, and zeroth through (L−1)-th receiver delay circuits of a second kind 49(0), 49(1), . . . , and 49(L−1) for producing the L-th through the (2L−1)-th reproduced PAM signals by giving another common delay of T second to the L-th through the (2L−1)-th receiver filter output signals, respectively. The delay circuits 48(0) through 48(L−1) and 49(0) through 49(L−1) are for converting receiver filter output complex signals to the reproduced PAM signals.

The receiver thus carries out entirely reversed operation as compared with the transmitter. It is also known in the art that the reproduced PAM signals suffer from no intersymbol interference in each baseband signal channel and no interchannel interference when pertinent sampling instants are selected and when the transmitter and the receiver baseband filters 42(0) through 42(2L−1) and 47(0) through 47(2L−1) are low-pass filters having a common frequency response or frequency transfer characteristic $G(\omega)$ that has a 3-dB attenuation bandwidth (herein called an effective bandwidth) of 1/(2T) hertzes so that $G^2(\omega)$ may become an ordinary Nyquist filter characteristic having a 6-dB attenuation bandwidth of 1/(2T) hertzes.

With the transmitter illustrated with reference to FIG. 1, it is possible as follows to carry out mere substitution of digital signal processing for the analog signal processing to derive a merely digitally processing transmitter. The zeroth through the (2L−1)-th input real PAM signals are now zeroth through (2L−1)-th input real PAM digital signal sequences of a common basic lower or slow sampling rate of 1/T hertzes, respectively. The digital signal sequences may be referred to either as sample sequences or data. The output real QAM signal is an orthogonally multiplexed output real QAM sample sequence of a higher or fast sampling rate of $f_s$ hertzes, which rate is preselected in consideration of the basic slow sampling rate 1/T and must be high enough so as not to introduce interference into the output QAM sample sequence as a result of spectral rolloffs. The fast sampling rate $f_s$ should be equal to an integral multiple of the slow sampling rate 1/T in order to facilitate the digital signal processing. The integral multiple should be an even number so as to enable the delay of T/2 second to be realized by the transmitter delay circuits 41(0) through 41(L−1). Let the even number be designated by N. In other words, let a rate of N/T hertzes be selected as the fast sampling rate $f_s$. It is generally feasible to select an even number N that is not less than the number of baseband real signal channels 2L.

It is now possible to denote the zeroth through the (L−1)-th input real PAM sample sequences by $X_0(z^N)$ to $X_{L-1}(z^N)$ or $X_k(z^N)$, where $z = \exp(j2\pi f/f_s) = \exp(j2\pi fT/N)$, and the L-th through the (2L−1)-th input real PAM sample sequences by $X_L(z^N)$ to $X_{2L-1}(z^N)$ or $X_{L+k}(z^N)$. By the use of z-transform, each of the transmitter baseband filters 42(0) through 42(2L−1) is represented by G(z). When the k-th and the (L+k)-th transmitter filter output sample sequences are denoted by $C_k'(z)$ and $C_k''(z)$ for simplicity of denotation, they represent:

$$C_k'(z) = X_k(z^N) \cdot z^{-N/2} \cdot G(z) \atop \text{and } C_k''(z) = X_{L+k}(z^N) \cdot G(z), \quad \Bigg\} \quad (1)$$

respectively. The even numbered ones of the filter output sample sequences $C_k'(z)$ and $C_k''(z)$ are used to modulate the zeroth through the (L−1)-th transmission inphase carriers cos $2\pi f_k t$, respectively, and the odd numbered ones, the zeroth through the (L−1)-th transmission quadrature-phase carriers sin $2\pi f_k t$, respectively. Consequently, the orthogonally multiplexed output QAM sample sequence, now represented by Y(z), is given as the real part of an orthogonally multiplexed output complex QAM sample sequence Z(z) by:

$$Y(z) = Re[Z(z)] = \sum_{k=0,2,\ldots} \{[C_k'(p_k \cdot z) + C_k'(p_k^{-1} \cdot z)]/2 \\ + j[C_k''(p_k \cdot z) - C_k''(p_k^{-1} \cdot z)]/2\} \\ + \sum_{k=1,3,\ldots} \{[C_k''(p_k \cdot z) + C_k''(p_k^{-1} \cdot z)]/2 \\ + j[C_k'(p_k \cdot z) - C_k'(p_k^{-1} \cdot z)]/2\}, \quad (2)$$

where $p_k$ represents frequency factors defined by $p_k = \exp(j2\pi f_k/f_s) = \exp(j2\pi[k+f_0T]/N)$. From Equations (1) and (2):

$$Y(z) = Re\left[\sum_{k=0}^{L-1} \tilde{x}_k(p_k^{N/2} \cdot z^{N/2}) \cdot G(p_k \cdot z)\right], \quad (3)$$

where $x_k(z^{N/2})$ represents k-th baseband complex PAM sample sequences given, when k represents even and odd numbers, by:

$$\tilde{x}_k(z^{N/2}) = X_k(z^N) \cdot z^{-N/2} + jX_{L+k}(z^N) \atop \text{and } \tilde{x}_k(z^{N/2}) = X_{L+k}(z^N) + jX_k(z^N) \cdot z^{-N/2}, \quad \Bigg\} \quad (4)$$

respectively, as sample sequences of a second slow sampling rate or twice the basic slow sampling rate 2/T. The number of baseband complex signal channels is L.

In view of the principles of orthogonal multiplexing, each transmitter low-pass filter G(z) should have a phase response or phase transfer characteristic that is linear as regards frequency in the passband. The low-pass filter G(z) should therefore be a non-recursive or finite impulse response (herein abbreviated to FIR) digital filter that has symmetric filter coefficients and that is operable at an interval of T/N second, namely, has an impulse response of the fast sampling rate $f_s$. For convenience of the description that follows, let the low-pass filter G(z) be a J-th order FIR digital filter, an impulse response sample sequence of which is represented by $g_m$, where $0 \leq m \leq J-1$. Incidentally, the low-pass filter G(z) is named a fast low-pass FIR digital filter because of the impulse response of the fast sampling rate $f_s$.

The digital signal processing specified by Equations (3) and (4) may directly be implemented as follows. At first, the k-th baseband complex PAM sample sequences $x_k(z^{N/2})$ are subjected to frequency shifts or offsets of $f_k$ hertzes (corresponding to the frequency factors $p_k$), respectively, to become k-th complex band signals $x_k(p_k^{N/2} \cdot z^{N/2})$ of center frequencies equal to the transmission carrier frequencies $f_k$. Next, the complex band signals are caused to pass through complex band-pass FIR digital filters $G(p_k \cdot z)$, respectively, which filters are operable at the fast sampling rate $f_s$. Finally, real responses of the respective complex band-pass filters, namely, real parts of the filter output complex signals, are summed up into the orthogonally multiplexed real QAM sample sequence Y(z).

For the direct implementation described in the next preceding paragraph, the number of times, denoted by $S_{direct}$, of multiplication to be carried out per sample of the output real QAM sample sequence Y(z) is given by:

$$S_{direct} = 4L(1+J/N).$$

Inasmuch as a number nearly equal to the number of baseband real signal channels 2L is usually selected as the even number N, the number of times $S_{direct}$ is given approximately by:

$$S_{direct} \approx 4L + 2J.$$

Furthermore, the order J is generally selected to be more than ten times as great as the number of baseband complex signal channels L. The number of times $S_{direct}$ therefore becomes an enormous number that is approximately proportional to the order J of the transmitter low-pass filter G(z).

The above-indicated disadvantages of the direct implementation may be removed by introducing discrete Fourier transform (usually abbreviated to DFT) algorithm or processing as will now be described. At first, the fast low-pass FIR digital filters G(z)'s are broken down according to the known filter breakdown technique into a bank of slow low-pass FIR digital filters, equal in number to the even integer N, operable at the basic slow sampling rate 1/T, as follows:

$$G(z) = \sum_{n=0}^{N-1} z^{-n} \cdot G_n(z^N), \quad (5)$$

where $0 \leq n \leq N-1$. By using Equation (5), the output complex QAM sample sequence Z(z) is given by:

$$Z(z) = \sum_{n=0}^{N-1} z^{-n} \cdot D_n(p_0^{N/2} \cdot z^{N/2}) \cdot G_n(p_0^N \cdot z^N), \quad (6)$$

where $D_n(p_0^{N/2} \cdot z^{N/2})$ represents N-point output data of offset DFT processing as called in the art (offset DFT being abbreviated to ODFT in general). As will presently be described by plain words, the N-point output data or N-point offset DFT'ed complex sample sequences are given by:

$$D_n(p_0^{N/2} \cdot z^{N/2}) = \sum_{k=0}^{N-1} q_N^{-kn} \cdot \tilde{x}_k([-1]^k \cdot p_0^{N/2} \cdot z^{N/2}) \cdot p_0^{-n}, \quad (7)$$

where $q_N^{-1}$, frequently denoted by $W_N^{-1}$, represents the base of N-point forward DFT processing and is defined by $q_N = \exp(j2\pi/N)$. In Equation (7), $0 \leq k \leq N-1$. Signals $x_L, x_{L-1}, \ldots,$ and $x_{N-1}$ are complex dummy signals, (N−L) in number. Zero is selected in practice as real and imaginary parts of each of these and similar complex dummy signals that will be used later. Incidentally, it is clear from the definition of the constant $q_N$ that the number N, when used as the suffix to q, need no more be an even integer. Symbols $q_{N/2}$ and $q_2$ will therefore be used later, of which the former represents the base of N/2-point DFT processing. When written $q_2^h$, the latter represents $\cos(h\pi) + j\sin(h\pi)$, where h may be any number.

As is obvious from Equations (6) and (7), the DFT processing is applied to the direct implementation by subjecting complex band signals $\tilde{x}_k([-1]^k \cdot p_0^{N/2} \cdot z^{N/2})$ at first to N-point DFT processing and then to multiplication by frequency offset factors $p_0^{-n}$, respectively. Next, the N-point offset DFT'ed complex sample sequences $D_n(p_0^{N/2} \cdot z^{N/2})$ are caused to pass through the slow complex band-pass FIR digital filters $G_n(p_0^N \cdot z^N)$, respectively. Finally, the output complex QAM sample sequence Z(z) is obtained by time-division multiplexing complex responses of the respective band-pass filters.

The number of times, denoted by $S_{dft}$, of multiplication to be carried out per sample of the output real QAM sample sequence Y(z), is given approximately by:

$$S_{dft} \approx 2J/L + 8L + 4.$$

When the direct implementation is compared with the offset DFT applied implementation, it is clear that the latter number of times $S_{dft}$ is considerably less than the former number of times $S_{direct}$, depending on the number of baseband complex signal channels L. By substitution of fast Fourier transform (generally abbreviated to FFT) processing for the mere DFT processing, the number of times, now denoted by $S_{fft}$, of multiplication is further reduced in approximation to:

$$S_{fft} \approx 2J/L + 4\log_2 L + 4.$$

The direct implementation is, however, defective in the following respects even with introduction of the DFT or the FFT processing. By way of example, the offset DFT processing will be reviewed. First, it is necessary in order to obtain the output complex QAM sample sequence Z(z) to cause the offset DFT'ed complex sample sequences $D_n(p_0^{N/2} \cdot z^{N/2})$ of the second slow sampling rate 2/T to pass through the respective slow complex band-pass filters $G_n(p_0^N \cdot z^N)$ operable at the basic slow sampling rate 1/T and to multiplex the complex responses of the respective filters with a frame period of T second. A switch controlled at a period of T/2 second, is therefore indispensable at each point. In the next place, N-point offset DFT processing is necessary for input data, namely, the complex band signals $\tilde{x}_k([-1]^k \cdot p_0^{N/2} \cdot z^{N/2})$, which are inherently N/2-point data as clearly indicated by Equation (7).

Basic principles of operation of a transmitter by which the above-pointed out defects are removed according to the present invention, will now be described. The description of the basic principles will be followed by description of converters according to several embodiments of this invention, which are for use as transmitters.

The orthogonally multiplexed output complex QAM sample sequence Z(z) given above by Equation (3) or (6) is now rewritten, for $0 \leq k \leq N/2 - 1$, into:

$$Z(z) = \sum_{k=0}^{N/2-1} \tilde{x}_k(p_k^{N/2} \cdot z^{N/2}) \cdot G(p_k \cdot z), \quad (8)$$

by the use of complex dummy signals $x_L, x_{L-1}, \ldots$, and $x_{N/2-1}$, (N/2 − L) in number, instead of the dummy signals, as many as (N − L) in number, introduced in conjunction with Equation (7). Although called "signals" in plural, the new dummy signals are zero and one in number when the even number N is selected to be equal to the number of baseband real signal channels 2L and to a sum of the number of baseband real signal channels and two (2L + 2), respectively. When the frequency factor $p_0$ defined in connection with Equation (2) for the zeroth transmission carrier frequency $f_0$ is represented as $p_0 = q_N^{a+b}$, where a represents a selected one of zero and positive integers and b, a fractional number that satisfies $0 \leq b < 1$, it is possible to put $p_k = q_N^{k+a+b}$. Equation (8) is therefore rewritten into:

$$Z(z) = \sum_{k=0}^{N/2-1} \tilde{x}_k(q_2^{k+a+b} \cdot z^{N/2}) \cdot G(q_N^{k+a+b} \cdot z),$$

which equation is further rewritten, by denoting (k − a) again by k, into:

$$Z(z) = \sum_{k=0}^{N/2-1} \tilde{x}_{k-a}(q_2^{k+b} \cdot z^{N/2}) \cdot G(q_N^{k+b} \cdot z), \quad (9)$$

where $\tilde{x}_{k-a}$ are complex dummy signals unless (k − a) represents $0, 1, \ldots,$ and $L - 1$.

On the other hand, real and imaginary parts A(z) and B(z) of a complex sample sequence obtained by subjecting the output complex QAM sample sequence Z(z) to a frequency shift of $q_N^{\frac{1}{2}-b}$, are given by:

$$A(z) = Re\left[\sum_{k=0}^{N/2-1} \tilde{x}_{k-a}(j[-1]^k \cdot z^{N/2}) \cdot G(q_N^{k+\frac{1}{2}} \cdot z)\right]$$

and $$B(z) = Im\left[\sum_{k=0}^{N/2-1} \tilde{x}_{k-a}(j[-1]^k \cdot z^{N/2}) \cdot G(q_N^{k+\frac{1}{2}} \cdot z)\right].$$

When the even number N is an integral multiple of four, it is possible to rearrange the equation for the real part A(z) into:

$$A(z) = Re\left[\sum_{k=0}^{N/4-1} \tilde{x}_{2k-a}(jz^{N/2}) \cdot G(q_N^{2k+\frac{1}{2}} \cdot z)\right.$$
$$\left. + \sum_{k=0}^{N/4-1} \tilde{x}^*_{2k+1-a}(jz^{N/2}) \cdot G^*(q_N^{2k+1+\frac{1}{2}} \cdot z)\right]$$
$$= Re\left[\sum_{k=0}^{N/4-1} \tilde{x}_{2k-a}(jz^{N/2}) \cdot G(q_N^{2k+\frac{1}{2}} \cdot z)\right.$$
$$\left. + \sum_{k=0}^{N/4-1} \tilde{x}^*_{2k+1-a}(jz^{N/2}) \cdot G(q_N^{N-2k-2+\frac{1}{2}} \cdot z)\right]$$
$$= Re\left[\sum_{k=0}^{N/2-1} U_k'(z^{N/2}) \cdot G(q_N^{2k+\frac{1}{2}} \cdot z)\right],$$

where $U_k'(z^{N/2})$ represents pre-processed complex sample sequences of a first kind, which are derived for $0 \leq k \leq N/4 - 1$ and for $N/4 \leq k \leq N/2 - 1$ by:

$$U_k'(z^{N/2}) = \tilde{x}_{2k-a}(jz^{N/2})$$
and
$$U_k'(z^{N/2}) = \tilde{x}^*_{N-2k-1-a}(jz^{N/2}), \quad (10)$$

respectively, where $\tilde{x}_{2k-a}$ and $\tilde{x}_{N-2k-1-a}$ are complex dummy signals unless $(2k-a)$ and $(N-2k-1-a)$ represent $0, 1, \ldots,$ and $L-1$.

Furthermore, the fast low-pass FIR digital filters $G(z)$'s are broken down as in Equation (5) according to:

$$G(z) = \sum_{n=0}^{N/2-1} z^{-n} \cdot G_n(z^{N/2}), \quad (11)$$

into a bank of zeroth through $(N/2-1)$-th slow FIR digital filters of impulse responses of the second slow sampling rate $2/T$. By the use of Equation (11), Equation (9) is rewritten into:

$$A(z) = Re\left\{ \sum_{n=0}^{N/2-1} z^{-n} \left[ \sum_{k=0}^{N/2-1} q_{N/2}^{-kn} \cdot U_k'(z^{N/2}) \cdot q_N^{-n} \right] \cdot G_n(jz^{N/2}) \right\}, \quad (12)$$

where $q_{N/2}^{-1}$ represents the base of $N/2$-point forward DFT processing and $q_N^{-n}$, frequency offset factors. The pre-processed complex sample sequences of the first kind $U_k'(z^{N/2})$ therefore serve as $N/2$-point input data for an $N/2$-point offset DFT processor to be described later, which processor is operable at the second slow sampling rate $2/T$. The signal enclosed with the brackets represents $N/2$-point output data or $N/2$-point offset DFT'ed complex sample sequences of a first kind and may be denoted by $V_n'$ with reference to the N-point offset DFT'ed complex sample sequences $D_n(p_0^{N/2}\cdot z^{N/2})$ defined for $0 \leq n \leq N-1$ by Equation (7).

Similarly:

$$B(z) = Im\left\{ \sum_{n=0}^{N/2-1} z^{-n} \left[ \sum_{k=0}^{N/2-1} q_{N/2}^{-kn} \cdot U_k''(z^{N/2}) \cdot q_N^{-n} \right] \cdot G_n(jz^{N/2}) \right\}, \quad (13)$$

where $U_k''(z^{N/2})$ represents pre-processed complex sample sequences of a second kind, which are given for $0 \leq k \leq N/4-1$ and for $N/4 \leq k \leq N/2-1$ by:

$$U_k''(z^{N/2}) = U_k'(z^{N/2}) = \tilde{x}_{2k-a}(jz^{N/2})$$
and $U_k''(z^{N/2}) = -\tilde{x}_{N-2k-1-a}(jz^{N/2}), \quad (14)$ respectively. The second-kind pre-processed complex sample sequences are used as $N/2$-point input data for another $N/2$-point offset DFT processor. The signal enclosed with the brackets in Equation (13) represents $N/2$-point offset DFT'ed complex sample sequences of a second kind and may be represented by $V_n''$.

It is to be noted in conjunction with Equation (11) that the slow low-pass FIR digital filters $G_n(z^{N/2})$ have impulse responses provided by picking up the impulse responses of the fast low-pass FIR digital filter $G(z)$ at an interval of $T/2$ second and with cyclically different phases. The slow low-pass filters therefore have a common effective bandwidth of $1/(2T)$ hertzes and linear phase slopes that are stepwise different from one another. As a consequence, $G_n(jz^{N/2})$ used in each of Equations (12) and (13) represents a bank of zeroth through $(N/2-1)$-th slow complex band-pass FIR digital filters, which are obtained by subjecting the respective slow low-pass filters to a common complex frequency shift of $q_N^{\frac{1}{4}}$. It is now understood that the complex band-pass filters have impulse responses of the second slow sampling rate $2/T$, namely, they are operable at that sampling rate $2/T$, and that they have a common effective bandwidth of $1/T$ hertzes and linear phase slopes stepwise different from one another. In other words, the complex band-pass filters are derived by subjecting the fast low-pass filters $G(z)$'s to parallel breakdown and successive frequency shifts. As will later be described with reference to one of the accompanying drawing figures, the complex band-pass filters have frequency transfer characteristics in which amplitude transfer functions or characteristics are congruent with one another and have the above-mentioned common effective bandwidth and in which phase transfer characteristics are linear in the passband and have slopes stepwise different from one another.

It is now possible to obtain the real part $A(z)$ according to Equation (12), by causing the first-kind $N/2$-point offset DFT'ed complex sample sequences $V_n'$ to pass through the respective complex band-pass filters $G_n(jz^{N/2})$ and then time-division multiplexing the real responses of the respective complex band-pass filters. Likewise, the imaginary part $B(z)$ are derived according to Equation (13), by causing the second-kind $N/2$-point offset DFT'ed complex sample sequences $V_n''$ to pass through the complex band-pass filters of another bank, respectively, and then time-division multiplexing the imaginary responses of the respective complex band-pass filter of the latter bank. It is possible to write complex responses or filter output complex sample sequences of the complex band-pass filter bank for the first-kind $N/2$-point offset DFT'ed complex sample sequences, by $E_n'(z^{N/2})$ with the argument represented by $z^{N/2}$. Filter output complex sample sequences produced by the other complex band-pass filter bank will be denoted by $E_n''(z^{N/2})$. The output real QAM sample sequence $Y(z)$ is now given according to:

$$Y(z) = Re[A(q_N^{-\frac{1}{4}+b} \cdot z) + jB(q_N^{-\frac{1}{4}+b} \cdot z)]. \quad (15)$$

Referring now to FIG. 2, a digital-processing type orthogonally multiplexed signal converter according to a first embodiment of this invention is for use as a transmitter and comprises zeroth through $(2L-1)$-th transmitter input terminals $31(0)$ to $31(2L-1)$ supplied with zeroth through $(2L-1)$-th input baseband real PAM sample sequences $X_0(z^N)$ to $X_{2L-1}(z^N)$ of the basic slow sampling rate $1/T$, respectively, and a transmitter output terminal $32$ to which an orthogonally multiplexed real QAM sample sequence $Y(z)$ of the fast sampling rate $f_s$ or $N/T$ is delivered. Each sample sequence consists of digital code words or data. Inasmuch as it is readily possible, if necessary, to convert such a sample sequence to a continuous analog signal by the use of a digital-to-analog converter and a filter, the transmitters provided by converters according to various embodiments of this invention, will be described only in conjunction with conversion between such sample sequences. Furthermore, it will be assumed merely for simplicity of description that the even number N is an integral multiple of four.

In FIG. 2, the transmitter comprises a pre-processor 51 responsive to the input real PAM sample sequences $X_0(z^N)$ through $X_{2L-1}(z^N)$ for producing, by addition thereto of complex dummy signals, (N/2−L) in number, zeroth through (N/2−1)-th pre-processed complex sample sequences of a first kind $U_0'(z^{N/2})$ to $U_{N/2-1}'(z^{N/2})$ of the second slow sampling rate 2/T, and zeroth through (N/4−1)-th inverters 52(0), 52(1), . . . , and 52(N/4-1) responsive to the N/4-th through the (N/2−1)-th first-kind pre-processed complex sample sequences $U_{N/4}'(z^{N/2})$ to $U_{N/2-1}'(z^{N/2})$ for producing N/4-th through (N/2−1)-th pre-processed complex sample sequences of a second kind $U_{N/4}''(z^{N/2})$ to $U_{N/2-1}''(z^{N/2})$, respectively. The first-kind pre-processed complex sample sequences are produced according to Equations (4) and (10) for $0 \leq k \leq N/2-1$. The second-kind pre-processed complex sample sequences are derived by the use of Equations (4) and (14), again for $0 \leq k \leq N/2-1$, among which the zeroth through the (N/4−1)-th ones are the first-kind pre-processed signals, as they are.

A set of numerical examples will be given, in which 2L=14, N=16, and a=1. The number (N/2−L), of complex dummy signals is only one. Inasmuch as (2k−a) becomes (−1) when k=0, the zeroth sample sequence $U_0'(z^{N/2})$ is the only complex dummy signal among the zeroth through the seventh first-kind pre-processed complex sample sequences, which are calculated as follows:

$$U_0'(z^8) = 0,$$

$$U_1'(z^8) = X_8(-z^{16}) + z^{-8} \cdot X_1(-z^{16}),$$

$$U_2'(z^8) = X_{10}(-z^{16}) + z^{-8} \cdot X_3(-z^{16}),$$

$$U_3'(z^8) = X_{12}(-z^{16}) + z^{-8} \cdot X_5(-z^{16}),$$

$$U_4'(z^8) = -j[X_{13}(-z^{16}) + z^{-8} \cdot X_6(-z^{16})],$$

$$U_5'(z^8) = -j[X_{11}(-z^{16}) + z^{-8} \cdot X_4(-z^{16})],$$

$$U_6'(z^8) = -j[X_9(-z^{16}) + z^{-8} \cdot X_2(-z^{16})],$$

and $$U_7'(z^8) = -j[X_7(-z^{16}) + z^{-8} \cdot X_0(-z^{16})].$$

Figure 3:
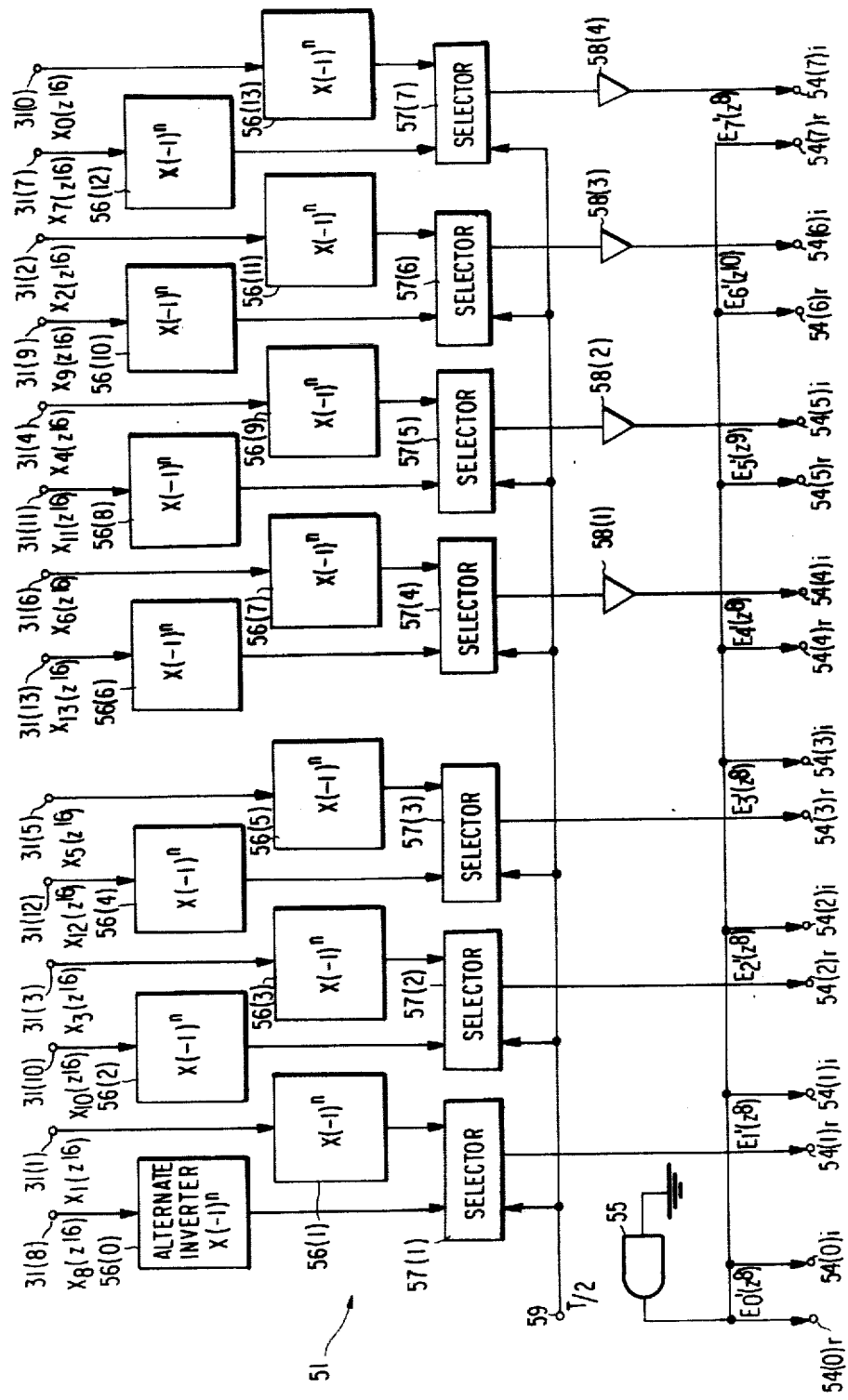
FIG. 3 is a block diagram of a pre-processor for use is a specific example of the transmitter shown in FIG. 2.

Turning temporarily to FIG. 3, a pre-processor 51 for the numerical examples given above, comprises zeroth through seventh pre-processor output terminal pairs 54(0)r, 54(0)i, 54(1)r, 54(1)i, . . . , 54(7)r, and 54(7)i. Real and imaginary parts of a K-th first-kind pre-processed complex sample sequence $U_K'(z^8)$ (K being representative of only one of zero through seven) are supplied to the K-th pair of output terminals 54(K)r and 54(K)i, respectively, as will presently be described. Zeroth through thirteenth pre-processor input terminals are the transmitter input terminals 31(0) through 31(13). The illustrated pre-processor 51 may comprise an AND gate 55 having at least one input grounded for always producing a logic "0" output signal to supply real-part and/or imaginary-part dummy signals to the output terminals 54(0)r, 54(0)i, 54(1)i, 54(2)i, 54(3)i, 54(4)r, 54(5)r, 54(6)r, and 54(7)r. Zeroth through thirteenth alternate inverters 56(0), 56(1), . . . , and 56(13) are supplied with successive samples of the input real PAM sample sequences $X_8(z^{16})$, $X_1(z^{16})$, $X_{10}(z^{16})$, $X_3(z^{16})$, $X_{12}(z^{16})$, $X_5(z^{16})$, $X_{13}(z^{16})$, $X_6(z^{16})$, $X_{11}(z^{16})$, $X_4(z^{16})$, $X_9(z^{16})$, $X_2(z^{16})$, $X_7(z^{16})$, and $X_0(z^{16})$, respectively. Each alternate inverter multiplies the signal or successive samples supplied thereto, alternatingly by 1 and (−1) at a period of T second to alternatingly shift in effect the frequency spectrum of the signal supplied thereto by 1/(2T) hertzes. Such an alternate inverter may be of the conventional structure, such as described as a two's complement circuit or minus-one multiplier, in U.S. Pat. No. 4,107,470 issued to Rikio Maruta, assignor to the present assignee.

In FIG. 3, a first selector 57(1) has a pair of selector input terminals connected to the zeroth and the first alternate inverters 56(0) and 56(1), respectively. Similarly, each of second through seventh selectors 57(2), 57(3), . . . , and 57(7) has a selector input terminal pair connected to an even numbered alternate inverter and a next odd numbered alternate inverter, such as 56(2) and 56(3). Selector output terminals of the first through the third selectors 57(1) to 57(3) are connected to the pre-processor output terminals 54(1)r, 54(2)r, and 54(3)r, respectively. Selector output terminals of the fourth through the seventh selectors 57(4) to 57(7) are connected to the pre-processor output terminals 54(4)i, 54(5)i, 54(6)i, and 54(7)i through first through fourth inverters 58(1), 58(2), 58(3), and 58(4), respectively. responsive to control clocks of a clock period of T/2 second supplied from a control input terminal 59, each selector selects the signals produced by the even and the next odd numbered alternate inverters, such as 56(0) and 56(1), alternatingly at the clock period T/2.

Reviewing FIGS. 2 and 3, it is now understood that the transmitter comprises a pre-processing circuit [51 and 52(0) through 52(N/4−1)] for digitally converting the real PAM sample sequences to the first-kind and the second-kind pre-processed complex sample sequences $U_k'(z^{N/2})$ and $U_k''(z^{N/2})$. The pre-processing circuit except the AND gate 55, which circuit portion may be referred to again as a pre-processor, digitally converts the real PAM sample sequences to pre-processor output complex sample sequences to a first and a second kind, 2L in number in total. The AND gate 55 serves as means for digitally producing the complex dummy signals, (N/2−L) in number.

In FIG. 2, the transmitter comprises a first N/2-point offset DFT processor 61 supplied with the zeroth through the (N/2−1)-th first-kind pre-processed complex sample sequences $U_0'(z^{N/2})$ to $U_{N/2-1}'(z^{N/2})$ for producing zeroth through (N/2−1)-th offset DFT'ed complex sample sequences of a first kind $V_0'$ to $V_{N/2-1}'$. A second N/2-point offset DFT processor 62 is supplied with the zeroth through the (N/2−1)-th second-kind pre-processed complex sample sequences $U_0''(z^{N/2})$ to $U_{N/2-1}''(z^{N/2})$ and produces zeroth through (N/2−1)-th offset DFT'ed complex sample sequences of a second kind $V_n''$, where $0 \leq n \leq N/2-1$.

Figure 4:
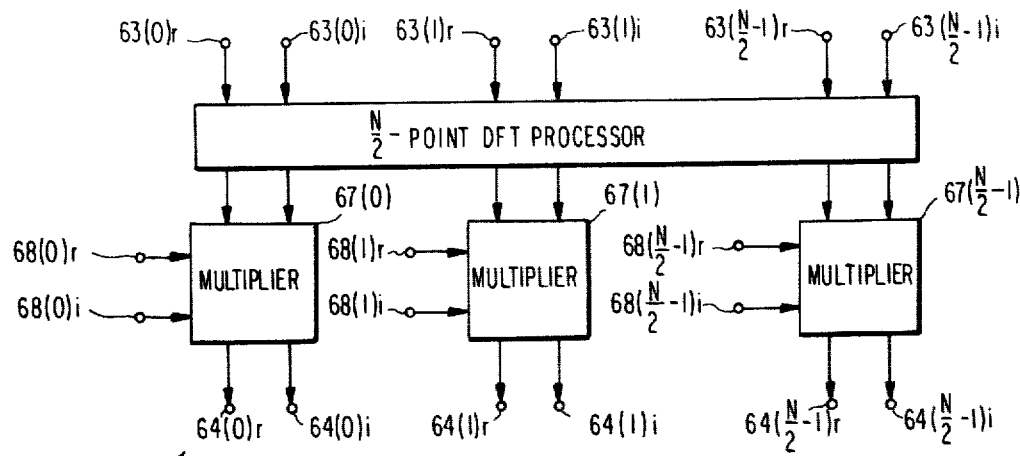
FIG. 4 is a block diagram of an N/2-point offset DFT processor used in the transmitter depicted in FIG. 2.

Referring to FIG. 4 for a short while, each of the first and the second offset DFT processors 61 and 62 comprises zeroth through (N/2−1)-th ODFT processor input terminal pairs 63(0)r, 63(0)i, 63(1)r, 63(1)i, . . . , 63(N/2−1)r, and 63(N/2−1)i and zeroth through (N/2−1)-th ODFT processor output terminal pairs 64(0)r, 64(0)i, 64(1)r, 64(1)i, . . . , 64(N/2−1)r, and 64(N/2−1)i. Real and imaginary parts of a K-th preprocessed complex sample sequence (K being now representative of only one of n, namely, 0 through N/2−1) of the first or the second kind, now designated by $U_K(z^{N/2})$, are supplied to the K-th pair of ODFT processor input terminals 63(K)r and 63(K)i, respectively. A usual DFT processor 66 subjects the pre-processed complex sample sequences to ordinary N/2-point DFT processing at an interval of T/2 second to produce zeroth through (N/2−1)-th merely DFT'ed complex sample sequences $V_n^{(0)}(z^{N/2})$ according to:

$$V_n^{(0)}(z^{N/2}) = \sum_{k=0}^{N/2-1} q_{N/2}^{-kn} \cdot U_k(z^{N/2}).$$

In FIG. 4, the offset DFT processor 61 or 62 may comprise zeroth through (N/2−1)-th complex multipliers 67(0), 67(1), ..., and 67(N/2−1) for multiplying the zeroth through the (N/2−1)-th merely DFT'ed complex sample sequences by zeroth through (N/2−1)-th complex factors $q_{N/2}^{-n}$, respectively. For this purpose, the offset DFT processor 61 or 62 may further comprise zeroth through (N/2−1)-th factor input terminal pairs 68(0)r, 68(0)i, 68(1)r, 68(1)i, ..., 68(N/2−1)r, and 68(N/2−1)i or 68(n)r and 68(n)i supplied with real and imaginary parts cos (4πn/N) and (−sin [4πn/N]) of the n-th complex factors $q_{N/2}^{-n}$, respectively. The n-th complex multipliers 68(n) deliver the offset DFT'ed complex sample sequences $V_n'$ or $V_n''$, namely, $V_n$, to the n-th pairs of the ODFT processor output terminals 64(n)r and 64(n)i, respectively. Each complex multiplier may be of the known structure, such as described in the above-cited Maruta Patent.

The DFT processor 66 illustrated in conjunction with FIG. 4 is composed of multiplying and adding circuits. When it is possible to express the number N/2 by a product of prime numbers, the amount of multiplication is drastically reduced by the use of FFT processing, which is described in detail in, among others, a book authored by Lawrence R. Rabiner and Bernard Gold under the title of "Theory and Application of Digital Signal Processing" and published 1975 by Prentice-Hall, Inc., New Jersey, U.S.A., pages 597–620. When all of the N/2-point input data are either real or imaginary or when all the zeroth through the (N/4−1)-th input data and all the N/4-th through the (N/2−1)-th input data are real and imaginary, respectively, as was the case with the pre-processed "complex" sample sequences $U_0'(z^8)$ through $U_7'(z^8)$ calculated for the numerical examples, it is possible to further reduce the amount of multiplication according to the disclosure of U.S. Pat. No. 4,164,021 issued to Takao Nishitani and Rikio Maruta, assignors to the instant assignee.

Turning back to FIG. 2, the transmitter comprises first and second polyphase circuits 71 and 72 of one and same structure. Each polyphase circuit 71 or 72, as called herein, comprises a bank of zeroth through (N/2−1)-th slow complex band-pass FIR digital filters $G_n(jz^{N/2})$ mentioned before. The n-th offset DFT'ed complex sample sequences $V_n$ are supplied to the n-th complex band-pass filters, respectively. It is sufficient that the first polyphase circuit 71 should produce only real parts of complex sample sequences produced as zeroth through (N/2−1)-th polyphase circuit output complex sample sequences of a first kind $E_n'(z^{N/2})$ by the respective complex band-pass filters thereof and that the second polyphase circuit 72 should produce only imaginary parts of the respective complex band-pass filter output sample sequences, namely, zeroth through (N/2−1)-th polyphase circuit output complex sample sequences of a second kind $E_n''(z^{N/2})$.

Figure 5:
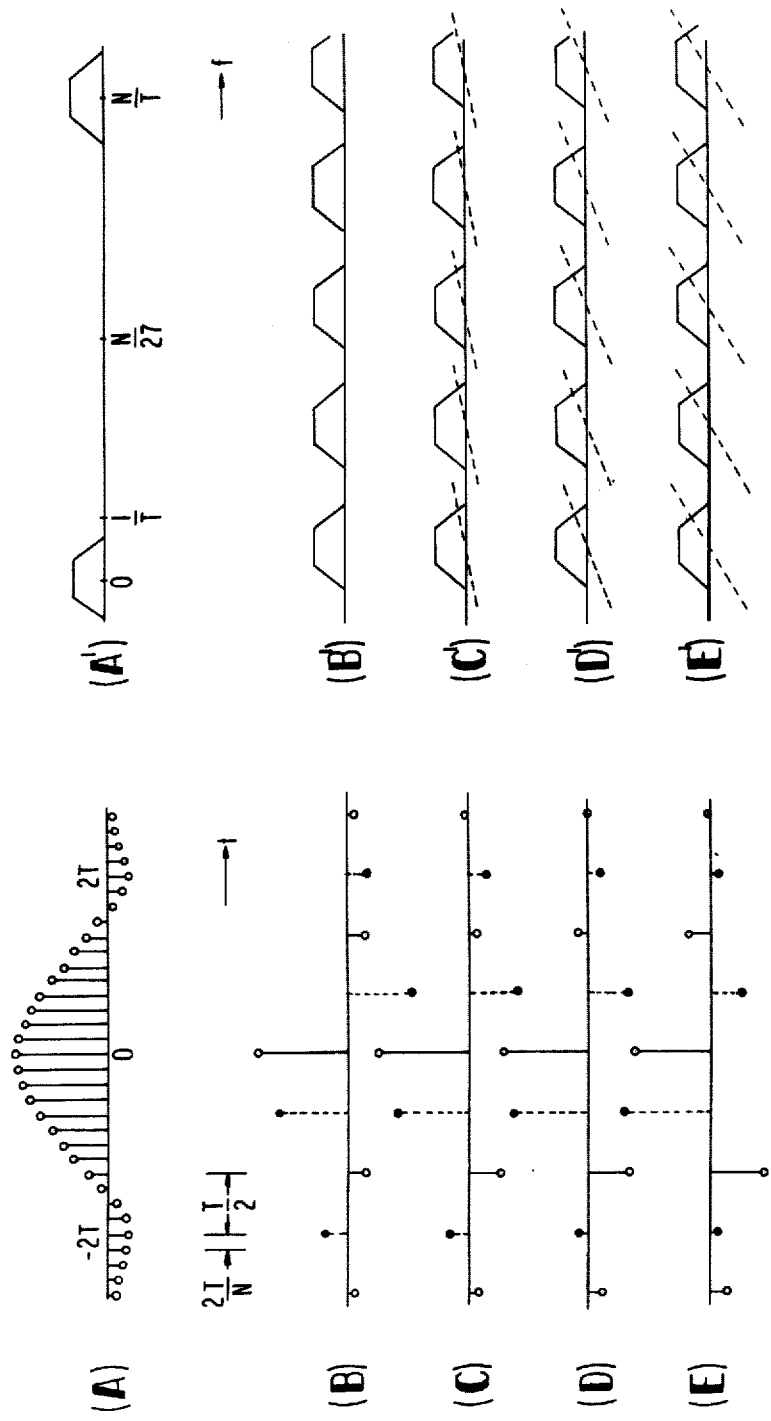
FIG. 5 shows impulse responses and frequency transfer characteristics of a basic fast low-pass filter and a bank of slow complex band-pass filters, which bank is used in a particular example of the transmitter illustrated in FIG. 2.

Referring now to FIG. 5, operation of the polyphase circuit 71 or 72 will be described for a case in which N=8. By way of example, it is assumed that the fast low-pass FIR digital filter G(z) is a J-th order FIR digital filter represented by:

$$G(z) = \sum_{m=0}^{J-1} g_m \cdot z^{-m}.$$

The fast low-pass filter is now operable at a fast sampling rate of 8/T hertzes. When thirty-two is selected as the order J, the fast low-pass filter has an impulse response exemplified along a left top line (A) with a fixed delay caused by the fast low-pass filter in the impulse response neglected so that the impulse response may have a maximum at an instant T=0. The fast low-pass filter has a frequency response depicted along a right top line (A').

Further referring to FIG. 5, consideration will be given to a bank of zeroth through third slow real low-pass FIR digital filters $G_0(z^{N/2})$ to $G_3(z^{N/2})$ as n-th slow low-pass FIR digital filters $G_n(z^{N/2})$, respectively. With substitution of 4i for m, the n-th slow low-pass filters are given by:

$$G_n(z^{N/2}) = \sum_{i=0}^{7} g_{n+4i} \cdot z^{-Ni/2}.$$

The slow complex band-pass FIR digital filter bank comprises zeroth through third slow complex band-pass FIR digital filters given by:

$$G_n(jz^{N/2}) = \sum_{i=0}^{7} (-1)^i \cdot g_{n+4i} \cdot z^{-Ni/2}. \quad (16)$$

In FIG. 5, the zeroth through the third complex band-pass filters have impulse responses illustrated along four left-side lines (B), (C), (D), and (E), respectively, in which each response (as called individually) depicted by a solid line and a small white circle represents a real response and each response shown by a dashed line and a small black circle, an imaginary response. The complex band-pass filters have frequency responses depicted along four right-side lines (B'), (C'), (D'), and (E'), respectively, in which solid trapezoidal or broken lines indicate the amplitude transfer characteristics and slant dashed lines, the phase transfer characteristics of linear phase slopes of zero (not depicted), 2πT/4, 4πT/4, and 6πT/4, respectively. It is to be noted in connection with the lines (B) to (E) that the real and the imaginary responses appear alternatingly at a period of T/2 second.

Figure 6:
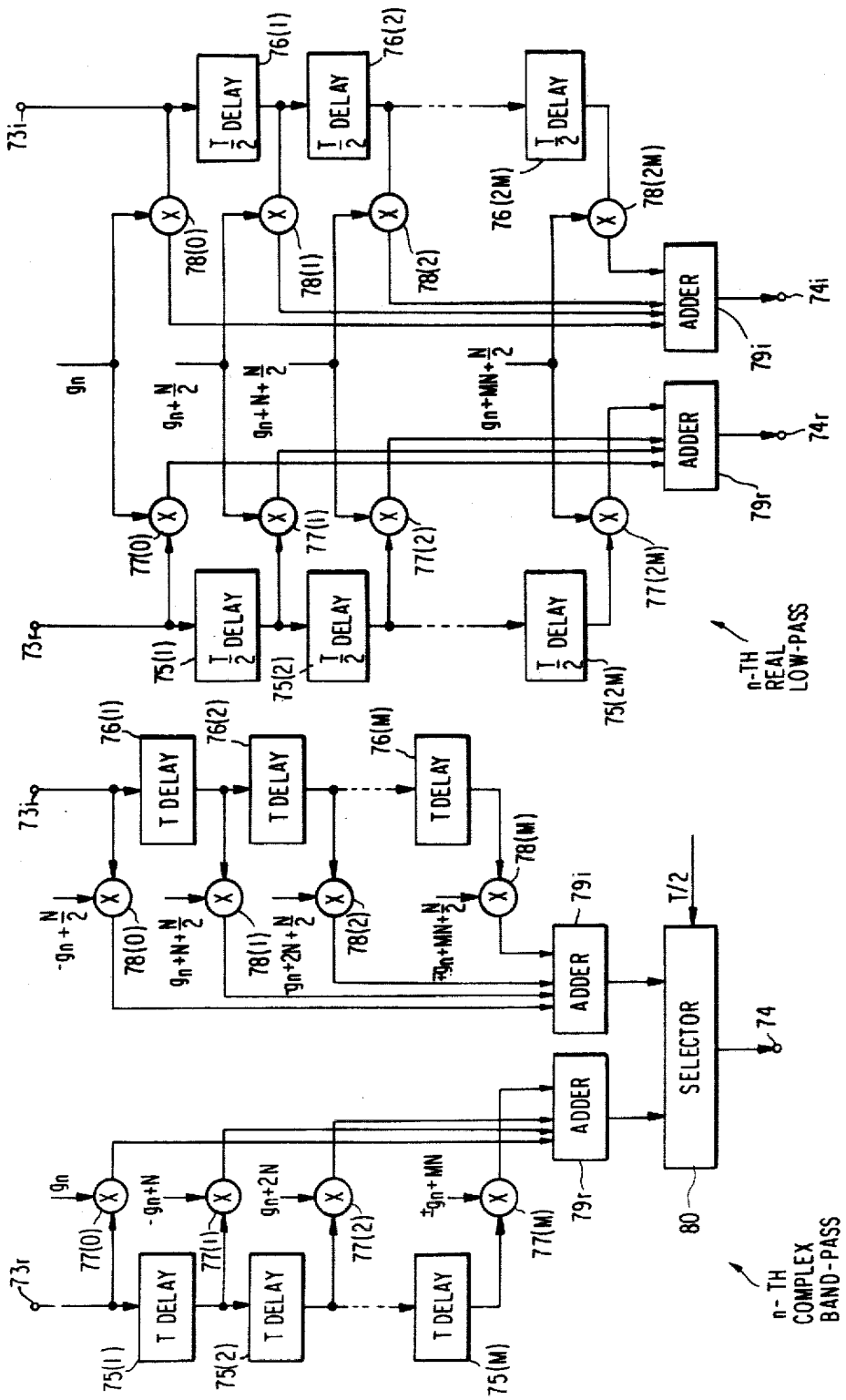
FIG. 6 is a block diagram of a complex band-pass filter for use in the transmitter shown in FIG. 2.

Turning to FIG. 6, it is possible to implement a K-th slow complex band-pass FIR digital filter $G_K(jz^{N/2})$ (K representing only one of n) based on the alternating appearance of the real and the imaginary responses. The K-th complex band-pass filter for use in the first polyphase circuit 71 comprises first and second input terminals 73r and 73i and a filter output terminal 74 that serve as a K-th input terminal pair and a K-th output terminal of the first polyphase circuit 71, respectively. Real and imaginary parts of the K-th first-kind offset DFT'ed complex sample sequence $V_K'$ are supplied to the K-th pair of input terminals 73r and 73i, respectively. A first tapped delay circuit comprising serially successively connected first through M-th T-second delay units 75(1), 75(2), . . . , and 75(M), where M represents a greatest integer that satisfies MN<J, is connected to the first filter input terminal 73r. The first filter input terminal 73r serves as a zeroth tap of the first tapped delay circuit. A second tapped delay circuit is connected to the second filter input terminal 73i and comprises series connected first through M-th T-second delay units 76(1), 76(2), . . . , and 76(M). The K-th first-kind offset DFT'ed complex sample sequence appears at the respective taps with successive delays of 0 through MT second. The successively delayed signals that thus appear in each of the first and the second tapped delay circuits are M+1 in number.

In FIG. 6, the K-th complex band-pass filter may comprise zeroth through M-th multipliers of a first set 77(0), 77(1), . . . , and 77(M) connected to the respective taps of the first tapped delay circuit and supplied with signals for multiplying the successively delayed signals by filter coefficients $g_n$, $-g_{n+N}$, $g_{n+2N}$, . . . , and $\pm g_{n+MN}$ (written by n for K in general), respectively, which coefficients are used in Equation (16). Zeroth through M-th multipliers of a second set 78(0), 78(1), . . . , and 78(M) are connected to the respective taps of the second tapped delay circuit and supplied with signals for multiplying the successively delayed signals by filter coefficients $-g_{n+N/2}$, $g_{n+N+N/2}$, $-g_{n+2N+N/2}$, . . . , and $\mp g_{n+MN+N/2}$, respectively. The upper and the lower signs of the double sign should be used when the greatest integer M is even and odd, respectively. Output signals of the multipliers of the first and the second sets are summed up by first and second (M+1)-input adders 79r and 79i into first and second sum sample sequences of the second slow sampling rate 2/T, respectively. Responsive to control clocks of a clock period of T/2 second, a selector 80 alternatingly selects the first and the second sum sample sequences and delivers the selected sum sample sequence to the filter output terminal 74 as the real part of the K-th first-kind polyphase circuit output complex sample sequences $E_K'(z^{N/2})$.

Further referring to FIG. 6, the second polyphase circuit 72 may be identical in structure to the first polyphase circuit 71. Real and imaginary parts of the K-th second-kind offset DFT'ed complex sample sequence $V_K''$ are supplied to the K-th polyphase circuit input terminals 73r and 73i, respectively. The selected sum sample sequence is supplied to the K-th polyphase circuit output terminal 74 as a polarity reversed imaginary part of the K-th second-kind polyphase circuit output complex sample sequence $E_K''(z^{N/2})$.

Reviewing FIGS. 2, 5, and 6, the complex band-pass filter bank of the first polyphase circuit 71 produces filtered complex sample sequences of a first kind $E_n'(z^{N/2})$ by nature as will become clear later. It is therefore possible to understand that the polyphase circuit output terminals, such as 74, serve as filter output means responsive to the filtered complex sample sequences for producing real parts thereof. This applies to the second polyphase circuit 72. Inasmuch as the real and the imaginary parts are used in pairs as will shortly be described, the filter output complex sample sequences produced by the first and the second polyphase circuits 71 and 72 may be said to be N/2 in number.

In FIG. 2, the transmitter comprises a post-processor 81 having zeroth through (N/2−1)-th post-processor input terminal pairs. Real parts of the n-th first-kind polyphase circuit output complex sample sequences $E_n'(z^{N/2})$ and imaginary parts of the n-th second-kind polyphase circuit output complex sample sequences $E_n''(z^{N/2})$ are used as real and imaginary parts of n-th post-processor input complex sample sequences and are supplied to the n-th pair of post-processor input terminals, respectively. The post-processor 81 subjects the post-processor input complex sample sequences to a common complex frequency shift of $q_N^{-1/2+b}$. It is sufficient that only real parts of zeroth through (N/2−1)-th post-processed complex sample sequences $E_n(q_N^{-1/2+b} \cdot z^{N/2})$ be delivered to a time-division multiplexing circuit 82, which supplies the transmitter output terminal 32 with the orthogonally multiplexed output real QAM sample sequence Y(z). The post-processor 81 and the time-division multiplexing circuit 82 serve in combination as a post-processing circuit for digitally converting real parts of the first-kind filtered complex sample sequences and imaginary parts of the second-kind filtered complex sample sequences into the real QAM sample sequence Y(z).

Figure 7:
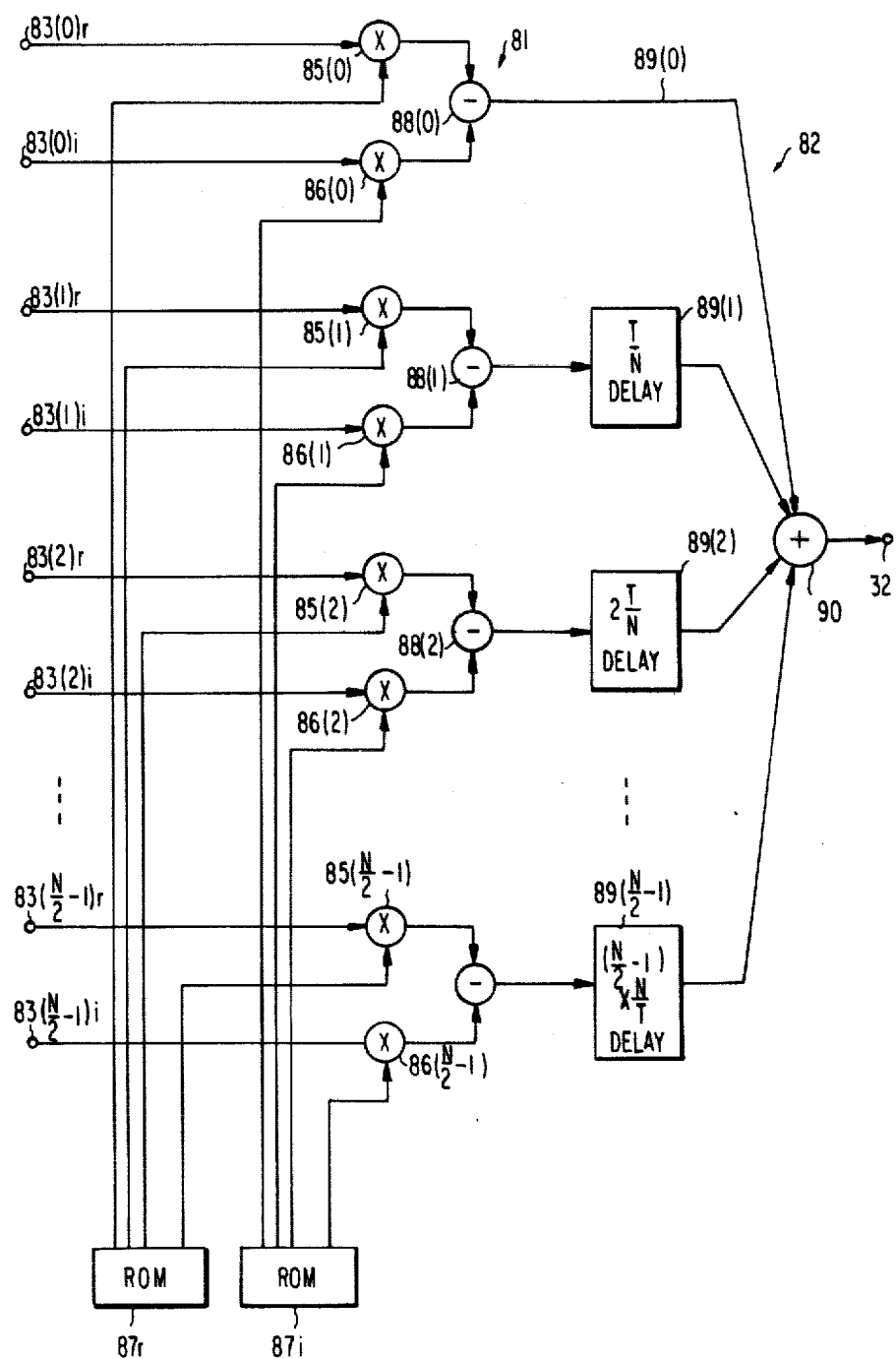
FIG. 7 is a block diagram of a post-processor and a time-division multiplexing circuit for use in the transmitter illustrated in FIG. 2.

Turning to FIG. 7, let $(\frac{1}{2}-b)$ be rewritten by Q/P for brevity of denotation, where P and Q represent a positive integer and an integer, respectively, which satisfy $|Q/P| \leq \frac{1}{2}$. The post-processor input terminal pairs are shown at 83(0)r, 83(0)i, 83(1)r, 83(1)i, . . . , 83(N/2−1)r, and 83(N/2−1)i. The real parts of the post-processor input complex sample sequences $Re[E_n'(z^{N/2})]$ may be supplied to zeroth through (N/2−1)-th multipliers of a first group 85(0), 85(1), . . . , and 85(N/2−1), respectively, and the imaginary parts $Im[E_n'(z^{N/2})]$, to zeroth through (N/2−1)-th multipliers of a second group 86(0), 86(1), . . . , and 86(N/2−), respectively. As will shortly be described, the post-processor 81 may comprise first and second read-only memories 87r and 87i, which cooperate with each other to produce a group of signals for zeroth through (N/2−1)-th complex factors $q_n^{Q(N\phi/2+n)/P}$ at a time, where $\phi$ represents one of zero and positive integers that increases by one modulo 2P at an interval of T/2 second. Real parts of each group of the complex factors $\cos[2\pi Q(N\phi/2+n)/(PN)]$, where $0 \leq n \leq N/2-1$, for an instantaneous value of the integer $\phi$, are supplied to the first-group multipliers 85(0) through 85(N/2−1), respectively. Imaginary parts of each complex factor signal group $\sin[2\pi Q(N\phi/2+n)/(PN)]$ for that instantaneous value are supplied simultaneously to the second-group multipliers 86(0) through 86(N/2−1), respectively.

In FIG. 7, the first read-only memory 87r memorizes the real-part complex factor signal groups $\cos[2\pi Q(N\phi/2+n)/(PN)]$ for $0 \leq n \leq N/2-1$ and for $0 \leq \phi \leq 2P-1$ and cyclically produces the real-part complex factor signal groups at zeroth through (2P−1)-th instants in each period of N/T second. Similarly, the second read-only memory 87i memorizes the imaginary-part complex factor signal groups $\sin[2\pi Q(N\phi/2+n)/(PN)]$ and produces that one of the imaginary-part complex factor signal groups at each of the zeroth through the (2P−1)-th instants in which the integer $\phi$ is given a particular value equal to the instantaneous value of the integer $\phi$ for the real-part complex factor signal group simultaneously produced by the first read-only memory 87r. The post-processor 81 may further comprise zeroth through (N/2−1)-th subtractors 88(0), 88(1), . . . and 88(N/2−1). The K-th subtractor 88(K) (K being only one of n) subtracts the products of the imaginary part of the K-th post-processor input complex sample sequence and the K-th imaginary parts of the respective complex factor signal groups successively from the corresponding products of the real part of the K-th post-processor input complex sample sequence and the K-th real parts of the respective complex factor signal groups to produce real samples of the K-th post-processed complex sample sequence $\text{Re}[E_n(q_{N-\frac{1}{2}+b}\cdot z^{N/2})]$.

Further in FIG. 7, the time-division multiplexing circuit 82 comprises first through $(N/2-1)$-th delay units 89(1), 89(2), ..., and 89(N/2−1). The K-th delay unit 89(K) (a zeroth delay unit 89(0) being a mere conductor) gives a delay of $z^{-K}$, namely, KT/N second, to the K-th post-processed real sample sequence to produce a KT/N-second delayed real sample sequence as a K-th delayed real sample sequence. An adder 90 is for summing up the zeroth through the $(N/2-1)$-th delayed real sample sequences into the orthogonally multiplexed output real QAM sample sequence Y(z), in which different time slots of the fast sampling rate $f_s$ are assigned to the respective post-processed real sample sequences.

The above-illustrated transmitter is simplified to a considerable extent when it is possible to select the basic slow sampling rate 1/T of the baseband real PAM sample sequences to a certain degree as in a case where only the eventual transmission rate is specified. In this event, the fractional number b can be selected to be equal to $\frac{1}{2}$. The output real QAM sample sequence Y(z) is given by:

$$Y(z) = \text{Re}[A(z) + jB(z)],$$

from Equation (15). With reference to Equations (12) and (13):

$$Y(z) = \text{Re}\left\{ \sum_{n=0}^{N/2-1} z^{-n} \left[ \sum_{k=0}^{N/2-1} q_{N/2}^{-kn} \cdot U_k'(z^{N/2}) \cdot q_N^{-n} \right] \cdot G_n(jz^{N/2}) \right\}.$$

Figure 8:
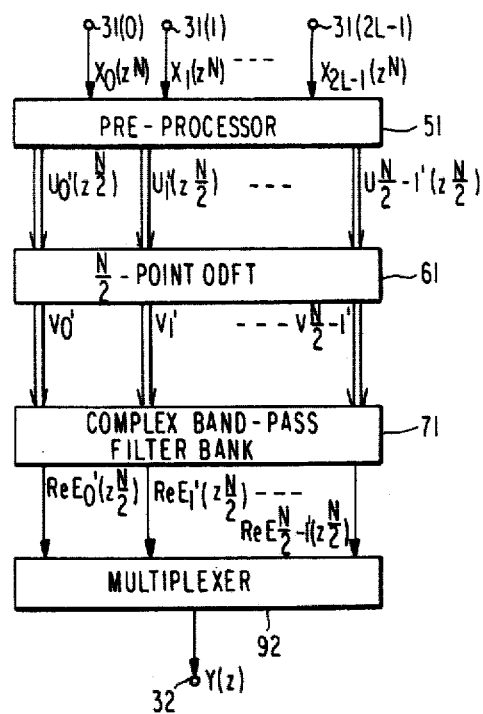
FIG. 8 is a block diagram of a converter according to a second embodiment of this invention, which converter is operable again as a transmitter.

Referring to FIG. 8, a converter according to a second embodiment of this invention is for carrying out the basic principles as a transmitter for the case where $b=\frac{1}{2}$. The transmitter comprises similar parts designated by like reference numerals and is operable with signals represented by like reference symbols as in FIG. 2. In FIG. 8, real parts of the "first-kind" polyphase circuit output complex sample sequences $\text{Re}[E_n'(z^{N/2})]$ are supplied directly to the time-division multiplexing circuit 82. Incidentally, it is impractical to provide a transmitter for deriving the orthogonally multiplexed output real QAM sample sequence Y(z) by mathematically solving the same by the use of the second-kind pre-processed complex sample sequences $U_k''(z^{N/2})$ instead of the first-kind pre-processed complex sample sequences $U_k'(z^{N/2})$. This applies to converters according to a few embodiments of this invention, which will be described later as another transmitter and receivers for a case where it is possible to select $\frac{1}{2}$ as the fractional number b.

Even when the fractional number b has a general value that may or may not be equal to $\frac{1}{2}$, it is possible to simplify the circuitry of FIG. 2 when the basic principles are modified by substitution of a bank of slow real low-pass filters for each slow complex band-pass filter bank. For this purpose, Equations (12) and (13) are rewritten, for $0 \leq n \leq N/2 - 1$, into:

$$A(z) = \sum_{n=0}^{N/2-1} z^{-n} \cdot \text{Re}[E_n'(jz^{N/2})] \quad (17)$$

$$\text{and } B(z) = \sum_{n=0}^{N/2-1} z^{-n} \cdot \text{Im}[E_n''(jz^{N/2})], \quad (18)$$

where, although the same symbols $E_n'$ and $E_n''$ are used, $E_n'(z^{N/2})$ and $E_n''(z^{N/2})$ are somewhat different polyphase circuit output complex sample sequences of a first and a second kind given by:

$$\left.\begin{aligned} E_n'(z^{N/2}) &= \left[ \sum_{k=0}^{N/2-1} q_{N/2}^{-kn} \cdot U_k'(-jz^{N/2}) \cdot q_N^{-n} \right] \cdot G_n(z^{N/2}) \\ \text{and} \\ E_n''(z^{N/2}) &= \left[ \sum_{k=0}^{N/2-1} q_{N/2}^{-kn} \cdot U_k''(-jz^{N/2}) \cdot q_N^{-n} \right] \cdot G_n(z^{N/2}), \end{aligned}\right\} \quad (19)$$

where, in turn, $U_k'(z^{N/2})$ and $U_k''(z^{N/2})$ are the first-kind and the second-kind pre-processed complex sample sequences defined by Equations (10) and (14), respectively. As a consequence:

$$\left.\begin{aligned} U_k'(-jz^{N/2}) &= U_k''(-jz^{N/2}) = \tilde{x}_{2k-a}(z^{N/2}) \\ \text{and } U_k'(-jz^{N/2}) &= -U_k''(-jz^{N/2}) = \tilde{x}^*_{N-2k-1-a}(z^{N/2}), \end{aligned}\right\} \quad (20)$$

when $0 \leq k \leq N/4 - 1$ and when $N/4 \leq k \leq N/2 - 1$, respectively.

In each of Equations (19), $G_n(z^{N/2})$ for $0 \leq n \leq N/2 - 1$ represents a bank of slow real low-pass FIR digital filters mentioned in detail in conjunction with Equation (11). Therefore, the above-described modified principles are implemented, when $0 \leq k \leq N/2 - 1$ and when $0 \leq n \leq N/2 - 1$, by subjecting $U_k'(-jz^{N/2})$ defined by Equations (20) and again called pre-processed complex sample sequences of a first kind, to N/2-point offset DFT processing to derive N/2-point offset DFT'ed complex sample sequences of a first kind $V_n'$ (the same symbol being used as in the basic principles for simplicity of denotation) and by causing the N/2-point offset DFT'ed complex sample sequences to pass through a bank of slow real low-pass filters $G_n(z^{N/2})$ to provide the first-kind polyphase circuit output complex sample sequences $E_n'(z^{N/2})$, respectively. Likewise, $U_k''(-jz^{N/2})$ specified also by Equations (20) and again named pre-processed complex sample sequences of a second kind, are subjected to N/2-point offset DFT processing to be converted to N/2-point offset DFT'ed complex sample sequences of a second kind $V_n''$ (the same symbol being again used), which are caused to pass through another bank of slow real low-pass filters $G_n(z^{N/2})$ and thereby converted to the second-kind polyphase circuit output complex sample sequences $E_n''(z^{N/2})$, respectively.

The first-kind polyphase circuit output complex sample sequences $E_n'(z^{N/2})$ are subjected to a common frequency offset or shift of $q_2^{\frac{1}{2}}$ (=j) and thereby converted to frequency shifted or offset complex sample sequences of a first kind $E_n'(jz^{N/2})$. When time-division multiplexed, real parts of the latter sample sequences give rise to the real part A(z) given by Equation (17). Likewise, it is possible to derive the imaginary part B(z) according to Equation (18) by subjecting the second-kind polyphase circuit output complex sample sequences $E_n''(z^{N/2})$ to the common frequency offset to provide frequency offset complex sample sequences of a second kind $E_n''(jz^{N/2})$ and then time-division multiplexing imaginary parts of the last-mentioned sample sequences. The output real QAM sample sequence $Y(z)$ is obtained as the real part of the output complex QAM sample sequence $Z(z)$ or $[A(z)+jB(z)]$ given by the real and the imaginary parts $A(z)$ and $B(z)$ to another common frequency shift of $q_N^{-\frac{1}{2}-b}$, as:

$$Y(z) = \mathrm{Re}[A(Q_N^{-\frac{1}{2}+b} \cdot z) + jB(q_N^{-\frac{1}{2}+b} \cdot z)].$$

Figure 9:
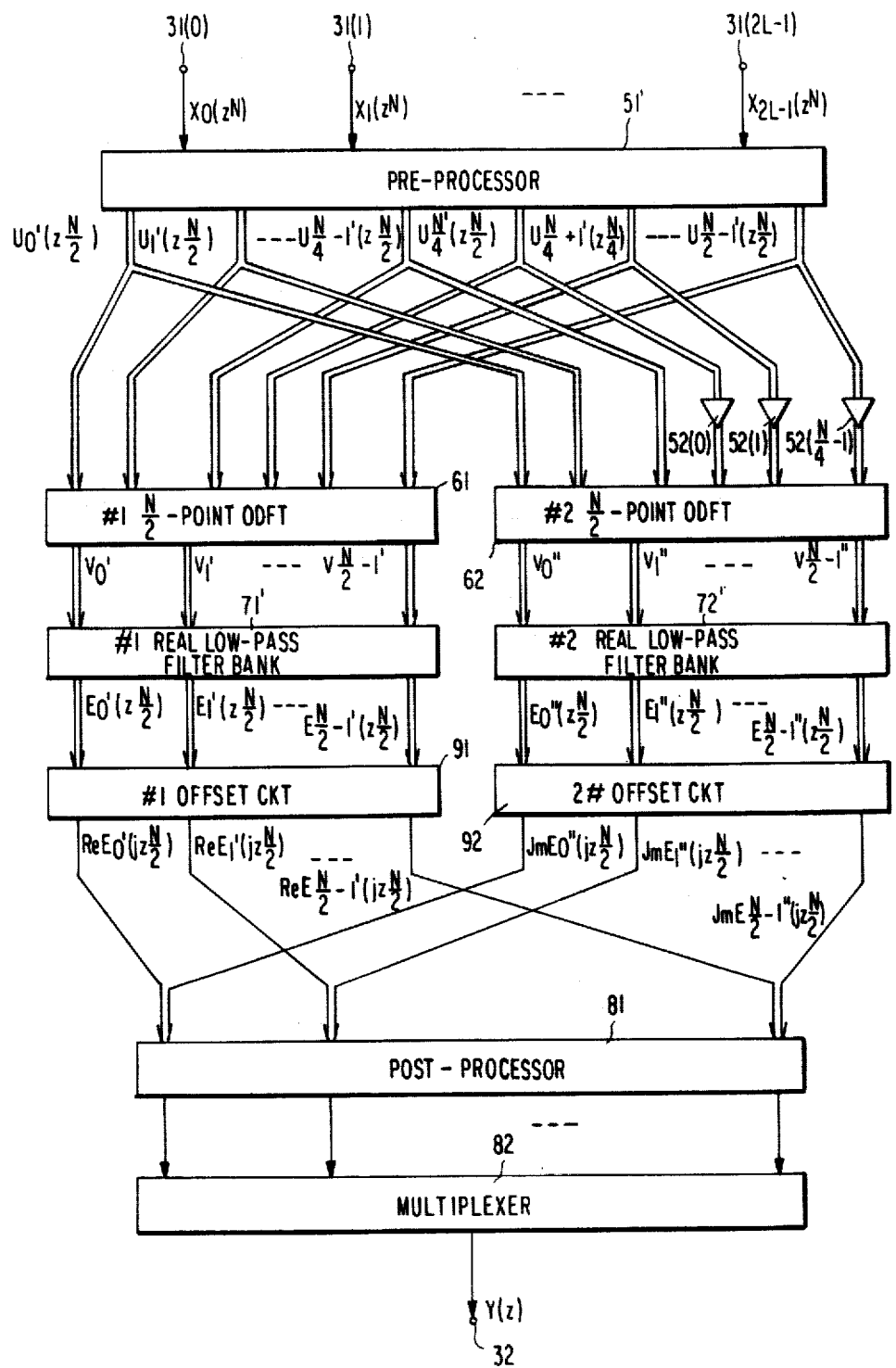
FIG. 9 is a block diagram of a converter according to a third embodiment of this invention, which converter serves also as a transmitter.

Referring now to FIG. 9, a converter according to a third embodiment of this invention is for carrying out the modified principles as a transmitter and comprises corresponding parts designated by like reference numerals as in FIG. 2. Responsive to the zeroth through the $(2L-1)$-th input real PAM sample sequences $X_k(z^N)$ for $0 \leq k \leq 2L-1$, a pre-processor 51' adds complex dummy signals, $(N/2-L)$ in number, to the input real PAM sample sequences and cooperates with the inverters 52(0) through 52(N/4−1) to produce preprocessed complex sample sequences of a first and a second kind $U_k'(-jz^{N/2})$ and $U_k''(-jz^{N/2})$ for $0 \leq k \leq N/2-1$ according to Equations (4) and (20).

For the numerical examples given in connection with the transmitter illustrated with reference to FIG. 1, the zeroth through the seventh first-kind pre-processed complex sample sequences are as follows:

$$U_0'(-jz^8) = 0,$$

$$U_1'(-jz^8) = X_8(z^{16}) + jz^{-8} \cdot X_1(z^{16})$$

$$U_2'(-jz^8) = X_{10}(z^{16}) + jz^{-8} \cdot X_3(z^{16}),$$

$$U_3'(-jz^8) = X_{12}(z^{16}) + jz^{-8} \cdot X_5(z^{16}),$$

$$U_4'(-jz^8) = -jX_{13}(z^{16}) - z^{-8} \cdot X_6(z^{16}),$$

$$U_5'(-jz^8) = -jX_{11}(z^{16}) - z^{-8} \cdot X_4(z^{16}),$$

$$U_6'(-jz^8) = -jX_9(z^{16}) - z^{-8} \cdot X_2(z^{16}), \text{ and}$$

$$U_7'(-jz^8) = -jX_7(z^{16}) - z^{-8} \cdot X_0(z^{16}).$$

The zeroth pre-processed complex sample sequence $U_0'(-jz^8)$ is again a complex dummy signal.

Figure 10:
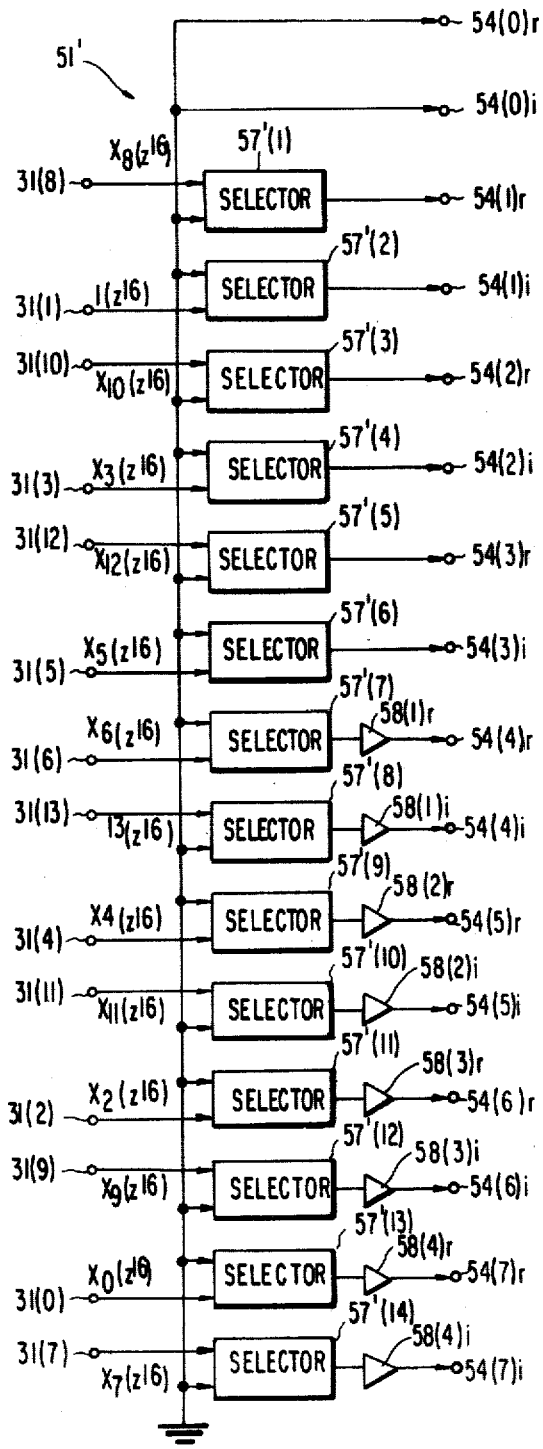
FIG. 10 is a block diagram of a pre-processor for use in a particular example of the transmitter shown in FIG. 9.

Turning to FIG. 10 for a short while, the pre-processor 51' for the numerical examples given above, comprises zeroth through seventh pre-processor output terminal pairs 54(0)r, 54(0)i, 54(1)r, 54(1)i, ..., 54(7)r, and 54(7)i. Zeroth through thirteenth pre-processor input terminals are the transmitter input terminals 31(0) through 31(13). In the illustrated example, the zeroth pre-processed complex sample sequence is digitally given as a complex dummy signal by ground. The pre-processor 51' may comprise first through fourteenth selectors 57'(1), 57'(2), ..., and 57'(14), each having a first and a second selector input terminal and a selector output terminal.

In FIG. 10, the output terminals of the first through the sixth selectors 57'(1) to 57'(6) are connected to the first through the third pairs of pre-processor output terminals 54(1)r, 54(1)i, ..., 54(3)r, and 54(3)i, respectively. The first input terminals of the first, the third, and the fifth selectors 57'(1), 57'(3), and 57'(5) are connected to the eighth, the tenth, and the twelfth transmitter input terminals 31(8), 31(10), and 31(12), respectively. The second input terminals of the second, the fourth, and the sixth selectors 57'(2), 57'(4), and 57'(6) are connected to the first, the third, and the fifth transmitter input terminals 31(1), 31(3), and 31(5), respectively. The output terminals of the seventh through the fourteenth selectors 57'(7) to 57'(14) are connected to the fourth through the seventh pre-processor output terminal pairs 54(4)r, 54(4)i, ..., 54(7)r, and 54(7)i through first through fourth inverter pairs 58(1)r, 58(1)i, ..., 58(4)r, and 58(4)i, respectively. The second input terminals of the seventh, the ninth, the eleventh, and the thirteenth selectors 57'(7), 57'(9), 57'(11), and 57'(13) are connected to the sixth, the fourth, the second, and the zeroth transmitter input terminals 31(6), 31(4), 31(2), and 31(0), respectively. The first input terminals of the eighth, the tenth, the twelfth, and the fourteenth selectors 57'(8), 57'(10), 57'(12), and 57'(14) are connected to the thirteenth, the eleventh, the ninth, and the seventh transmitter input terminals 31(13), 31(11), 31(9), and 31(7), respectively. The remaining input terminals of the first through the fourteenth selectors 57'(1) and 57'(14) are grounded. Responsive to control clocks of a clock period of $T/2$ second, the selectors 57'(1) through 57'(14) alternatingly selects the signals supplied to the first and the second selector input terminals.

Referring back to FIG. 9, the first offset DFT processor 61 is supplied with the first-kind pre-processed complex sample sequences as N/2-point input data and produces the first-kind offset DFT'ed complex sample sequences $V_n'$. Responsive to the second-kind pre-processed complex sample sequences, the second offset DFT processor 62 produces the second-kind offset DFT'ed complex sample sequences $V_n''$. Each of the first and the second N/2-point offset DFT processors 61 and 62 may be of the structure described in conjunction with FIG. 4.

In FIG. 9, each of the first and the second polyphase circuits 71' and 72' comprises a bank of zeroth through $(N/2-1)$-th slow real low-pass FIR digital filters $G_n(z^{N/2})$, which are derived by subjecting the fast real low-pass FIR digital filters $G(z)$'s to parallel breakdown to be operable at the second slow sampling rate $2/T$ and which consequently have amplitude transfer characteristics of a common effective bandwidth of $1/(2T)$ hertzes and linear phase slopes stepwise different from one another. The n-th offset DFT'ed complex sample sequences $V_n'$ or $V_n''$ are supplied to the n-th real low-pass filters $G_n(z^{N/2})$, respectively. The polyphase circuits 71' and 72' produce zeroth through $(N/2-1)$-th polyphase circuit output complex sample sequences of a first and a second kind $E_n'(z^{N/2})$ and $E_n''(z^{N/2})$, respectively.

Referring temporarily to FIG. 11, a K-th slow real low-pass FIR digital filter $G_K(z^{N/2})$ (K being only one of n or 0 through $N/2-1$) of the first or the second polyphase circuit may comprise a first and a second partial filter of a common transfer function $G_K(z^{N/2})$. Being composed of such partial filters, each filter may be called a slow real low-pass FIR digital filter unit. Inasmuch as the partial filters correspond to those parts of the complex band-pass filter described with reference to FIG. 6 which comprise the first and the second tapped delay circuits, corresponding parts of the partial filters will be designated by like reference numerals. More particularly, the partial filters comprise first and second filter input terminals 73r and 73i and first and second filter output terminals 74r and 74i that serve as a K-th polyphase circuit input terminal pair and a K-th polyphase circuit output terminal pair, respectively. A first tapped delay circuit having a zeroth tap connected to the first filter input terminal 73r comprises serially connected first through 2M-th T/2-second delay units 75(1) through 75(2M). Similarly, a second tapped delay circuit comprises series connected first through 2M-th T/2-second delay units 76(1) to 76(2M). Zeroth through 2M-th multipliers of a first set 77(0) to 77(2M) and like multipliers of a second set 78(0) through 78(2M) are connected to the respective taps of the first and the second tapped delay circuits. When represented in general by n instead of K, filter coefficients to be multiplied by the multipliers of each set are $g_n$, $g_{n+N/2}$, $g_{n+N}$, $\cdots$, and $g_{n+MN+N/2}$, respectively. First and second (2M+1)-input adders 79r and 79i supply the first and the second sum sample sequences directly to the filter output terminals 74r and 74i, respectively, as real and imaginary parts of the K-th polyphase circuit output complex sample sequence $E_K'(z^{N/2})$ or $E_K''(z^{N/2})$.

Turning back to FIG. 9, the transmitter comprises first and second offset circuits 91 and 92 between the first and the second polyphase circuits 71' and 72' and the post-processer 81 accompanied by the time-division multiplexing circuit 82, respectively. The first offset circuit 91 subjects the first-kind polyphase circuit output complex sample sequences $E_n'(z^{N/2})$ to a common frequency offset of $q_2^j$ and produces only real parts of zeroth through $(N/2-1)$-th frequency offset complex sample sequences of a first kind $E_n'(jz^{N/2})$. The second offset circuit 92 subjects the second-kind polyphase circuit output complex sample sequences $E_n''(z^{N/2})$ to the common frequency offset and produces only imaginary parts of zeroth through $(N/2-1)$-th frequency offset complex sample sequences of a second kind $E_n''(z^{N/2})$.

It is now understood that the n-th slow real low-pass filter units of the first polyphase circuit 71' serves as n-th digital filter units for producing the n-th first-kind polyphase circuit output complex sample sequences as filtered complex sample sequences of a first kind. Likewise, the second polyphase circuit 72' produces filtered complex sample sequences of a second kind. The offset circuits 91 and 92 serve as filter output means responsive to such first-kind and second-kind filtered complex sample sequences for producing the first-kind and the second-kind frequency offset complex sample sequences. Real parts of the first-kind frequency offset complex sample sequences and imaginary parts of the second-kind frequency offset complex sample sequences are used in pairs as filtered and offset complex sample sequences, N/2 in number. In fact, it is possible to combine the first polyphase and the first offset circuits 71' and 91 into a combined circuit and the second polyphase and the second offset circuits 72' and 92 into another combined circuit as will later be described.

In FIG. 9, the post-processor 81 is supplied with real parts of the first-kind frequency offset complex sample sequences and imaginary parts of the second-kind frequency offset complex sample sequences as real and imaginary parts of post-processor input complex sample sequences, respectively, and subjects the same to a common frequency shift of $q_N^{-\frac{1}{2}+b}$ and delivers only real parts of zeroth through $(N/2-1)$-th post-processed complex sample sequences to the time-division multiplexing circuit 82. The post-processor 81 and the multiplexing circuit 82 may be of the structure illustrated with reference to FIG. 7.

Figure 12:
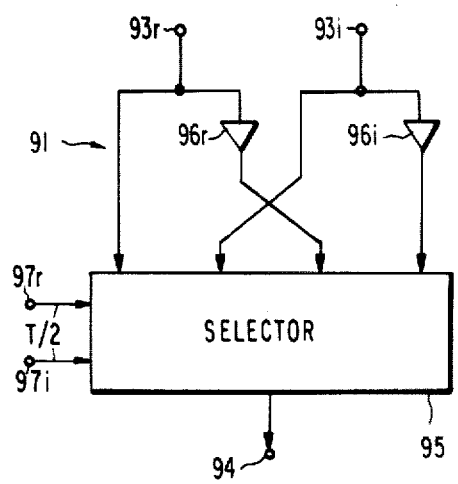
FIG. 12 is a block diagram exemplifying a circuit unit of an offset circuit used in the transmitter shown in FIG. 9.

Turning to FIG. 12, a K-th one of offset circuit units of the first offset circuit 91 (K being again only one of n) is for successively multiplying the samples of the K-th polyphase circuit output complex sample sequences of the first kind $E_K'(z^{N/2})$ by $j^p$, where p represents successive sampling instants. In other words, the samples are cyclically multiplied by 1, j, (−1), and (−j). It is sufficient that the circuit unit should produce only real parts of the successive products. The K-th offset circuit unit comprises first and second offset circuit unit input terminals 93r and 93i and an offset circuit unit output terminal 94 that serve as a K-th offset circuit input terminal pair and a K-th offset circuit output terminal, respectively. Real and imaginary parts of successive complex samples of the K-th polyphase circuit output complex sample sequence of the first kind are supplied to the first and the second input terminals 93r and 93i, respectively. A one-out-of-four selector 95 has a first selector input terminal for the real part of each complex sample, a second selector input terminal for the imaginary part of that complex sample, a third selector input terminal supplied with that real part through a first inverter 96r, and a fourth selector input terminal supplied with that imaginary part through a second inverter 96i. Controlled by two-bit T/2-second control clocks supplied from first and second control input terminals 97r and 97i, the selector 95 cyclically selects the signals supplied to the first through the fourth selector input terminals to deliver the successively selected signals to the output terminal 94 as the real part of the K-th offset circuit output complex sample sequence of the first kind.

Further referring to FIG. 12, a K-th offset circuit unit of the second offset circuit 92 is for successively multiplying the samples of the K-th polyphase circuit output complex sample sequence of the second kind $E_K''(z^{N/2})$ by $(-j)^p$, namely, cyclically by 1, (−j), (−1), and j, and for producing only imaginary parts of the successive products. It is therefore readily possible to implement such an offset circuit unit only by altering the order in which the selector 95 selects the signals supplied to the first through the fourth selector input terminals.

Figure 13:
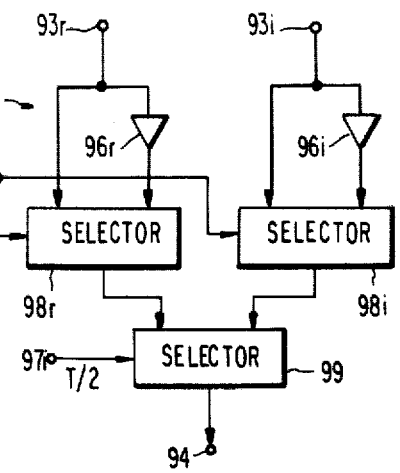
FIG. 13 is a block diagram exemplifying another circuit unit that may be substituted for the circuit unit illustrated in FIG. 12.

Referring to FIG. 13, each circuit unit of the first offset circuit 91 may not comprise the one-out-of-four selector 95 but instead a first one-out-of-two selector 98r more readily available than the selector 95. The first selector 98r has a first and a second selector input terminal supplied with the real part of each complex sample directly and through the first inverter 96r, respectively. Controlled by T-second control clocks supplied from the first control input terminal 97'r, the first selector 98r alternatingly selects the signals supplied to the first and the second selector input terminals. A second one-out-of-two selector 98i is supplied with the imaginary part of that complex sample directly and through the second inverter 96i. The second selector 98i is controlled also by the T-second control clocks. A third one-out-of-two selector 99 has a selector input terminal pair for the signals successively selected by the first and the second selectors 98r and 98i and is controlled by T/2-second control clocks supplied from the second control input terminal 97i to deliver the successively selected signals to the circuit unit output terminal 94.

Figure 14:
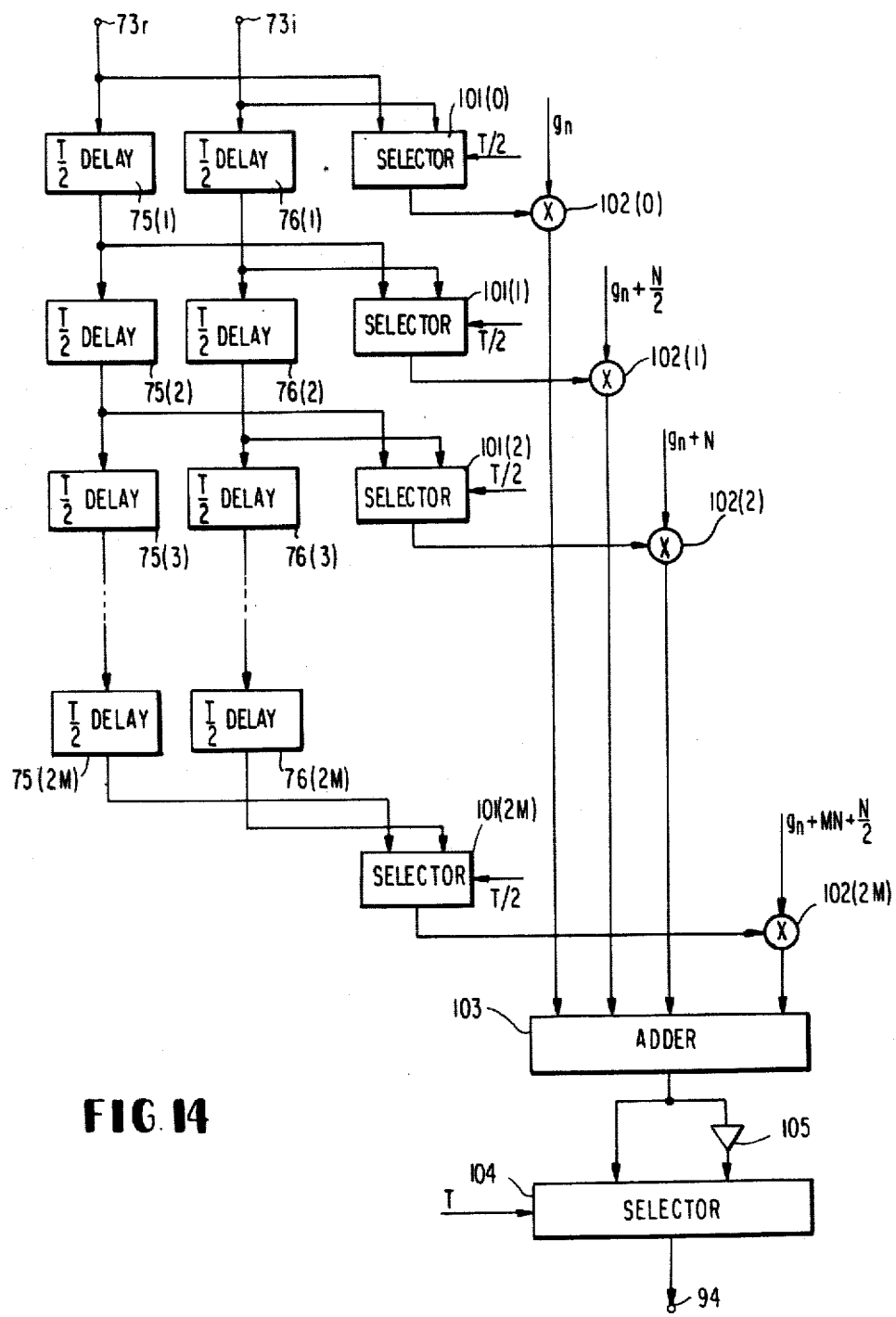
FIG. 14 is a block diagram of a combination of a slow real low-pass filter and an offset circuit unit for use in the transmitter depicted in FIG. 9.

Referring now to FIG. 14, a combination of the K-th slow real low-pass FIR digital filter $G_K(z^{N/2})$ and the K-th circuit unit of the first offset circuit 91 is for reducing the number of multipliers 77(0) through 77(2M) and 78(0) through 78(2M) described in conjunction with FIG. 11 to a half. The combination comprises the K-th polyphase circuit input terminal pair 73r and 73i, the first and the second tapped delay circuits, the first through the 2M-th T/2-second delay units of the first and the second tapped delay circuits 75(1) to 75(2M) and 76(1) to 76(2M), and the K-th offset circuit output terminal 94, all described with reference to FIGS. 11 and 12 or 13.

In FIG. 14, the combination further comprises zeroth through 2M-th one-out-of-two selectors 101(0), 101(1), ..., and 101(2M), each having a first and a second selector input terminal and controlled by T/2-second control clocks. The first selector input terminals of the selectors 101(0) through 101(2M) are connected to the zeroth through the 2M-th taps of the first tapped delay circuit, respectively. The second selector input terminals of the selectors 101(0) through 101(2M) are connected to the zeroth through the 2M-th taps of the second tapped delay circuit, respectively. Zeroth through 2M-th multipliers 102(0), 102(1), ..., and 102(2M) are for multiplying the signals successively selected by the zeroth through the 2M-th selectors 101(0) to 101(2M) by the filter coefficients $g_n$, $g_{n+N/2}$, $g_{n+N}$, ..., and $g_{n+MN+N/2}$, respectively. A single (2M+1)-input adder 103 supplies the summed up products to a first and a second selector input terminal of an additional one-out-of-two selector 104 directly and through an inverter 105, respectively. The additional selector 104 is controlled by T-second control clocks and supplies the K-th offset circuit output terminal 94 with real signals that are successively selected by the additional selector 104 and correspond to the K-th output real sample sequence of the first offset circuit 91. Each T-second period of the T-second control clocks should cover those two T/2-second periods of the T/2-second control clocks during which a pair of tap output signals of the first and the second tapped delay circuits is selected in succession by each of the zeroth through the 2M-th selectors 101(0) to 101(2M).

Figure 15:
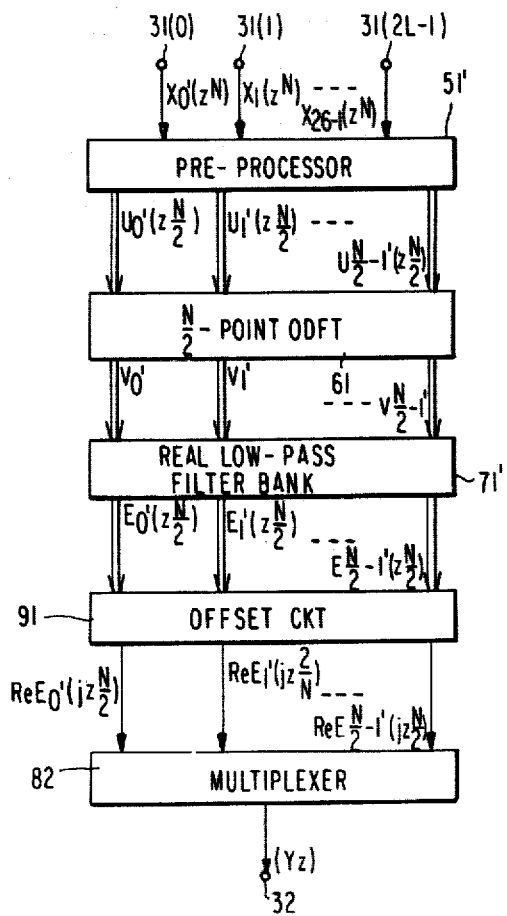
FIG. 15, drawn on the right side of FIG. 8, is a block diagram of a converter according to a fourth embodiment of this invention, which serves again as a transmitter.

Turning to FIG. 15, a converter according to a fourth embodiment of this invention is for implementing the modified principles again as a transmitter when it is possible to select ½ as the fractional number b. The transmitter comprises similar parts designated by like reference numerals as in FIG. 9. The zeroth through the (N/2−1)-th real output sample sequences of the illustrated single offset circuit 91 or of a combination of the illustrated single polyphase circuit 71' and the offset circuit 91 are supplied directly to the time-division multiplexing circuit 82. This is because the output real QAM sample sequence Y(z) is given by:

$$Y(z) = \sum_{n=0}^{N/2-1} z^{-n} \cdot Re[E_n'(jz^{N/2})].$$

Turning far back to the receiver described in conjunction with FIG. 1, it is possible as follows to carry out mere substitution of digital signal processing for the analog signal processing to derive a merely digitally processing receiver. For simplicity of description, let the orthogonally multiplexed input QAM sample sequence Y(z) be of the fast sampling rate $f_s$. Furthermore, let each of the receiver baseband filters 47(0) through 47(2L−1) be of those same characteristics as the transmitter baseband filters 42(0) through 42(2L−1), which are represented in z-transform again by G(z). By the use of the simplified denotation $p_k$ defined in connection with Equation (2), the zeroth through the (L−1)-th and the L-th through the (2L−1)-th receiver filter output sample sequences, denoted by $F_k(z)$ and $F_{L+k}(z)$ for $0 \leq k \leq L-1$, are given by:

$$F_k(z) = [Y(p_k \cdot z) + Y(p_k^{-1} \cdot z)] \cdot G(z)/2$$

and $$F_{L+k}(z) = j[Y(p_k \cdot z) - Y(p_k^{-1} \cdot z)] \cdot G(z)/2$$

when k represents even integers even integers, and by:

$$F_k(z) = j[Y(p_k \cdot z) - Y(p_k^{-1} \cdot z)] \cdot G(z)/2$$

and $$F_{L+k}(z) = [Y(p_k \cdot z) + Y(p_k^{-1} \cdot z)] \cdot G(z)/2$$

when k represents odd integers. Let receiver filter output complex sample sequences $\tilde{x}^{(0)}{}_k(z)$ be defined, when k represents even and odd integers, by:

$$\tilde{x}^{(0)}{}_k(z) = F_k(z) + jF_{L+k}(z)$$

and $$\tilde{x}^{(0)}{}_k(z) = F_{L+k}(z) + jF_k(z),$$

respectively. From the three above-given sets of equations:

$$\tilde{x}^{(0)}{}_k(z) = Y(p_k^{-1} \cdot z) \cdot G(z). \tag{21}$$

The input real QAM sample sequence Y(z) and the receiver baseband filters G(z)'s are demultiplexed according to:

$$Y(z) = \sum_{n=0}^{N-1} z^{-n} \cdot Y_n(z^N) \tag{22}$$

$$G(z) = \sum_{m=0}^{N-1} z^m \cdot G_m(z^N). \tag{23}$$

From Equations (21) through (23):

$$\tilde{x}_k^{(0)}(z) = \left[ \sum_{n=0}^{N-1} p_k{}^n \cdot Y_n(p_0^{-N} \cdot z^N) \right] \cdot \left[ \sum_{m=0}^{N-1} z^{m-n} \cdot G_m(z^N) \right]. \tag{24}$$

Inasmuch as the input real PAM sample sequences $X_0(z^N)$ through $X_{2L-1}(z^N)$ are sampled at the basic slow sampling rate 1/T and selectively given, in the transmitter described in connection with FIG. 2, a common delay of T/2 second, it is possible to obtain zeroth through (L−1)-th reproduced complex PAM sample sequences $\tilde{x}_0(z^{N/2})$ through $\tilde{x}_{L-1}(z^{N/2})$ by sampling the filter output complex sample sequences given by Equation (24) as sample sequences of the fast sampling rate $f_s$ at the second slow sampling rate 2/T. Therefore:

$$\tilde{x}_k(z^{N/2}) = \tag{25}$$
$$\sum_{n=0}^{N/2-1} p_k{}^n \cdot Y_n(p_0^{-N} \cdot z^N) \cdot [G_n(z^N) + z^{N/2} \cdot G_{n+N/2}(z^N)] +$$
$$\sum_{n=N/2}^{N-1} p_k{}^n \cdot Y_n(p_0^{-N} \cdot z^N) \cdot [z^{-N/2} \cdot G_{n-N/2}(z^N) + G_n(z^N)].$$

It is possible, by the use of the base of N-point DFT processing $q_N$ introduced in connection with Equation (7), to rewrite Equation (25) into:

$$\tilde{x}_k(z^{N/2}) = \sum_{n=0}^{N-1} p_0^n \cdot q_N^{kn} \cdot H_n(z^{N/2}), \tag{26}$$

where, when $H_n(z^{N/2})$ is written by $H_n'(z^{N/2})$ and $H_n''(z^{N/2})$ for $0 \leq n \leq N/2 - 1$ and for $N/2 \leq n \leq N-1$, respectively:

$$H_n'(z^{N/2}) = Y_n(p_0{}^{-N} \cdot z^N) \cdot [G_n(z^N) + z^{N/2} \cdot G_{n+N/2}(z^N)]$$

and $$H_n''(z^{N/2}) = Y_n(p_0{}^{-N} \cdot z_N) \cdot z^{-N/2} \cdot [G_{n-N/2}(z^N) + z^{N/2} \cdot G_n(z^N)].$$

It is now possible to directly implement the merely digitally processing receiver by subjecting a concatenation of complex sample sequences $H_n'(z^{N/2})$ and $H_n''(z^{N/2})$ to multiplication by frequency offset factors $p_0{}^n$, respectively, and then to N-point DFT processing (the processes being known in the art as inverse offset DFT processing, with inverse offset DFT abbreviated to IODFT). The direct implementation is, however, defective in that former half N/2-point data $H_n'(z^{N/2})$ for the N-point IODFT processing must be derived by causing partial basic-rate sample sequences $Y_n(p_0{}^{-N} \cdot z^N)$ for $0 \leq n \leq N/2 - 1$ to pass through low-pass filters $[G_n(z^N) + z^{N/2} \cdot G_{n+N/2}(z^N)]$, respectively, and that latter half N/2-point data $H_n''(z^{N/2})$ must be derived by giving a common delay of T/2 second to the partial basic-rate sample sequences $Y_n(p_0{}^{-N} \cdot z^N)$ for $0 \leq n \leq N/2 - 1$ and then by causing the delayed partial basic-rate sample sequences to pass through similar low-pass filters $[G_n(z^N) + z^{N/2} \cdot G_{n+N/2}(z^N)]$, respectively. Switches controlled at the second slow sampling rate 2/T are therefore indispensable. Furthermore, N-point IODFT processing is necessary despite the fact that output sample sequences, inherently not more than N/2 points, are required as is clear from Equation (26).

Basic principles of operation of a receiver by which the above-mentioned defects are removed according to this invention, will now be described. It may be mentioned here that Equation (25) was for deriving the reproduced complex PAM sample sequences $x_k(z^{N/2})$ for $0 \leq k \leq L - 1$. As a result of application of the N-point IODFT processing to the merely digitally processing receiver, complex dummy signals, $(N-L)$ in number, were included in Equation (26). By using demultiplexed real sample sequences $Y(z^{N/2})$ of the second slow sampling rate 2/T given, for $0 \leq n \leq N/2 - 1$, by:

$$Y_n(z^{N/2}) = Y_n(z^N) + z^{-N/2} \cdot Y_{n+N/2}(z^N), \tag{27}$$

it is possible to rewrite Equation (25) into:

$$\tilde{x}_k(z^{N/2}) = \sum_{n=0}^{N/2-1} p_k{}^n \cdot Y_n(p_k{}^{-N/2} \cdot z^{N/2}) \cdot G_n(z^{N/2}), \tag{28}$$

where:

$$G_n(z^{N/2}) = G_n(z^N) + z^{N/2} \cdot G_{n+N/2}(z^N).$$

Let it now be assumed merely for simplicity of description that the even number N is equal to an integral multiple of four. At first, Equation (28) is further rewritten into:

$$\tilde{x}_k(z^{N/2}) = \sum_{n=0}^{N/2-1} q_N^{(k+a+b)n} \cdot Y_n(q_2{}^{-k-a-b} \cdot z^{N/2}) \cdot G_n(z^{N/2}), \tag{29}$$

by the use of the integer a and the fractional number b introduced in connection with Equation (9). When the reproduced complex PAM sample sequences are renumbered into $(2k-a)$-th and $(2k+1-a)$-th baseband complex PAM sample sequences, where k is temporarily representative of integers satisfying $0 \leq k \leq N/4 - 1$, Equation (29) is rearranged into:

$$\left.\begin{aligned}\tilde{x}_{2k-a}(z^{N/2}) &= \sum_{n=0}^{N/2-1} q_{N/2}^{kn} \cdot q_N^{bn} \cdot Y_n(q_2{}^{-b} \cdot z^{N/2}) \cdot G_n(z^{N/2}) \\ \text{and } \tilde{x}^*_{2k+1-a}(z^{N/2}) &= \sum_{n=0}^{N/2-1} q_N^{(N-2k-2)n} \cdot q_N^{(1-b)n} \\ &\quad \times Y_n(q_2{}^{-1+b} \cdot z^{N/2}) \cdot G_n(z^{N/2}),\end{aligned}\right\} \tag{30}$$

with the base of N/2-point inverse DFT processing $q_{N/2}$ used only in the first of Equations (30).

When the $(2k+1-a)$-th baseband complex PAM sample sequences are further renumbered into $(N-2k-1-a)$-th ones for $N/4 \leq k \leq N/2 - 1$, it is now possible to rewrite Equations (30), by the use of modified complex PAM sample sequences $\tilde{x}_{2k-a}(jz^{N/2})$ for $0 \leq k \leq N/4 - 1$ and $\tilde{x}_{N-2k-1-a}{}^x(jz^{N/2})$ for $N/4 \leq k \leq N/2 - 1$, into:

$$\tilde{x}_{2k-a}(jz^{N/2}) = \sum_{n=0}^{N/2-1} q_{N/2}^{kn} \cdot q_N^{n/2} \cdot \tilde{e}_n(z^{N/2}) \cdot G_n(jz^{N/2}) \tag{31}$$

and, $$\tilde{x}^*_{N-2k-1-a}(jz^{N/2}) = \sum_{n=0}^{N/2-1} q_{N/2}^{kn} \cdot q_N^{n/2} \cdot \tilde{e}_n{}^*(z^{N/2}) \cdot G_n(jz^{N/2}), \tag{32}$$

where $x_{N-2k-a}$ and $x_{N-2k-1-a}$ are complex dummy signals, $(N/2-L)$ in number, unless $(2k-a)$ and $(N-2k-1-a)$ represent $0, 1, \ldots,$ and $L-1$. Also, $\tilde{e}_n(z^{N/2})$ designate what may be called pre-processed complex sample sequences defined by:

$$\tilde{e}_n(z^{N/2}) = q_N^{(b-\frac{1}{2})n} \cdot Y_n(q_2{}^{\frac{1}{2}-b} \cdot z^{N/2}), \tag{33}$$

for $0 \leq n \leq N/2 - 1$. Furthermore, it is possible to define N/2-point IODFT'ed complex sample sequences of first and second kinds $\tilde{u}_k'(z^{N/2})$ and $\tilde{u}_k''(z^{N/2})$, both for $0 \leq k \leq N/2 - 1$, by the right side of Equations (31) and (32), respectively. Therefore:

$$\left.\begin{aligned}\text{and } \tilde{x}_{2k-a}(jz^{N/2}) &= \tilde{u}_k'(z^{N/2})|_{k=0}^{N/4-1} \\ \tilde{x}^*_{N-2k-1-a}(jz^{N/2}) &= \tilde{u}_k''(z^{N/2})|_{k=N/4}^{N/2-1}\end{aligned}\right\} \tag{34}$$

The reproduced complex PAM sample sequences $\tilde{x}_{2k-a}(z^{N/2})$ and $\tilde{x}_{2k-1-a}(z^{N/2})$, both for $0 \leq k \leq N/4 - 1$, are obtained from the modified complex PAM sample sequences and consequently from the first-kind and the second-kind IODFT'ed complex sample sequences according to:

$$\left.\begin{array}{l}\tilde{x}_{2k-a}(z^{N/2}) = \tilde{u}_k{}'(-jz^{N/2})|_{k=0}^{N/4-1}\\ \text{and}\\ \tilde{x}_{2k-1-a}(z^{N/2}) = \tilde{u}_{N/2-k}^{''*}(-jz^{N/2})|_{k=0}^{N/4-1},\end{array}\right\} \quad (35)$$

where $\tilde{x}_{2k-a}$ and $\tilde{x}_{2k-1-a}$ represent complex dummy signals unless $(2k-a)$ and $(2k-1-a)$ are equal to 0, 1, . . . , and $L-1$.

In each of Equations (28) through (30) and the intervening equations, $G_n(z^{N/2})$ represents, for $0 \leq n \leq N/2 - 1$, a bank of slow real low-pass FIR digital filters operable at the second slow sampling rate $2/T$ and having frequency responses in which amplitude transfer characteristics are congruent with one another and have a common effective bandwidth of $1/(2T)$ hertzes and in which phase transfer characteristics are linear in the passband and have slopes stepwise different from one another. Therefore, $G_n(jz^{N/2})$ used in each of Equations (31) and (32) represents, again for $0 \leq n \leq N/2 - 1$, a bank of slow complex band-pass FIR digital filters obtained by subjecting the slow real low-pass filters to a common frequency shift of $q_N^{\frac{1}{4}}$. Consequently, the slow complex band-pass filters of each bank are operable also at the second slow sampling rate $2/T$ and have frequency responses in which amplitude transfer characteristics are again congruent with one another and have a common effective bandwidth of $1/T$ hertzes and in which transfer characteristics are linear in the passband and have slopes stepwise different from one another.

Equations (31) through (35) show the following facts. The reproduced complex PAM sample sequences $\tilde{x}_{2k-a}(z^{N/2})$ for $0 \leq k \leq N/4 - 1$ are obtained from former half $N/4$-point output data of the first-kind IODFT'ed complex sample sequences $\tilde{u}_k{}'(z^{N/2})$ that, in turn, are obtained by $N/2$-point IODFT processing a set of $N/2$-point input data derived by causing the pre-processed complex sample sequences $\tilde{e}_n(z^{N/2})$ to pass through a first bank of slow complex band-pass filters $G_n(jz^{N/2})$, respectively. The reproduced complex sample sequences $\tilde{x}_{2k-1-a}(z^{N/2})$, again for $0 \leq k \leq N/4 - 1$, are obtained from latter half $N/4$-point output data of the second-kind IODFT'ed complex sample sequence $\tilde{u}_k{}''(z^{N/2})$ or $\tilde{u}_{N/2-k}{}''(z^{N/2})$ that, in turn, are obtained by $N/2$-point IODFT processing another set of $N/2$-point input data derived by causing the conjugate complex pre-processed sample sequences $\tilde{e}_n{}^x(z^{N/2})$ to pass through a second set of slow complex band-pass filters $G_n(jz^{N/2})$, respectively. For convenience of the description that follows, filtered complex sample sequences produced by the first and the second banks will be denoted by $\tilde{v}_n{}'$ and $\tilde{v}_n{}''$, respectively.

Figure 16:
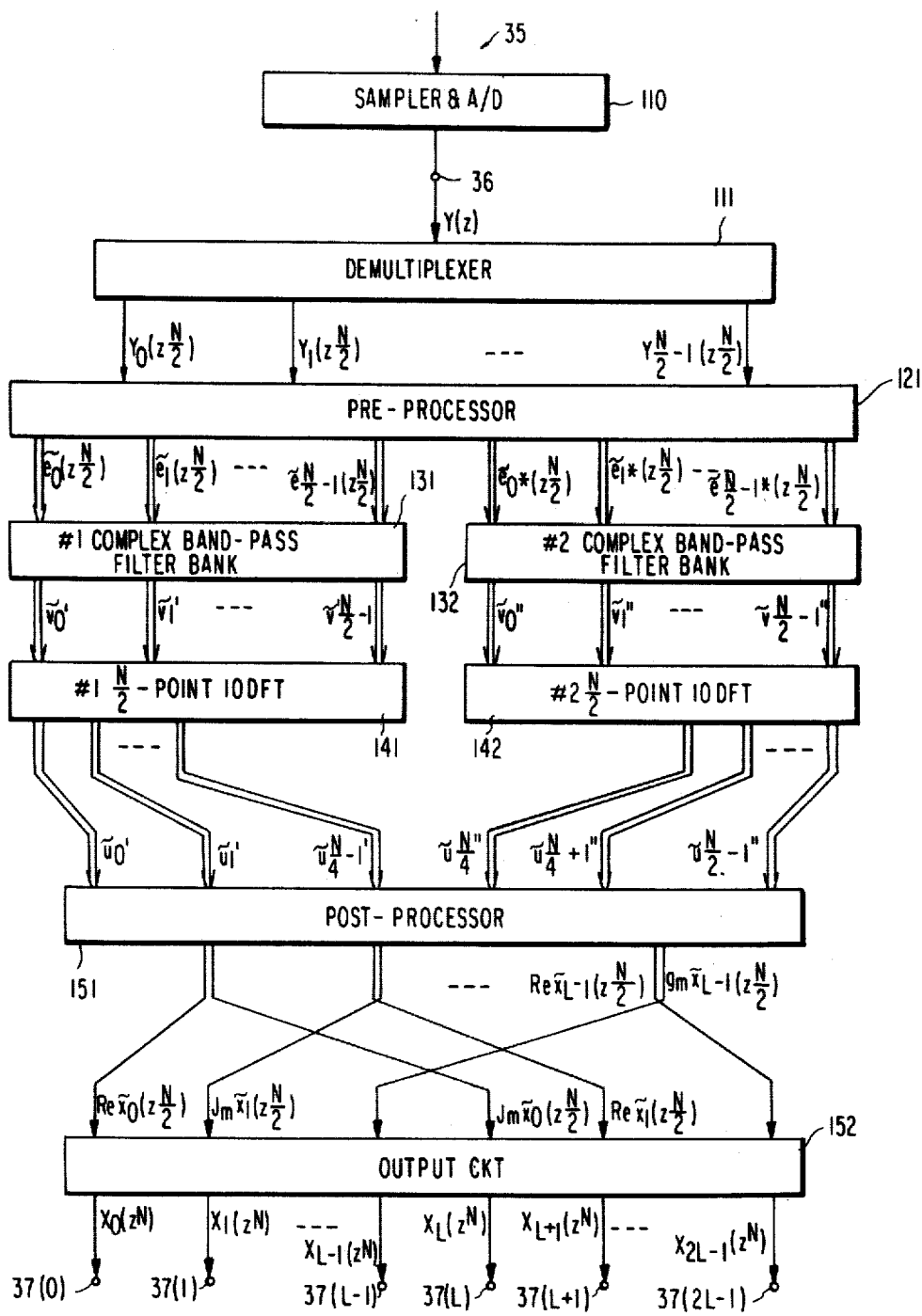
FIG. 16 is a block diagram of a digital-processing type orthogonally multiplexed QAM signal converter according to a fifth embodiment of this invention, which converter is now operable as a receiver.

Referring now to FIG. 16, let the even number N be still equal to an integral multiple of four. A digital processing type orthogonally multiplexed QAM signal converter according to a fifth embodiment of this invention is for use as a receiver and has a receiver input terminal 36 and zeroth through (2L−1)-th receiver output terminals 37(0) to 37(2L-1). When the transmission channel 35 is for an analog signal as described in the above-cited Maruta Patent, a sampling and analog-to-digital conversion circuit 110 should be used prior to the receiver input terminal 36, as herein called, to supply the latter with an orthogonally multiplexed input real QAM sample sequence Y(z) of the fast sampling rate $f_s$. The receiver comprises a demultiplexing circuit 111 for demultiplexing the real QAM sample sequence into zeroth through (N/2−1)-th demultiplexed real sample sequences $Y_n(z^{N/2})$ of the second slow sampling rate $2/T$ according to Equations (22) and (27).

Figure 17:
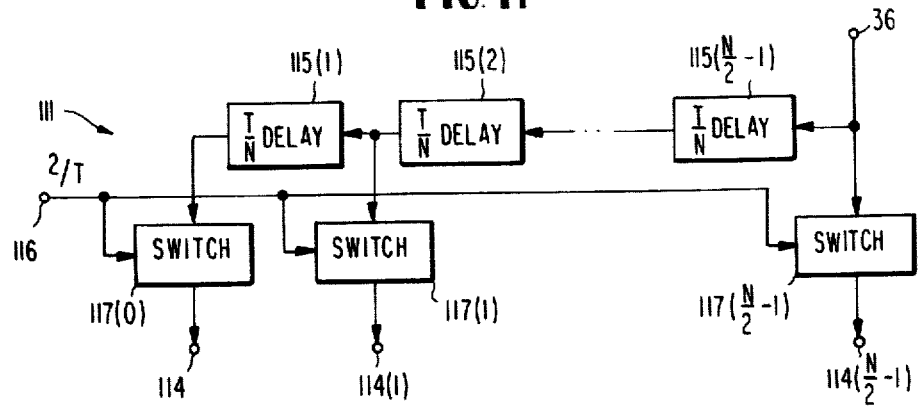
FIG. 17, depicted below

Turning to FIG. 17 for a short while, the demultiplexing circuit 111 comprises zeroth through (N/2−1)-th demultiplexer output terminals 114(0), 114(1), . . . , and 114(N/2−1). The input terminal of the demultiplexing circuit 111 is the receiver input terminal 36. The demultiplexing circuit 111 may comprise first through (N/2−1)-th T/N-second delay units 115(1), 115(2), . . . , and 115(N/2−1), which are successively serially connected to form a tapped delay circuit having a zeroth tap at one end and an (N/2−1)-th tap at the other end. The (N/2−1)-th tap is connected to the input terminal 36 to supply the input real QAM sample sequence Y(z) to the (N/2−1)-th delay unit 115(N/2−1). Control clocks of a clock period of $2/T$ hertzes are supplied to a control input terminal 116. Zeroth through (N/2−1)-th switches 117(0), 117(1), . . . , and 117(N/2−1) are connected to the zeroth through the (N/2−1)-th taps, respectively, and controlled by the control clocks to supply the output terminals 114(0) through 114(N/2−1) with the demultiplexed real sample sequences $Y_0(z^{N/2})$, $Y_1(z^{N/2})$, . . . , and $Y_{N/2-1}(z^{N/2})$, respectively.

Referring back to FIG. 16, the receiver comprises a pre-processor 121 for subjecting the demultiplexed real sample sequences $Y_n(z^{N/2})$ to a common frequency shift of $q_2^{\frac{1}{4}-b}$ and then to multiplication by complex factors $q_N(b-\frac{1}{2})n$. respectively, to produce pre-processed complex sample sequences $e_n(z^{N/2})$ for $0 \leq n \leq N/2 - 1$ according to Equation (33). In the meantime, the pre-processor 121 produces conjugate complex pre-processed sample sequences $\tilde{e}_n{}^x(z^{N/2})$, again for $0 \leq n \leq N/2 - 1$. As the case may be, the pre-processed complex sample sequences and the conjugate complex pre-processed sample sequences will be referred to as pre-processed complex sample sequences of a first and a second kind, respectively.

Figure 18:
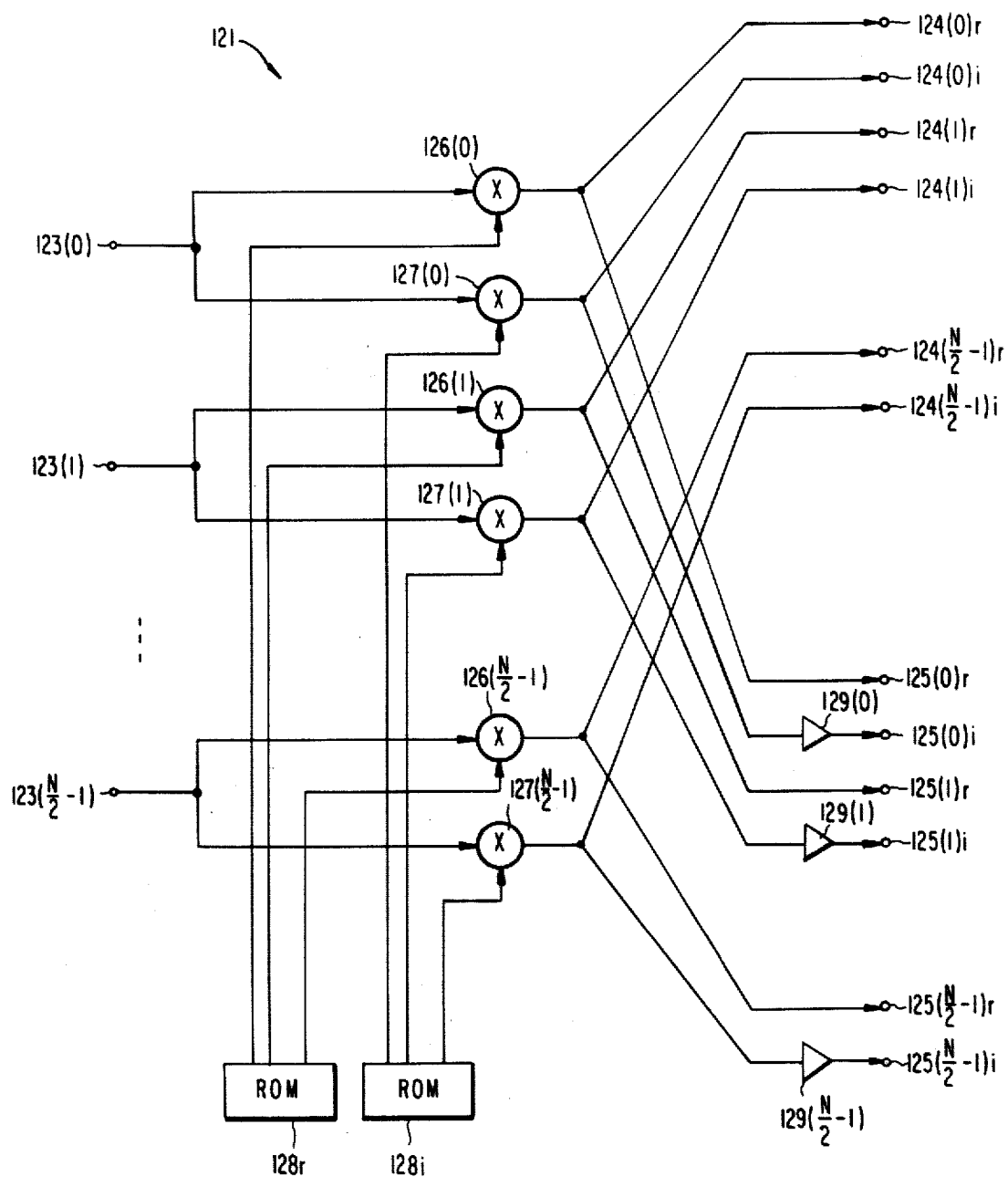
FIG. 18 is a block diagram of a pre-processor for use in the receiver depicted in FIG. 16.

Turning temporarily to FIG. 18, let $(\frac{1}{2}-b)$ be rewritten by Q/P as was the case with the post-processor 81 illustrated with reference to FIG. 7. The pre-processor 121 comprises zeroth through (N/2−1)-th pre-processor input terminals 123(0), 123(1), . . . , and 123(N/2−1), zeroth through (N/2−1)-th pre-processor output terminal pairs of a first set 124(0)r, 124(0)i, 124(1)r, 124(1)i, . . . , 124(N/2−1)r, and 124(N/2−1)i, and zeroth through (N/2−1)-th pre-processor output terminal pairs of a second set 125(0)r, 125(0)i, 125(1)r, 125(1)i, . . . , 125(N/2−1)r, and 125(N/2−1)i. The pre-processor 121 may comprise zeroth through (N/2−1)-th multipliers of a first group 126(0), 126(1), . . . , and 126(N/2−1) having inputs connected to the input terminals 123(0) through 123(N/2−1), respectively, zeroth through (N/2−1)-th multipliers of a second group 127(0), 127(1), . . . , and 127(N/2−1) having inputs connected also to the input terminals 123(0) through 123(N/2−1), respectively, and first and second read-only memories 128r and 128i for producing real and imaginary parts, respectively, of successive groups of complex factors $q_N^{Q(N\phi/2+n)/P}$ as the post-processor read-only memories 87r and 87i did.

In FIG. 18, a K-th first-group multiplier 126(K) (K being representative of only one of n, namely, 0 through N/2−1) multiplies a K-th demultiplexed real sample sequence $Y_K(z^{N/2})$ supplied to the K-th input terminal 125(K) by real parts of successive groups of the complex factors cos $[2\pi Q(N\phi/2+n)/(PN)]$ and delivers the successive products to one each of the K-th first-set and second-set output terminals 124(K)r and 125(K)r as real samples of the K-th pre-processed complex sample sequences $\tilde{e}_K(z^{N/2})$ and of the K-th conjugate complex pre-processed sample sequence $\tilde{e}_K{}^x(z^{N/2})$, respectively. A K-th second-group multiplier 127(K) multiplies the K-th demultiplexed real sample sequence $Y_K(z^{N/2})$ by imaginary parts of successive groups of the complex factors sin $[2\pi Q(N\phi/2+n)/(PN)]$ and supplies the other K-th first-set and second-set output terminals 124(K)i and 125(K)i directly and through a K-th one of zeroth through (N/2−1)-th inverters 129(0), 129(1), . . . , and 129(N/2−1), respectively, with the successive products as imaginary parts of the K-th pre-processed complex sample sequence and of the K-th conjugate complex pre-processed sample sequence.

Reviewing FIG. 16, it is now understood that the demultiplexing circuit 111 and the pre-processor 121 serve in combination as pre-processing means for digitally converting the input real QAM sample sequence Y(z) to pre-processing means output complex sample sequences of twice the basic slow sampling rate. The number of pre-processing means output complex sample sequences is equal to the even integer N in the embodiment being illustrated. The pre-processing means output complex sample sequences consist of the first-kind and the second-kind pre-processed complex sample sequences $\tilde{e}_n(z^{N/2})$ and $\tilde{e}_n{}^x(z^{N/2})$.

In FIG. 16, the receiver comprises first and second polyphase circuits 131 and 132. Each polyphase circuit 131 or 132 comprises a bank of slow complex band-pass FIR digital filters $G_n(jz^{N/2})$, where $0 \leq n \leq N/2-1$. The first-kind pre-processed complex sample sequences $e_n(z^{N/2})$ are caused to pass through the respective complex band-pass filters of the first polyphase circuit 131 to provide zeroth through (N/2−1)-th filtered complex sample sequences of a first kind $\tilde{v}_n'$, respectively. The second-kind pre-processed complex sample sequences $\tilde{e}_n{}^x(z^{N/2})$ are caused to pass through the respective complex band-pass filters of the second polyphase circuit 132 to become zeroth through (N−2−1)-th filtered complex sample sequences of a second kind $\tilde{v}_n''$, respectively.

Figure 19:
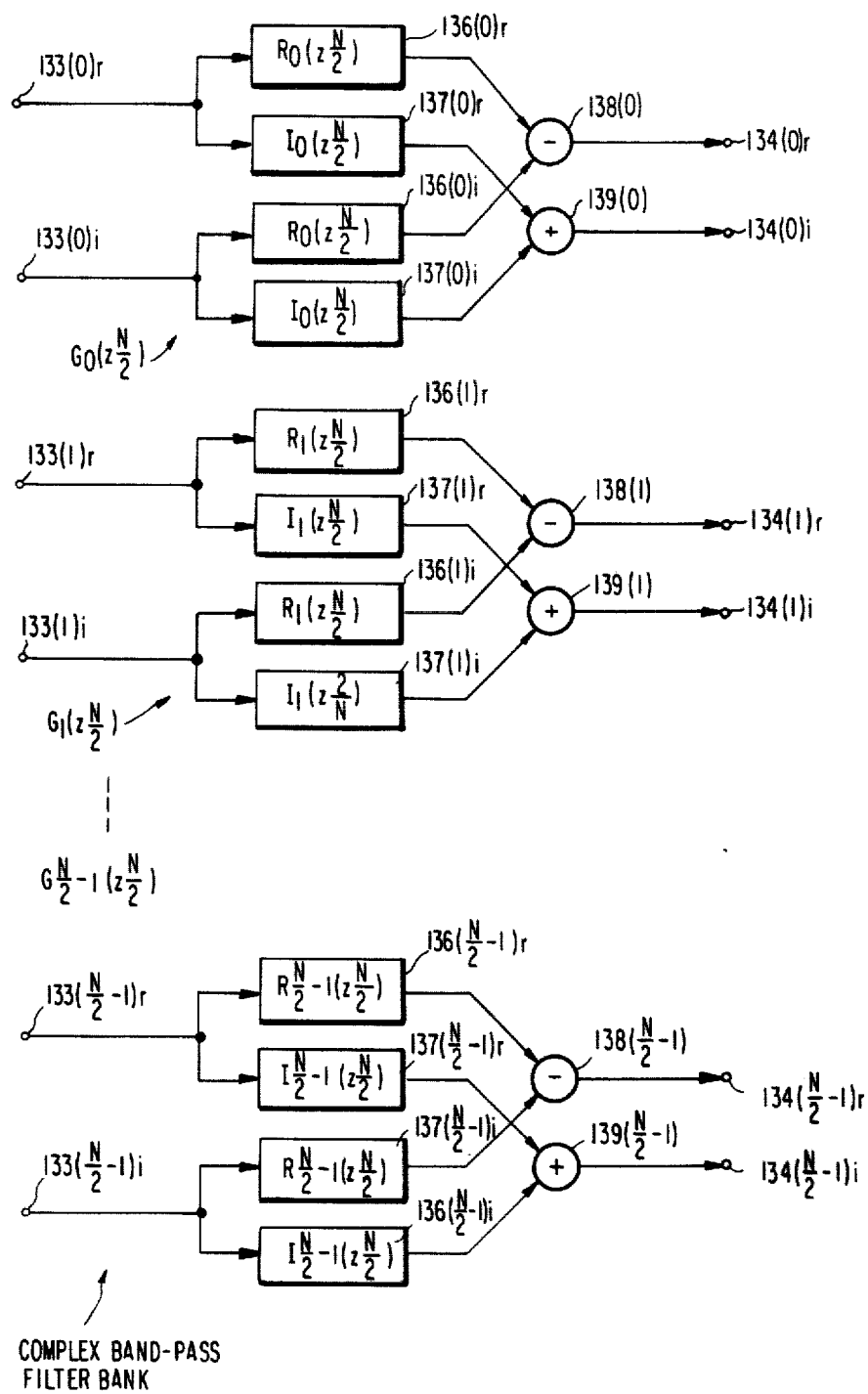
FIG. 19 is a block diagram of a bank of slow complex band-pass filters for use in the receiver shown in FIG. 16.

Referring temporarily to FIG. 19, the first polyphase circuit 131 comprises zeroth through (N/2−1)-th polyphase circuit input terminals pairs 133(0)r, 133(0)i, 133(1)r, 133(1)i, . . . , 133(N/2−1)r, and 133(N/2−1)i and zeroth through (N/2−1)-th polyphase circuit output terminal pairs 134(0)r, 134(0)i, 134(1)r, 134(1)i, . . . , 134(N/2−1)r, and 134(N/2-1)i. Real and imaginary parts of a K-th first-kind pre-processed complex sample sequence $u_K(z^{N/2})$ (K being representative of only one of n) are supplied to the K-th pair of input terminals 133(K)r and 133(K)i, respectively. A K-th slow complex band-pass FIR digital filter $G_K(z^{N/2})$ may comprise a K-th pair of slow real band-pass FIR digital filters 136(K)r and 136(K)i connected to the K-th pair of input terminals 133(K)r and 133(K)i, respectively, a K-th pair of slow imaginary band-pass FIR digital filters 137(K)r and 137(K)i connected also to the K-th pair of input terminals 133(K)r and 133(K)i, resipectively, a K-th subtractor 138(K) connected to the K-th pair of real band-pass filters 136(K)r and 136(K)i, and a K-th adder 139(K) connected to the K-th pair of imaginary band-pass filters 137(K)r and 137(K)i. Each of the K-th real band-pass filters 136(K)r and 136(K)i has an impulse response $R_K(z^{N/2})$ that is identical with the real part of the impulse response of the K-th complex band-pass filter $G_K(jz^{N/2})$. Each of the K-th imaginary band-pass filters 137(K)r and 137(K)i has an impulse response $I_K(z^{N/2})$ that is identical with the imaginary part of the impulse response of the K-th complex band-pass filter.

In FIG. 19, the K-th subtractor 138(K) subtracts a K-th real band-pass filter output sample sequence produced by the K-th real band-pass filter 136(K)i in response to the imaginary part of the K-th first-kind pre-processed complex sample sequence $\tilde{e}_K(z^{N/2})$ from another K-th real band-pass filter output sample sequence produced by the other K-th real band-pass filter 136(K)r in response to the real part of the K-th pre-processed complex sample sequence $\tilde{e}_K(z^{N/2})$ to deliver the real part of the K-th filtered complex sample sequence $\tilde{v}_K'$ to one of the K-th polyphase circuit output terminals 136(K)r. The K-th adder 139(K) sums up a K-th imaginary band-pass filter output sample sequence pair produced by the K-th imaginary band-pass filter pair 137(K)r and 137(K)i to supply the other K-th polyphase circuit output terminal 134(K)i with the imaginary part of the K-th filtered complex sample sequence $\tilde{v}_K'$. Each of the K-th real band-pass filter pair 136(K)r and 136(K)i and the K-th imaginary band-pass filter pair 137(K)r and 137(K)i may be of the structure illustrated with reference to FIG. 6. Each of the subtractors 136(0) through 138(N/2−1) and the adders 139(0) through 139(N/2−1) corresponds to the selector 80.

The second polyphase circuit 132 may be identical in structure to the first polyphase circuit 131. Responsive to the conjugate complex pre-processed sample sequences $\tilde{e}_n{}^x(z^{N/2})$, the complex band-pass filter bank of the second polyphase circuit 132 produces the second-kind filtered complex sample sequences $\tilde{v}_n''$.

Figure 20:
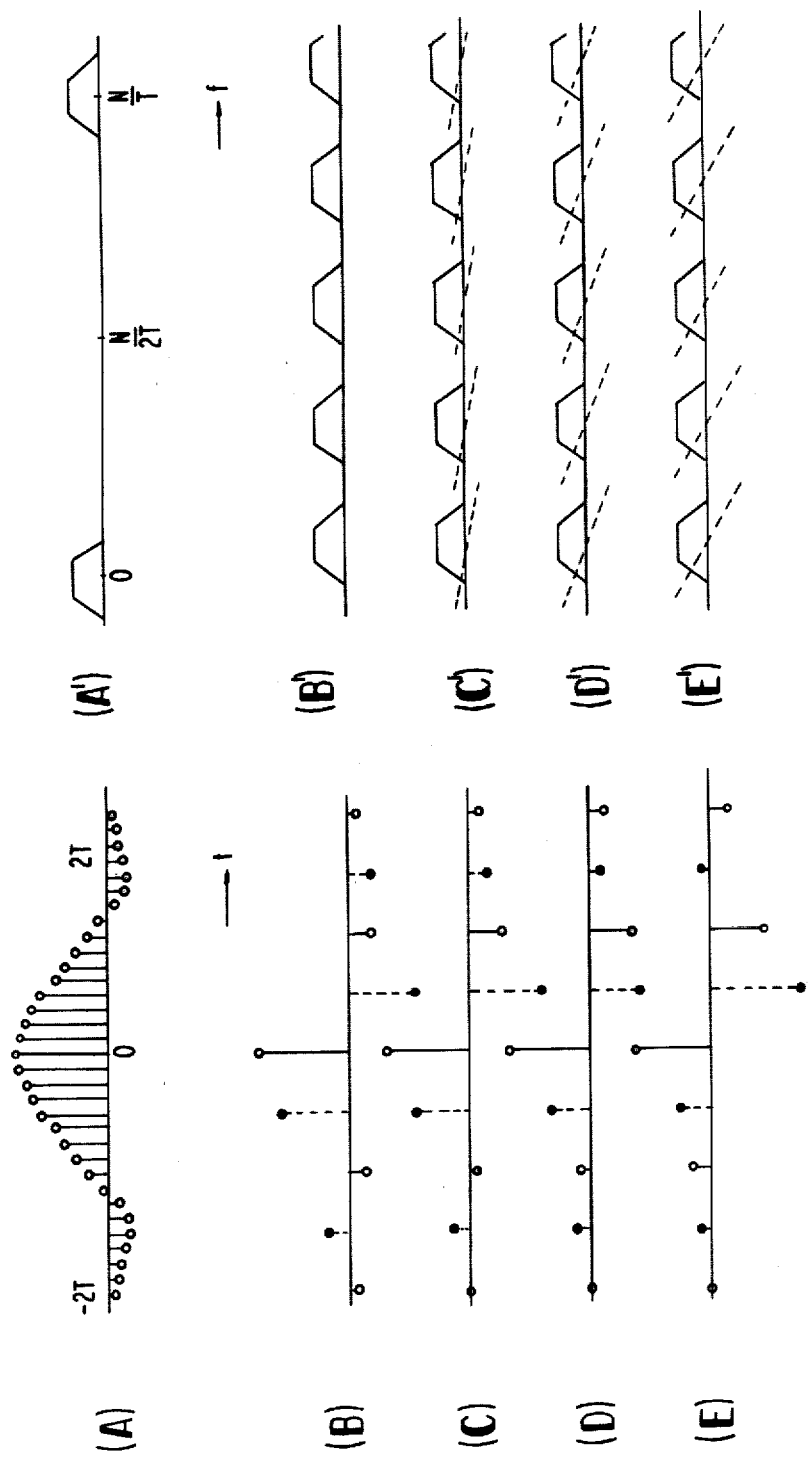
FIG. 20 shows impulse responses and frequency transfer characteristics of a basic fast low-pass filter and a bank of slow complex band-pass filters, which bank is for use in a specific example of the receiver depicted in FIG. 16.

Further turning to FIG. 20, let N=8 with the result that the slow complex band-pass filter bank consists of zeroth through third slow complex band-pass FIR digital filters $G_0(jz^{N/2})$, $G_1(jz^{N/2})$, $G_2(jz^{N/2})$, and $G_3(jz^{N/2})$. Also, let the order J of a fast low-pass FIR digital filter G(z) from which the zeroth through the third slow complex band-pass filters are derived, be thirty-two as in the description related to FIG. 5. The impulse response and the frequency transfer characteristic of the fast low-pass filter are reproduced for reference along left and right top lines (A) and (A'), respectively. The impulse responses of the zeroth through the third complex band-pass filters are illustrated along four left-side lines (B), (C), (D), and (E), respectively. The frequency transfer characteristics are depicted along four right-side lines (B'), (C'), (D'), and (E'), respectively. The impulse responses and the frequency transfer characteristics shown herein are in correspondence to the respective impulse responses and frequency transfer characteristics shown along the corresponding lines (B) to (E) and (B') to (E') in FIG. 5.

Referring back to FIG. 16 again, the receiver comprises first and second N/2-point IODFT processors 141 and 142. Supplied with the first-kind filtered complex sample sequences $v_n'$ as N/2-point input data, the first IODFT processor 141 carries out N/2-point IODFT processing as specified by the right side of Equation (31) and produces only former half N/4-point data, namely, zeroth through (N/4−1)-th ones, of N/2-point or zeroth through (N/2−1)-th IODFT'ed complex sequences of a first kind $\tilde{u}_K'(z^{N/2})$. Responsive to the second-kind filtered complex sample sequences $\tilde{v}_n''$, the second IODFT processor 142 carries out N/2-point IODFT processing as indicated by the right side of Equation (32) and produces only latter half N/4-point data, namely, N/4-th through (N/2−1)-th ones or (N/2−N/4)-th through (N/2−1)-th ones, of N/2-point IODFT'ed complex sample sequences of a second kind $\tilde{u}_k''(z^{N/2})$. It is possible to understand that the former half N/4-point output data and the latter half N/4-point output data serve in combination as IODFT processed complex sample sequences, N/2 in number, produced by a combination of the IODFT processors 141 and 142.

Figure 21:
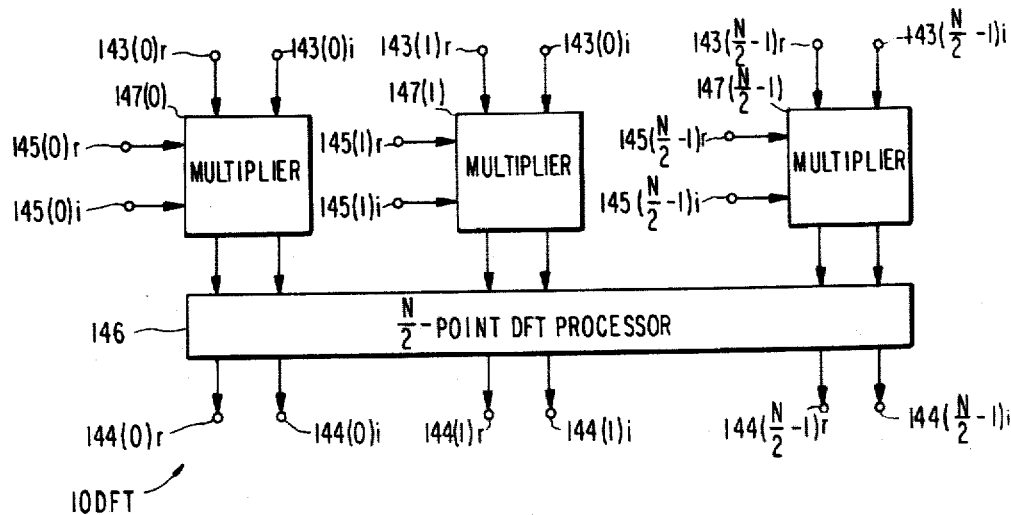
FIG. 21, shown below FIG. 4 together with FIG. 17, is a block diagram of an N/2-point IODFT processor used in the receiver illustrated in FIG. 16.

Referring to FIG. 21 for a short while, each IOFDT processor 141 or 142 comprises zeroth through (N/2−1)-th IODFT processor input terminal pairs 143(0)r, 143(0)i, 143(1)r, 143(1)i, . . . , 143(N/2−1)r, and 143(N/2−1)i and zeroth through (N/2−1)-th IODFT processor output terminal pairs 144(0)r, 144(0)i, 144(1)r, 144(1)i, . . . , 144(N/2−1)r, and 144(N/2−1)i. The IODFT processor 141 or 142 may comprise zeroth through (N/2−1)-th factor input terminal pairs 145(0)r, 145(0)i, 145(1)r, 145(1)i, . . . , 145(N/2−1)r, arg 145(N/2−1)i, an N/2-point DFT processor 146, and zeroth through (N/2−1)-th complex multipliers 147(0), 147(1), . . . , and 147(N/2−1).

In FIG. 21, real and imaginary parts of a K-th filtered complex sample sequence of the first or the second kind $\tilde{v}_K'$ or $\tilde{v}_K''$ (K being again only one of n) are supplied to the K-th pair of input terminals 143(K)r and 143(K)i, respectively. Real and imaginary parts of a K-th frequency offset complex factor $q_N^{K/2}$, namely, a K-th one of zeroth through (N/2−1)-th frequency offset complex factors $q_N^{n/2}$, are supplied to the K-th pair of factor input terminals 145(K)r and 145(K)i, respectively. The K-th complex multiplier 147(K) multiplies the K-th filtered complex sample sequence by the K-th frequency offset complex factor to produce real and imaginary parts of a K-th complex product. The DFT processor 146 carries out DFT processing on the zeroth through the (N/2−1)-th complex products produced by the complex multipliers 147(0) through 147(N/2−1) as N/2-point input data, respectively, to supply the output terminal pairs 144(0)r and 144(0)i through 144(N/2−1)r and 144(N/2−1)i with the zeroth through the (N/2−1)-th IODFT'ed complex sample sequences $\tilde{u}_k'(z^{N/2})$ or $\tilde{u}_k''(z^{N/2})$, respectively. The first and the second IODFT processors 141 and 142 need not have the N/4-th through the (N/2−1)-th and the zeroth through the (N/4−1)-th output terminal pairs, respectively.

It is now clear that the second-kind IODFT'ed complex sample sequences correspond to the first-kind IODFT'ed complex sample sequences, respectively. The zeroth through the (N/4−1)-th output terminal pairs of the first IODFT processor 141 and the N/4-th through the (N/2−1)-th output terminal pairs of the second IODFT processor 142 serve in combination as processor output means responsive to the first-kind and the second-kind IODFT'ed complex sample sequences for producing N/2-point IODFT processed complex sample sequences that consist of predetermined ones, reduced in number to a half of N/2, of the first-kind IODFT'ed complex sample sequences and those of the second-kind IODFT'ed complex sample sequences which correspond to the remaining ones of the first-kind IODFT'ed complex sample sequences, respectively.

In FIG. 16, the receiver comprises a post-processor 151. Responsive to the N/2-point IODFT processed complex sample sequences $\tilde{u}_k'(z^{N/2})$ for $0 \leq k \leq N/4-1$ and $\tilde{u}_k''(z^{N/2})$ for $N/4 \leq k \leq N/2-1$ the post-processor 151 produces zeroth through (L−1)-th baseband complex PAM sample sequences $\tilde{x}_0(z^{N/2})$ to $\tilde{x}_{L-1}(z^{N/2})$ with reference to Equations (35). As remarked, $\tilde{x}_{2k-a}(z^{N/2})$ and $\tilde{x}_{2k-1-a}(z^{N/2})$ become zero (complex dummy signals) unless (2k−a) and (2k−1−a) represent 0, 1, . . . , and L−1. More particularly, a K-th one of even or odd numbered baseband complex PAM sample sequences $\tilde{x}_{2K-a}(z^{N/2})$ (K being now representative of only one of 0 through N/4−1) is obtained by multiplying p-th samples of the K-th first-kind IODFT'ed complex sample sequence $\tilde{u}_K'(z^{N/2})$ successively by $(-j)^p$. Another K-th one of the odd or the even numbered baseband complex PAM sample sequences $\tilde{x}_{2K-1-a}(z^{N/2})$ (K being again only one of 0 through N/4−1) is provided by the conjugate complex sample sequence of a complex sample sequence derived by multiplying p-th samples of the K-th second-kind IODFT'ed complex sample sequence $\tilde{u}_K''(z^{N/2})$ successively by $(-j)^p$.

The post-processor 151 thus digitally converts the N/2-point IODFT processed complex sample sequences to reproduced complex PAM sample sequences, L in number, and also to complex dummy signals, (N/2−L) in number. Although set forth in plural, the complex dummy signals may either be zero or one in number.

Further in FIG. 16, the receiver comprises an output circuit 152 responsive to the zeroth through the (L−1)-th reproduced complex PAM sample sequences for digitally converting the same to the zeroth through the (2L−1)-th reproduced real PAM sample sequences, which are delivered to the receiver output terminals 37(0) through 37(2L−1), respectively. The output circuit 152 may comprise a set of first-kind and second-kind receiver delay circuits 48(0) through 48(L−1) and 49(0) through 49(L−1) described in conjunction with FIG. 1. Real and imaginary parts of a K-th reproduced complex PAM sample sequence $\tilde{x}_K(z^{N/2})$ (K being now only one of 0 through L−1) are supplied to the K-th first-kind and second-kind delay circuits 48(K) and 49(K) when K is an even number. Imaginary and real parts of the K-th reproduced PAM sample sequence are supplied to the K-th first-kind and second-kind delay circuits 48(K) and 49(K) if K is an odd number. Alternatively, a mere conductor (giving a zero-second delay) and a T/2-second delay circuit may be substituted for a pair of equally numbered first-kind and second-kind delay circuits, such as 48(K) and 49(K), respectively.

Figure 22:
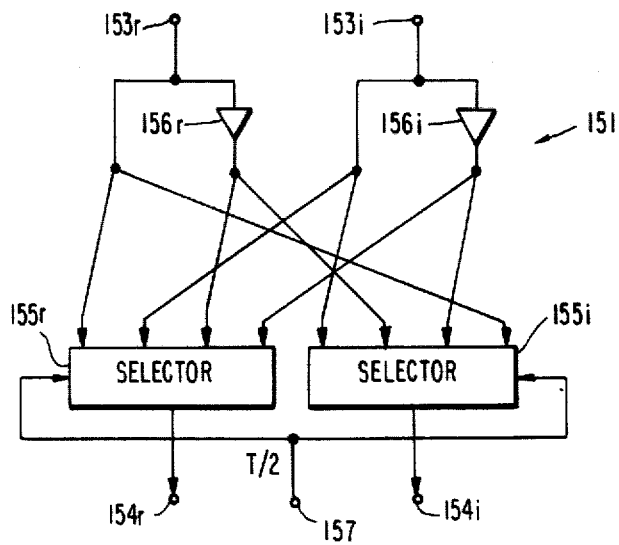
FIG. 22, depicted below

Turning now to FIG. 22, a K-th post-processor circuit unit for a K-th one of the former half N/4-point output data of the first-kind IODFT'ed complex sample sequences $\tilde{u}_K'(z^{N/2})$ comprises a post-processor circuit unit input terminal pair 153r and 153i and a post-processor circuit unit output terminal pair 154r and 154i. Real and imaginary parts of the K-th first-kind IODFT'ed complex sample sequence $\tilde{u}_K'(z^{N/2})$ are supplied to the input terminals 153r and 153i, respectively. The circuit unit may comprise first and second one-out-of-four selectors 155r and 155i, each having a first through a fourth selector input terminal. The real part is supplied to the first input terminal of the first selector 155r and to the fourth input terminal of the second selector 155i. The real part is supplied further to the third input terminal of the first selector 155r and to the second input terminal of the second selector 155i, both through a first inverter 156r. The imaginary part is supplied to the second input terminal of the first selector 155r and to the first input terminal of the second selector 155i. The imaginary part is supplied additionally to the fourth input terminal of the first selector 155r and to the third input terminal of the second selector 155i, both through a second inverter 156i. Controlled by T/2-second control clocks supplied from a control input terminal 157, the selectors 155r and 155i cyclically select the signals supplied to the first through the fourth input terminals to deliver the successively selected signals to the output terminals 154r and 154i, respectively, as real and imaginary parts of the K-th baseband complex PAM sample sequence $\tilde{x}_{2K-a}(z^{N/2})$.

Further referring to FIG. 22, each post-processor circuit unit for a K-th one of the latter half N/4-point output data of the second-kind IODFT'ed complex sample sequences $\tilde{u}_k''(z^{N/2})$ is similar in structure, except that an additional inverter (not shown) should be used between the output of the second selector 155i and the output terminal 154i for the imaginary part. The output terminals 154r and 154i are now supplied with real and imaginary parts of the K-th baseband complex PAM sample sequence $\tilde{x}_{2K-1-a}(z^{N/2})$, respectively.

The above-illustrated receiver is simplified to a considerable extent when it is possible to select the basic slow sampling rate 1/T of the baseband real PAM sample sequences to be multiplexed by a counterpart transmitter to a certain degree as was the case with a transmitter according to a second embodiment of this invention. In this case, the fractional number b can be selected to be equal to ½. The N/2-point IODFT processed complex sample sequences, now designated by $\tilde{u}_k(z^{N/2})$, is given by:

$$\tilde{u}_k(z^{N/2}) = \sum_{n=0}^{N/2-1} q_{N/2}^{kn} \cdot q_N^{n/2} \cdot Y_n(z^{N/2}) \cdot G_n(jz^{N/2}),$$

where $0 \leq k \leq N/2 - 1$. It is no more necessary to use Equations (32) and (33).

Figure 24:
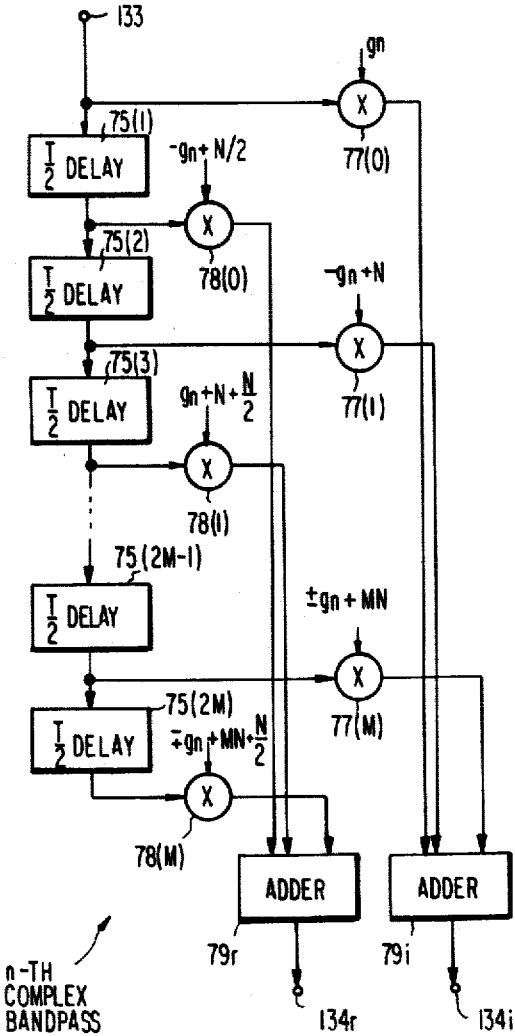
FIG. 24, illustrated on the right side of FIG. 10, is a block diagram of a slow complex band-pass filter that may be used in the receiver depicted in FIG. 23.
Figure 23:
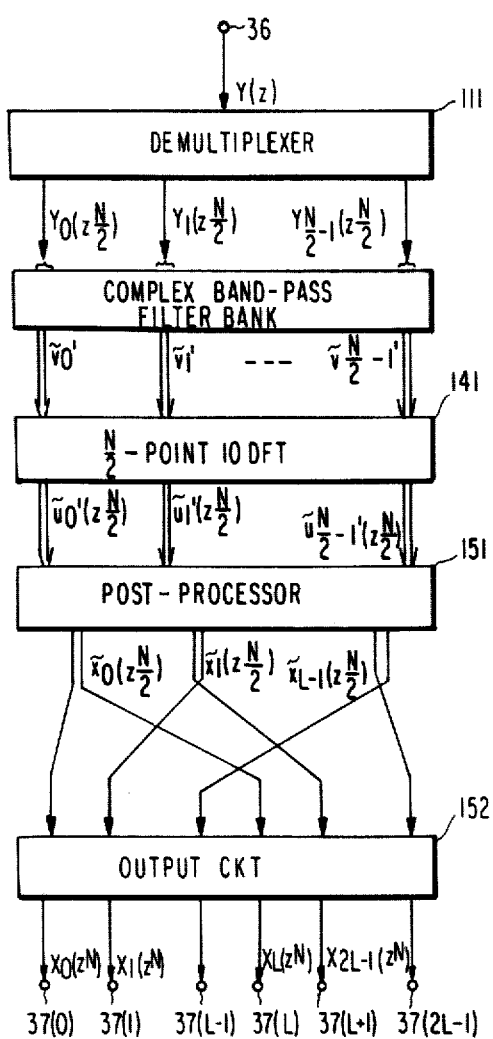
FIG. 23 is a block diagram of a converter according to a sixth embodiment of this invention, which converter is operable again as a receiver.

Referring to FIG. 23, a converter according to a sixth embodiment of this invention is for use as a receiver for carrying out the basic principles when b=½. The receiver comprises similar parts designated by like reference numerals as in FIG. 16. In FIG. 24, the demultiplexed real sample sequences $Y_n(z^{N/2})$ are supplied directly to a single polyphase circuit 131, which produces zeroth through (N/2−1)-th filtered complex sample sequences $\tilde{v}_n$. A single IODFT processor 141 produces all N/2-point IODFT'ed complex sample sequences $\tilde{u}_k(z^{N/2})$ as the IODFT processed complex sample sequences, respectively.

Referring back to FIG. 19 for a short while, it should be pointed out that the single polyphase circuit 131 is responsive to the zeroth through the (N/2−1)-th demultiplexed real sample sequences for producing the filtered complex sample sequences $\tilde{v}_n$. The single polyphase circuit 131 therefore need not comprise the zeroth through the (N/2−1)-th polyphase circuit input terminals 133(0)i to 133(N/2−1)i for the input imaginary sample sequences. The real and the imaginary band-pass filters 136(0)i through 136(N/2−1)i and 137(0)i through 137(N/2−1)i are also unnecessary.

Turning to FIG. 24, the K-th complex band-pass filter pair 136(K)r and 137(K)r remaining in the polyphase circuit 131 depicted in FIG. 23 comprises a single filter input terminal 133 and first and second filter output terminals 134r and 134i. A single tapped delay circuit connected to the input terminal 133 has zeroth through (2M+1)-th taps, between which first through 2M-th T/2-second delay units 75(1) to 75(2M) may be inserted, respectively. Zeroth through M-th multipliers of a first set 77(0) to 77(M) are connected to the even numbered taps and multiply the even numbered ones of the demultiplexed and delayed real sample sequences by filter coefficients of a first group $g_n$, $-g_{n+N}$, ..., and $\pm g_{n+MN}$, respectively. Zeroth through M-th multipliers of a second group 78(0) to 78(M) are connected to the odd numbered taps and multiply odd numbered ones of the demultiplexed and delayed real sample sequences by filter coefficients of a second group $-g_{n+N/2}$, $g_{n+N+N/2}$, ..., and $\mp g_{n+MN+N/2}$, respectively. Products produced by the second-group multipliers 78(0) through 78(M) are supplied to a first (M+1)-input adder 79r, which supplies a first sum sample sequence to the first filter output terminal 134r as the real part of the K-th filtered complex sample sequence $\tilde{v}_K$. Products calculated by the first-group multipliers 77(0) through 77(M) are delivered to a second (M+1)-input adder 79i, which supplies the second output terminal 134i with a second sum sample sequence as the imaginary part of the K-th filtered complex sample sequence $\tilde{v}_K$.

As described in conjunction with a transmitter according to the third embodiment of this invention, it is possible to simplify the circuitry of FIG. 16 by substitution of a bank of slow real low-pass filters for the slow complex band-pass filter bank even when the fractional number b has a general value that is or is not equal to ½. For this purpose, new first-kind and second-kind IODFT'ed complex sample sequences are defined by:

$$\left.\begin{aligned}\tilde{u}_k'(z^{N/2}) &= \sum_{n=0}^{N/2-1} q_{N/2}^{kn} \cdot q_N^{n/2} \cdot \tilde{e}_n(z^{N/2}) \cdot G_n(z^{N/2}) \\ \text{and} \\ \tilde{u}_k''(z^{N/2}) &= \sum_{n=0}^{N/2-1} q_{N/2}^{kn} \cdot q_N^{n/2} \cdot \tilde{e}_n^*(-z^{N/2}) \cdot G_n(z^{N/2}),\end{aligned}\right\} \quad (36)$$

both for $0 \leq k \leq N/2 - 1$, where $e_n(z^{N/2})$ is defined afresh by:

$$e_n(z^{N/2}) = q_N^{(b-\frac{1}{2})n} \cdot Y_n(q_2^{-b} \cdot z^{N/2}), \quad (37)$$

and is again called pre-processed complex sample sequences of a first kind. Baseband complex PAM sample sequences, numbered (2k−a) for $0 \leq k \leq N/4 - 1$ and (N−2k−1−a) for $N/4 \leq k \leq N/2 - 1$, are related to the new IODFT'ed complex sample sequences according to:

$$\left.\begin{aligned}\tilde{x}_{2k-a}(z^{N/2}) &= \tilde{u}_k'(z^{N/2})|_{k=0}^{N/4-1} \\ \text{and} \\ \tilde{x}_{N-2k-1-a}^*(z^{N/2}) &= \tilde{u}_k''(z^{N/2})|_{k=N/4}^{N/2-1}.\end{aligned}\right\} \quad (38)$$

The reproduced complex PAM sample sequences are obtained as:

$$\left.\begin{aligned}\tilde{x}_{2k-a}(z^{N/2}) &= \tilde{u}_k'(z^{N/2})|_{k=0}^{N/4-1} \\ \text{and} \\ \tilde{x}_{2k-1-a}(z^{N/2}) &= \tilde{u}_{N/2-k}''^*(z^{N/2})|_{k=0}^{N/4-1}.\end{aligned}\right\} \quad (39)$$

where $x_{2k-a}$ and $x_{2k-1-a}$ are complex dummy signals, (N/2−L) in number, unless (2k−a) and (2k−1−a) represent 0, 1, ..., and L−1.

In each of Equations (36), $G_n(z^{N/2})$ represents a bank of slow real low-pass FIR digital filters as described in connection with Equations (28) through (30) and others. Equations (36) through (39) therefore indicate the following facts. The reproduced complex PAM sample sequences $\tilde{x}_{2k-a}(z^{N/2})$ for $0 \leq k \leq N/4 - 1$ are given from former half N/4-point output data of the first-kind IODFT'ed complex sample sequences $u_k'(z^{N/2})$ that, in turn, are obtained by N/2-point IODFT processing a set of N/2-point input data derived by causing the first-kind pre-processed complex sample sequences $\tilde{e}_n(z^{N/2})$ to pass through a first bank of slow real low-pass filters $G_n(z^{N/2})$, respectively. The reproduced complex PAM sample sequences $\tilde{x}_{2k-1-a}(z^{N/2})$, again for $0 \leq k \leq N/4 - 1$, are obtained from latter half N/4-point output data of the second-kind IODFT'ed complex sample sequences $\tilde{u}_k''(z^{N/2})$ or $\tilde{u}_{N/2-k}(z^{N/2})$ that, in turn, are given when another set of N/2-point input data derived from pre-processed complex sample sequences of a second kind $\tilde{e}_n^x(-z^{N/2})$ are caused to pass through a second bank of slow real low-pass filters $G_n(z^{N/2})$, respectively. Filtered complex sample sequences produced by the first and the second banks will again be designated by $\tilde{v}_n'$ and $\tilde{v}_n''$, respectively.

Figure 25:
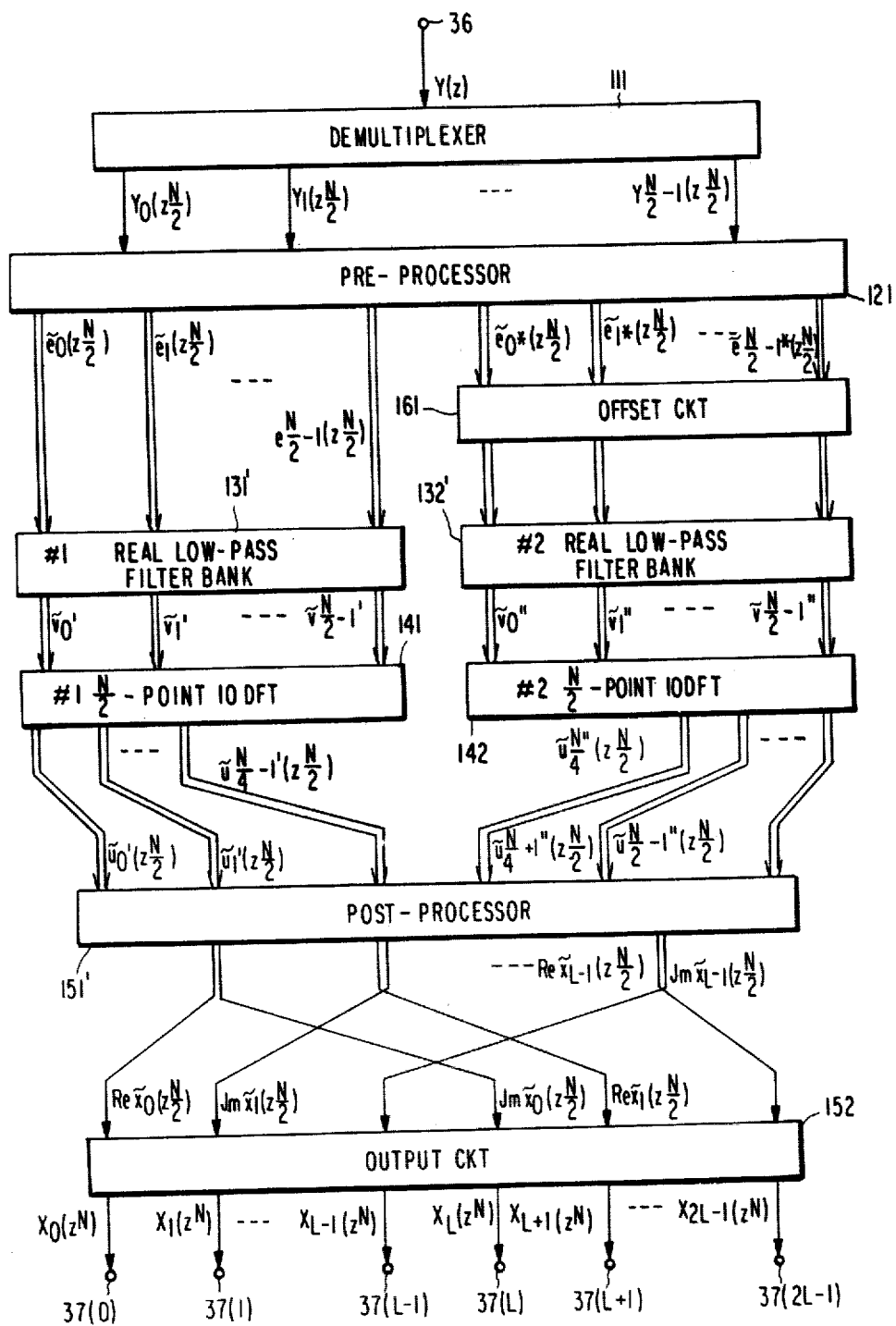
FIG. 25 is a block diagram of a converter according to a seventh embodiment of this invention, which converter serves also as a receiver.

Referring now to FIG. 25, a converter according to a seventh embodiment of this invention is for use as a receiver for carrying out the principles of this invention by the use of slow real low-pass filters and comprises similar parts designated by like reference numerals as in FIG. 16. The pre-processor 121 subjects the demultiplexed real sample sequences $Y_n(z^{N/2})$ defined by Equations (22) and (27) to a common frequency shift of $q2^{-b}$ and to multiplication by complex factors $q_N^{(b-\frac{1}{2})n}$, respectively, to produce pre-processed complex sample sequences of a first kind $\tilde{e}_n(z^{N/2})$ according to Equation (37). The pre-processor 121 produces also conjugate complex pre-processed sample sequences $e_n^x(z^{N/2})$. An offset circuit 161 is for giving a common frequency offset or shift of $q2^{-1}$ to the conjugate complex pre-processed sample sequences to provide pre-processed complex sample sequences of a second kind or conjugate complex pre-processed and frequency offset sample sequences $\tilde{e}_n^x(-z^{N/2})$. The demultiplexing circuit 111 and the pre-processor 121 may be of the structure illustrated with reference to FIGS. 17 and 18.

It is possible to deem the pre-processor 121 and the offset circuit 161 to be a pre-processing circuit for digitally converting the demultiplexed real sample sequences to pre-processed complex sample sequences of first and second kinds, N in number in total.

Figure 26:
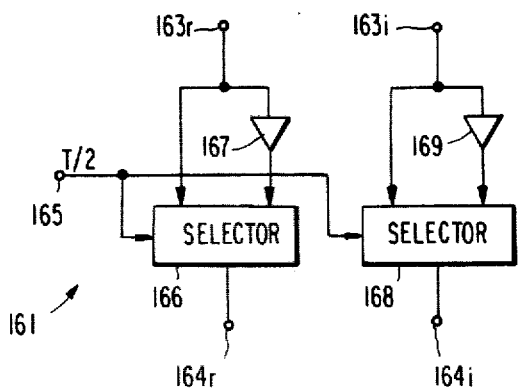
FIG. 26, shown below FIG. 12 together with FIG. 22, is a block diagram of a circuit unit of an offset circuit for use in the receiver shown in FIG. 25.

Referring temporarily to FIG. 26, a K-th offset circuit unit (K being only one of n, namely, 0 through N/2−1) of the offset circuit 161 comprises first and second offset circuit unit input terminals 163r and 163i and first and second offset circuit unit output terminals 164r and 164i that serve as a K-th offset circuit input terminal pair and a K-th offset circuit output terminal pair, respectively. Real and imaginary parts of a K-th conjugate complex pre-processed sample sequence $\tilde{e}_K^x(z^{N/2})$ are supplied to the first and the second input terminals 163r and 163i, respectively. T/2-second control clocks are supplied to a control input terminal 165. A first selector 166 has a first and a second selector input terminal connected to the first input terminal 163r directly and through an inverter 167, respectively, and is controlled by the control clocks to alternatingly deliver the signals supplied to the first and the second selector input terminals to the first output terminal 164r as the real part of the K-th second-kind pre-processed complex sample sequence $e_K^x(-z^{N/2})$. Similarly, a second selector 168 has a pair of inputs connected to the second input terminal 163i directly and through another inverter 169 and is controlled also by the control clocks to supply the second output terminal 164i with the imaginary port of the K-th second-kind pre-processed complex sample sequence.

Turning back to FIG. 25, each polyphase circuit 131' or 132' comprises a bank of slow real low-pass FIR digital filters $G_n(z^{N/2})$. The N/2-point IODFT processors 141 and 142 carry out N/2-point IODFT processing in compliance with Equations (36). The polyphase circuits 131' and 132' and the IODFT processors 141 and 142 may be of the structure described with reference to FIGS. 11 and 12.

In FIG. 25, the post-processor 151' digitally converts the IODFT processed complex sample sequences, N/2 in number, to reproduced complex PAM sample sequences plus complex dummy signals according to Equations (39). More particularly, the post-processor 151' selects the (2k−a)-th reproduced complex PAM sample sequences $x_{2k-a}(z^{N/2})$ from the zeroth through the N/4−1)-th ones of the first-kind IODFT'ed complex sample sequences $\tilde{u}_k'(z^{N/2})$. The (2k−1−a)-th reproduced complex PAM sample sequences $\tilde{x}_{2k-1-a}(z^{N/2})$ are produced by selection from the N/4-th through the (N/2−1)-th ones of the second-kind IODFT'ed complex sample sequences $\tilde{u}_k''(z^{N/2})$ and by subsequent calculation of conjugate complex sample sequences of the selected complex sample sequences. The output circuit 152 is not different in structure and operation from that described in connection with FIG. 16.

Figure 27:
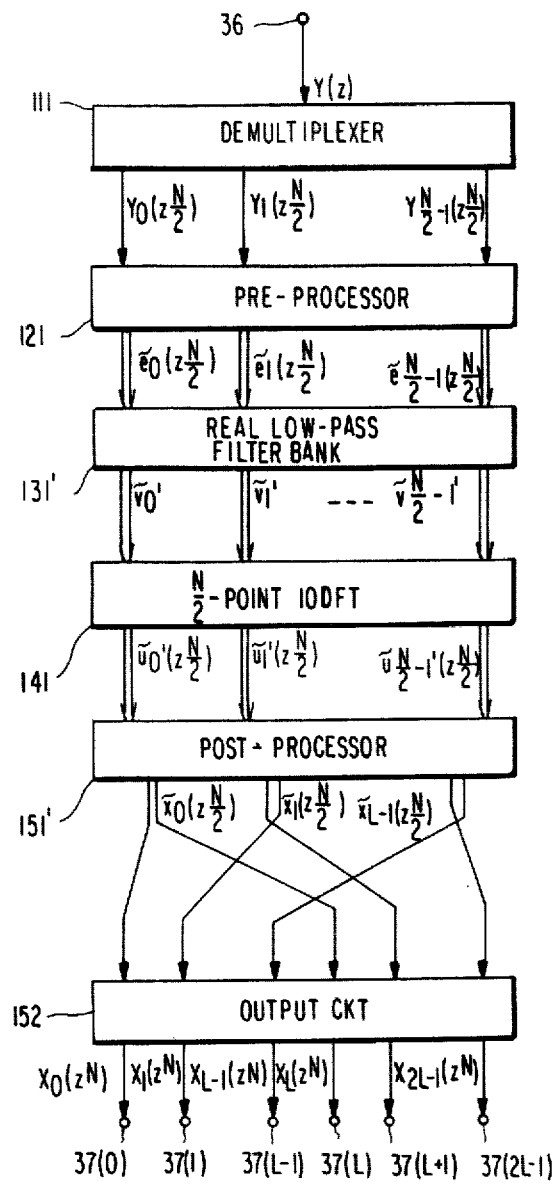
FIG. 27, drawn on the right side of FIG. 23, is a block diagram of a converter according to an eighth embodiment of this invention, which is for use again as a receiver.

Referring finally to FIG. 27, a converter according to an eighth embodiment of this invention serves as a receiver for implementing the principles of this invention with a single bank of slow real low-pass filters when it is possible to select $\frac{1}{2}$ as the fractional number b. The receiver comprises similar parts designated by like reference numerals as in FIG. 25. The second-kind pre-processed complex sample sequences and accordingly the conjugate complex pre-processed sample sequences are unnecessary. All N/2-point IODFT'ed complex sample sequences $\tilde{u}_k'(z^{N/2})$ produced by the single N/2-point IODFT processor 141 are used in digitally producing the reproduced real PAM sample sequences. Equations (36) and (37) are unified into:

$$\tilde{u}_k'(z^{N/2}) = \sum_{n=0}^{N/2-1} q_{N/2}^{kn} \cdot q_N^{n/2} \cdot Y_n(-jz^{N/2}) \cdot G_n(z^{N/2}),$$

for $0 \leq k \leq N/2 - 1$. It is possible to simplify the pre-processor 121 by using the circuit unit illustrated with reference to FIG. 12 or 13.

The offset DFT processors (61 and 62 or 61 alone) used in the transmitters and the IODFT processors (141 and 142 or 141 alone) used in the receivers are equivalent to one another. This is because the input and the output data of an IODFT processor are the conjugate complex input and output data of an offset DFT processor. It is also possible to substitute an offset DFT processor and an IODFT processor for each other by reversing the order of the post-processor real output sample sequences to be time-division multiplexed in the multiplexer 82 and/or the order of the demultiplexed real sample sequences into which the input real QAM sample sequence is decomposed by the demultiplexer 111, with time sequences of the impulse responses of the slow FIR digital filters of each bank reversed in the polyphase circuit 71, 72, 71', 72', 131, 132, 131', or 132'. The 1ODFT processor will therefore be referred to as an offset DFT processor in the following.

Complex signals may either be real or purely imaginary signals as would have been understood from the numerical examples given in connection with the transmitter according to the first embodiment of this invention. It is therefore possible to count real signals and the imaginary signals to be paired with the real signals as complex signals, reduced to a half in number.

Reviewing the transmitters and the receivers illustrated with reference to FIGS. 2, 8, 9, 15, 16, 23, 25, and 27, it is now understood that parts and signals resorted to in a transmitter correspond to those used in a receiver when the transmitter is followed from the input terminals to the output terminal and the receiver, from the output terminals back to the input terminal, or vice versa. For example, the input data of the offset DFT processor or processors used in the transmitter correspond to the output data of the offset DFT processor or processors in the receiver and may be named first-type complex digital signal sequences, although the input data are either N or N/2 in number and the output data, always N/2 in number. The output data of the offset DFT processor or processors in the transmitter correspond to the input data of the offset DFT processor or processors in the receiver and may be referred to as second-type complex digital signal sequences. In either case, the number is either N or N/2. The filtered signals used in the transmitter correspond to the filter input signals in the receiver and may be called third-type complex digital signal sequences, although the filtered signals are always N/2 in number and the filter input signals, either N or N/2 in number. The number of second-type complex digital signal sequences is equal to that of first-type complex digital signal sequences in the transmitter and to that of third-type complex digital signal sequences in the receiver. The inequality in number between the first-type complex digital signal sequences in the transmitter and receiver, the similar inequality in number between the third-type complex digital signal sequences, and the difference between the first-type and the third-type complex digital signal sequences as regards the number of second-type complex digital signal sequences, would not adversely affect the correspondence.

While transmitters and receivers according to several embodiments of this invention have thus far been described, it will now be readily feasible for those skilled in the art to carry this invention into effect in various other ways. For instance, each of the functional blocks, depicted as rectangular boxes in the last-referenced drawing figures, may be put into operation in series in a time-division fashion as regards the signals thereby dealt with, rather than in parallel as described hereinabove. An FFT processor for the series operation may be a pipeline FFT processor described, for example, in a book authored by Abraham Peled and Bede Liu under the title of "Digital Signal Processing" and published 1976 by John Wiley & Sons, New York, U.S.A., with reference to FIG. 3.7 (page 156). When series signal processing is resorted to, it is possible to make a transmitter and a receiver comprise a functional block in common, provided that the functional block carries out similar operation both in the transmitter and the receiver as is the case with the offset DFT processor or the polyphase circuit. Even with the parallel signal processing, it is possible to make the first and the second offset DFT processors employ the DFT processor 66 or 146 in common. Furthermore, it is possible to combine some of the functional blocks into a single functional block. Use of the DFT processor revealed in the Nishitani et al Patent referred to heretobefore, makes this invention applicable even to a case in which the even number N is not an integral multiple of four.

What is claimed is:

1. A converter for digitally carrying out conversion between a plurality of baseband real PAM digital signal sequences, 2L in number, having a slow sampling rate of 1/T hertzes and synchronized with one another and an orthogonally multiplexed real QAM digital signal sequence of a fast sampling rate of N/T hertzes, where N represents an even integer that is not less than 2L, said converter being operable as a predetermined one of a transmitter for converting said real PAM digital signal sequences to said real QAM digital signal sequence and a receiver for converting said real QAM digital signal sequence to said real PAM digital signal sequences and comprising:

first means for digitally carrying out conversion between said real PAM digital signal sequences and a plurality of first-type complex digital signal sequences of twice said slow sampling rate, equal in number to a predetermined one of N and N/2 and to N/2 when said converter is operable as said transmitter and said receiver, respectively;

N/2-point offset discrete Fourier transform processing means for subjecting prescribed ones of said first-type complex digital signal sequences and a plurality of second-type complex digital signal sequences of twice said slow sampling rate, equal in number to a prescribed one of N and N/2, to N/2-point offset discrete Fourier transform processing at a period of T/2 second to produce said second-type and said first-type complex digital signal sequences when said converter is operable as said transmitter and said receiver, respectively;

filter means comprising a plurality of digital filter units, equal in number to said prescribed one of N and N/2, said digital filter units being operable at twice said slow sampling rate and having a prescribed effective bandwidth and linear phase slopes stepwise different from one another among a bank of the digital filter units, N/2 in number, for carrying out band limitation on preselected ones of said second-type complex digital signal sequences and a plurality of third-type complex digital signal sequences of twice said slow sampling rate, respectively, said third-type complex digital signal sequences being equal in number to N/2 and to said predetermined one of N and N/2 when said converter is operable as said transmitter and said receiver, respectively, said filter means thereby producing said third-type and said second-type complex digital signal sequences when said converter is operable as said transmitter and said receiver, respectively; and second means for digitally carrying out conversion between said third-type complex digital signal sequences and said real QAM digital signal sequence.

2. A converter as claimed in claim 1 and operable as said transmitter, wherein:

said first means comprises pre-processing means for digitally converting said real PAM digital signal sequences to pre-processing means output complex digital signal sequences of twice said slow sampling rate, equal in number to said prescribed one of N and N/2, said pre-processing means output complex digital signal sequences serving as said first-type complex digital signal sequences, respectively;

said offset discrete Fourier transform processing means subjecting said pre-processing means output complex digital signal sequences to said N/2-point offset discrete Fourier transform processing to produce at least one set of N/2-point offset discrete Fourier transform processed complex digital signal sequences that serve as said second-type complex digital signal sequences, respectively;

the digital filter units of said filter means carrying out band limitation on said offset discrete Fourier transform processed complex digital signal sequences to produce filter unit output complex digital signal sequences, respectively, said filter means comprising filter output means responsive to said filter unit output complex digital signal sequences for producing filter means output complex digital signal sequences of twice said slow sampling rate, N/2 in number, said filter means output complex digital signal sequences serving as said third-type complex digital signal sequences, respectively;

said second means digitally converting said filter means output complex digital signal sequences to said real QAM digital signal sequence.

3. A converter as claimed in claim 2, said prescribed one of N and N/2 being N, wherein:

said pre-processing means comprises a pre-processing circuit for digitally converting said real PAM digital signal sequences to pre-processed complex digital signal sequences of a first kind of twice said slow sampling rate, N/2 in number, and also to pre-processed complex digital signal sequences of a second kind of twice said slow sampling rate, again N/2 in number, said first-kind and said second-kind pre-processed complex digital signal sequences serving in combination as said pre-processing means output complex digital signal sequences;

said offset discrete Fourier transform processing means comprising a first N/2-point offset discrete Fourier transform processor for subjecting said first-kind pre-processed complex digital signal sequences to said N/2-point offset discrete Fourier transform processing to produce offset discrete Fourier transformed complex digital signal sequences of a first kind, N/2 in number, and a second N/2-point offset discrete Fourier transform processor for subjecting said second-kind pre-processed complex digital signal sequences also to said N/2-point offset discrete Fourier transform processing to produce offset discrete Fourier transformed complex digital signal sequences of a second kind, again N/2 in number, said first-kind and said second-kind offset discrete Fourier transformed complex digital signal sequences serving in combination as two sets of said N/2-point offset discrete Fourier transform processed complex digital signal sequences;

the digital filter units of said filter means comprising a first bank of complex band-pass digital filter units, N/2 in number, operable at twice said slow sampling rate and having an effective bandwidth of 1/T hertzes and said phase slopes for carrying out band limitation on said first-kind offset discrete Fourier transformed complex digital signal sequences to produce filtered complex digital signal sequences of a first kind, respectively, and a second bank of complex band-pass digital filter units, again N/2 in number, operable also at twice said slow sampling rate and having said 1/T-hertz effective bandwidth and said phase slopes for carrying out band limitation on said second-kind offset discrete Fourier transformed complex digital signal sequences to produce filtered complex digital signal sequences of a second kind, respectively, said filter output means being responsive to said first-kind and said second-kind filtered complex digital signal sequences for producing real parts of said first-kind filtered complex digital signal sequences and imaginary parts of said second-kind filtered complex digital signal sequences as real and imaginary parts of said filter means output complex digital signal sequences, respectively;

said second means comprising a post-processing circuit for digitally converting said real parts of first-kind filtered complex digital signal sequences and said imaginary parts of second-kind filtered complex digital signal sequences to said real QAM digital signal sequence.

4. A converter as claimed in claim 3, wherein said post-processing circuit comprises:

a post-processor for subjecting said real parts of first-kind filtered complex digital signal sequences and said imaginary parts of second-kind filtered complex digital signal sequences to a predetermined frequency shift to produce post-processed complex digital signal sequences, N/2 in number; and a time-division multiplexing circuit for time-division multiplexing real parts of said post-processed complex digital signal sequences into said real QAM digital signal sequence.

5. A converter as claimed in claims 3 or 4, wherein said pre-processing circuit comprises:

a pre-processor for digitally converting said real PAM digital signal sequences to pre-processor output complex digital signal sequences of a first kind of twice said slow sampling rate, L in number, and also to pre-processor output complex digital signal sequences of a second kind of twice said slow sampling rate, again L in number; and means for digitally producing complex dummy signals, (N/2-L) in number;

said first-kind pre-processor output complex digital signal sequences and said complex dummy signals serving in combination as said first-kind pre-processed complex digital signal sequences, said second-kind pre-processor output complex digital signal sequences and said complex dummy signals serving in combination as said second-kind pre-processed complex digital signal sequences.

6. A converter as claimed in claim 2, said prescribed one of N and N/2 being N/2, wherein:

said pre-processing means comprises a pre-processor for digitally converting said real PAM digital signal sequences to pre-processed complex digital signal sequences of twice said slow sampling rate, L in number, and means for digitally producing complex dummy signals, (N/2-L) in number, said pre-processed complex digital signal sequences and said complex dummy signals serving in combination as said pre-processing means output complex digital signal sequences;

said offset discrete Fourier transform processing means comprising an N/2-point offset discrete Fourier transform processor for subjecting said pre-processing means output complex digital signal sequences to said N/2-point offset discrete Fourier transform processing to produce N/2-point offset discrete Fourier transformed complex digital signal sequences as the respective offset discrete Fourier transform processed complex digital signal sequences of a single set;

the digital filter units of said filter means comprising a single bank of complex band-pass digital filter units, N/2 in number, operable at twice said slow sampling rate and having an effective bandwidth of 1/T hertzes and said phase slopes for carrying out band limitation on said offset discrete Fourier transformed complex digital signal sequences to produce filtered complex digital signal sequences, respectively, said filter output means being responsive to said filtered complex digital signal sequences for producing real parts of said filtered complex digital signal sequences as real parts of said filter means output complex digital signal sequences, respectively;

said second means comprising a time-division multiplexing circuit for time-division multiplexing said real parts of filtered complex digital signal sequences into said real QAM digital signal sequence.

7. A converter as claimed in claim 2, said prescribed one of N and N/2 being N, wherein:

said pre-processing means comprises a pre-processing circuit for digitally converting said real PAM digital signal sequences to pre-processed complex digital signal sequences of a first kind of twice said slow sampling rate, N/2 in number, and also to pre-processed complex digital signal sequences of a second kind of twice said slow sampling rate, again N/2 in number, said first-kind and said second-kind pre-processed complex digital signal sequences serving in combination as said pre-processing means output complex digital signal sequences;

said offset discrete Fourier transform processing means comprising a first N/2-point offset discrete Fourier transform processor for subjecting said first-kind pre-processed complex digital signal sequences to said N/2-point offset discrete Fourier transform processing to produce offset discrete Fourier transformed complex digital signal sequences of a first kind, N/2 in number, and a second N/2-point offset discrete Fourier transform processor for subjecting said second-kind pre-processed complex digital signal sequences also to said N/2-point offset discrete Fourier transform processing to produce offset discrete Fourier transformed complex digital signal sequences of a second kind, again N/2 in number, said first-kind and said second-kind offset discrete Fourier transformed complex digital signal sequences serving in combination as two sets of said offset discrete Fourier transform processed complex digital signal sequences;

the digital filter units of said filter means comprising a first bank of real low-pass digital filter units, N/2 in number, operable at twice said slow sampling rate and having an effective bandwidth of 1/(2T) hertzes and said phase slopes for carrying out band limitation on said first-kind offset discrete Fourier transformed complex digital signal sequences to produce filtered complex digital signal sequences of a first kind, respectively, and a second bank of real low-pass digital filter units, again N/2 in number, operable also at twice said slow sampling rate and having said 1/(2T)-hertz effective bandwidth and said phase slopes for carrying out band limitation on said second-kind offset discrete Fourier transformed complex digital signal sequences to produce filtered complex digital signal sequences of a second kind, respectively; said filter output means comprising a first offset circuit for subjecting said first-kind filtered complex digital signal sequences to a prescribed frequency offset to produce real parts of filtered and frequency offset complex digital signal sequences of a first kind, respectively, and a second offset circuit for subjecting said second-kind filtered complex digital signal sequences to said prescribed frequency offset to produce imaginary parts of filtered and frequency offset complex digital signal sequences of a second kind, respectively; said real parts of first-kind filtered and frequency offset complex digital signal sequences and said imaginary parts of second-kind filtered and frequency offset complex digital signal sequences serving as real and imaginary parts of said filter means output complex digital signal sequences, respectively;

said second means comprising a post-processing circuit for digitally converting said real parts of first-kind filtered and frequency offset complex digital signal sequences and said imaginary parts of second-kind filtered and frequency offset complex digital signal sequences to said real QAM digital signal sequence.

8. A converter as claimed in claim 7, wherein said post-processing circuit comprises:

a post-processor for subjecting said real parts of first-kind filtered and frequency offset complex digital signal sequences and said imaginary parts of filtered and frequency offset complex digital signal sequences to a predetermined frequency shift to produce post-processed complex digital signal sequences, N/2 in number; and a time-division multiplexing circuit for time-division multiplexing real parts of said post-processed complex digital signal sequences into said real QAM digital signal sequence.

9. A converter as claimed in claims 7 or 8, wherein said pre-processing circuit comprises:

a pre-processor for digitally converting said real PAM digital signal sequences to pre-processor output complex digital signal sequences of a first kind of twice said slow sampling rate, L in number, and also to pre-processor output complex digital signal sequences of a second kind of twice said slow sampling rate, again L in number; and means for digitally producing complex dummy signals, (N/2 − L) in number;

said first-kind pre-processor output complex digital signal sequences and said complex dummy signals serving in combination as said first-kind pre-processed complex digital signal sequences, said second-kind pre-processor output complex digital signal sequences and said complex dummy signals serving in combination as said second-kind pre-processed complex digital signal sequences.

10. A converter as claimed in claim 2, said prescribed one of N and N/2 being N/2, wherein:

said pre-processing means comprises a pre-processor for digitally converting said real PAM digital signal sequences to pre-processed complex digital signal sequences of twice said slow sampling rate, L in number, and means for digitally producing complex dummy signals, (N/2−L) in number, said pre-processed complex digital signal sequences and said complex dummy signals serving in combination as said pre-processing means output complex digital signal sequences;

said offset discrete Fourier transform processing means comprising an N/2-point offset discrete Fourier transform processor for subjecting said pre-processing means output complex digital signal sequences to said N/2-point offset discrete Fourier transform processing to produce N/2-point offset discrete Fourier transformed complex digital signal sequences as the respective offset discrete Fourier transform processed complex digital signal sequences of a single set;

the digital filter units of said filter means comprising a single bank of real low-pass digital filter units, N/2 in number, operable at twice said slow sampling rate and having an effective bandwidth of 1/(2T) hertzes and said phase slopes for carrying out band limitation on said offset discrete Fourier transformed complex digital signal sequences to produce filtered complex digital signal sequences, respectively; said filter output means comprising an offset circuit for subjecting said filtered complex digital signal sequences to a prescribed frequency offset to produce real parts of filtered and frequency offset complex digital signal sequences as said filter means output complex digital signal sequences, respectively, said second means comprising a time-division multiplexing circuit for time-division multiplexing said real parts of filtered and frequency offset complex digital signal sequences into said real QAM digital signal sequence.

11. A converter as claimed in claim 1 and operable as said receiver, wherein:

said second means comprises pre-processing means for digitally converting said real QAM digital signal sequence to pre-processing means output complex digital signal sequences of twice said slow sampling rate, equal in number to said prescribed one of N and N/2, said pre-processing means output complex digital signal sequences serving as said third-type complex digital signal sequences, respectively;

the digital filter units of said filter means carrying out band limitation on said pre-processing means output complex digital signal sequences to produce filter means output complex digital signal sequences, respectively, said filter means thereby producing said filter means output complex digital signal sequences as said second-type complex digital signal sequences, respectively;

said offset discrete Fourier transform processing means comprising offset discrete Fourier transform processor means for subjecting said filter means output complex digital signal sequences to said N/2-point offset discrete Fourier transform processing to produce at least one set of N/2-point offset discrete Fourier transform processed complex digital signal sequences and processor output means responsive to said offset discrete Fourier transform processed complex digital signal sequences for producing a single set of offset discrete Fourier transform processed complex digital signal sequences, N/2 in number, that serve as said first-type complex digital signal sequences, respectively;

said first means digitally converting said single-set offset discrete Fourier transform processed complex digital signal sequences to said real PM digital signal sequences.

12. A converter as claimed in claim 11, said prescribed one of N and N/2 being N, wherein:

said pre-processing means comprises a demultiplexing circuit for demultiplexing said real QAM digital signal sequence into a plurality of demultiplexed real digital signal sequences of twice said slow sampling rate, N/2 in number, and a pre-processing circuit for digitally converting said demultiplexed real digital signal sequences to pre-processed complex digital signal sequences of a first kind of twice said slow sampling rate, N/2 in number, and also to pre-processed complex digital signal sequences of a second kind of twice said slow sampling rate, again N/2 in number, said first-kind and said second-kind pre-processed complex digital signal sequences serving in combination as said pre-processing means output complex digital signal sequences;

the digital filter units of said filter means comprising a first bank of complex band-pass digital filter units, N/2 in number, operable at twice said slow sampling rate and having an effective bandwidth of 1/T hertzes and said phase slopes for carrying out band limitation on said first-kind pre-processed complex digital signal sequences to produce filtered complex digital signal sequences of a first kind, respectively, and a second bank of complex band-pass digital filter units, again N/2 in number, operable also at twice said slow sampling rate and having said 1/T-hertz effective bandwidth and said phase slopes for carrying out band limitation on said second-kind pre-processed complex digital signal sequences to produce filtered complex digital signal sequences of a second kind, respectively, said first-kind and said second-kind filtered complex digital signal sequences serving in combination as said filter means output complex digital signal sequences;

said offset discrete Fourier transform processor means comprising a first N/2-point offset discrete Fourier transform processor for subjecting said first-kind filtered complex digital signal sequences to said N/2-point offset discrete Fourier transform processing to produce offset discrete Fourier transformed complex digital signal sequences of a first kind, N/2 in number, and a second N/2-point offset discrete Fourier transform processor for subjecting said second-kind filtered complex digital signal sequences to said N/2-point offset discrete Fourier transform processing to produce offset discrete Fourier transformed complex digital signal sequences of a second kind, again N/2 in number; said second-kind offset discrete Fourier transformed complex digital signal sequences corresponding to said first-kind offset discrete Fourier transformed complex digital signal sequences, respectively; said processor output means being responsive to said first-kind and said second-kind offset discrete Fourier transformed complex digital signal sequences for producing, as said single-set offset discrete Fourier transform processed complex digital signal sequences, predetermined ones, substantially equal in number to a half of N/2, of said first-kind offset discrete Fourier transformed complex digital signal sequences and those of said second-kind offset discrete Fourier transformed complex digital signal sequences which correspond to the first-kind offset discrete Fourier transformed complex digital signal sequences except said predetermined first-kind offset discrete Fourier transformed complex digital signal sequences, respectively;

said first means comprising a post-processing circuit for digitally converting the last-mentioned single-set offset discrete Fourier transform processed complex digital signal sequences to baseband complex PAM digital signal sequences, L in number, and also to complex dummy signals, (N/2−L) in number, and an output circuit for converting said baseband complex PAM digital signal sequences to said baseband real PAM digital signal sequences.

13. A converter as claimed in claim 12, wherein said pre-processing circuit comprises means for digitally converting said demultiplexed real digital signal sequences to said first-kind pre-processed complex digital signal sequences and means for digitally converting the last-mentioned first-kind pre-processed complex digital signal sequences to conjugate complex digital signal sequences thereof, respectively, said conjugate complex digital signal sequences serving as said second-kind pre-processed complex digital signal sequences, respectively.

14. A converter as claimed in claim 11, said prescribed one of N and N/2 being N/2, wherein:

said pre-processing means comprises a demultiplexing circuit for demultiplexing said real QAM digital signal sequence into a plurality of demultiplexed real digital signal sequences of twice said slow sampling rate, N/2 in number, said demultiplexed real digital signal sequences serving as said pre-processing means output complex digital signal sequences, respectively;

the digital filter units of said filter means comprising a single bank of complex band-pass digital filter units, N/2 in number, operable at twice said slow sampling rate and having an effective bandwidth of 1/T hertzes and said phase slopes for carrying out band limitation on said demultiplexed real digital signal sequences to produce filtered complex digital signal sequences, respectively, said filtered complex digital signal sequences serving as said filter means output complex digital signal sequences, respectively;

said offset discrete Fourier transform processor means comprising an N/2-point offset discrete Fourier transform processor for subjecting said filtered complex digital signal sequences to said N/2-point offset discrete Fourier transform processing to produce a signal set of N/2-point offset discrete Fourier transformed complex digital signal sequences, said processor output means producing said single-set offset discrete Fourier transformed complex digital signal sequences as said single-set offset discrete Fourier transform processed complex digital signal sequences, respectively;

said first means comprising a post-processing circuit for digitally converting said single-set discrete Fourier transformed complex digital signal sequences to baseband complex PAM digital signal sequences, L in number, and also to complex dummy signals, (N/2−L) in number, and an output circuit for converting said baseband complex PAM digital signal sequences to said baseband real PAM digital signal sequences.

15. A converter as claimed in claim 11, said prescribed one of N and N/2 being N, wherein:

said pre-processing means comprises a demultiplexing circuit for demultiplexing said real QAM digital signal sequence into a plurality of demultiplexed real digital signal sequences of twice said slow sampling rate, N/2 in number, and a pre-processing circuit for digitally converting said demultiplexed real digital signal sequences to pre-processed complex digital signal sequences of a first kind of twice said slow sampling rate, N/2 in number, and also to pre-processed complex digital signal sequences of a second kind of twice said slow sampling rate, again N/2 in number, said first-kind and said second-kind pre-processed complex digital signal sequences serving in combination as said pre-processing means output complex digital signal sequences;

the digital filter units of said filter means comprising a first bank of real low-pass digital filter units, N/2 in number, operable at twice said slow sampling rate and having an effective bandwidth of 1/(2T) hertzes and said phase slopes for carrying out band limitation on said first-kind pre-processed complex digital signal sequences to produce filtered complex digital signal sequences of a first kind, respectively, and a second bank of real low-pass digital filter units, again N/2 in number, operable also at twice said slow sampling rate and having said 1/(2T)-hertz effective bandwidth and said phase slopes for carrying out band limitation on said second-kind pre-processed complex digital signal sequences to produce filtered complex digital signal sequences of a second kind, respectively, said first-kind and said second-kind filtered complex digital signal sequences serving in combination as said filter means output complex digital signal sequences;

said offset discrete Fourier transform processor means comprising a first N/2-point offset discrete Fourier transform processor for subjecting said first-kind filtered complex digital signal sequences to said N/2-point offset discrete Fourier transform processing to produce offset discrete Fourier transformed complex digital signal sequences of a first kind, N/2 in number, and a second N/2-point offset discrete Fourier transform processor for subjecting said second-kind filtered complex digital signal sequences to said N/2-point offset discrete Fourier transform processing to produce offset discrete Fourier transformed complex digital signal sequences of a second kind, again N/2 in number; said second-kind offset discrete Fourier transformed complex digital signal sequences corresponding to said first-kind offset discrete Fourier transformed complex digital signal sequences, respectively; said processor output means being responsive to said first-kind and said second-kind offset discrete Fourier transformed complex digital signal sequences for producing, as said single-set offset discrete Fourier transform processed complex digital signal sequences, predetermined ones, substantially equal in number to a half of N/2, of said first-kind offset discrete Fourier transformed complex digital signal sequences and those of said second-kind offset discrete Fourier transformed complex digital signal sequences which correspond to the first-kind offset discrete Fourier transformed complex digital signal sequences except said predetermined first-kind offset discrete Fourier transformed complex digital signal sequences, respectively;

said first means comprising a post-processing circuit for digitally converting said single-set offset discrete Fourier transformed complex digital signal sequences to baseband complex PAM digital signal sequences, L in number, and also to complex dummy signals, (N/2−L) in number, and an output circuit for converting said baseband complex PAM digital signal sequences to said baseband real PAM digital signal sequences.

16. A converter as claimed in claim 15, wherein said pro-processing circuit comprises means for digitally converting said demultiplexed real digital signal sequences to said first-kind pre-processed complex digital signal sequences and also to conjugate complex digital signal sequences of said first-kind pre-processed complex digital signal sequences and means for giving a common frequency shift of 1/T hertzes to said conjugate complex digital signal sequences to produce said second-kind pre-processed complex digital signal sequences.

17. A converter as claimed in claim 11, said prescribed one of N and N/2 being N/2, wherein:

said pre-processing means comprises a demultiplexing circuit for demultiplexing said real QAM digital signal sequence into a plurality of demultiplexed real digital signal sequences of twice said slow sampling rate, N/2 in number, and a pre-processor for giving a frequency offset of 1/T hertzes to said demultiplexed real digital signal sequences to produce pre-processed complex digital signal sequences of twice said slow sampling rate, N/2 in number, that serve as said pre-processing means output complex digital signal sequences, respectively;

the digital filter units of said filter means comprising a single bank of real low-pass filter units, N/2 in number, operable at twice said slow sampling rate and having an effective bandwidth of 1/(2T) hertzes and said phase slopes for carrying out band limitation on said pre-processed complex digital signal sequences to produce filtered complex digital signal sequences serving as said filter means output complex digital signal sequences, respectively;

said offset discrete Fourier transform processor means comprising an N/2-point offset discrete Fourier transform processor for subjecting said filtered complex digital signal sequences to said N/2-point offset discrete Fourier transform processing to produce a signal set of N/2-point offset discrete Fourier transformed complex digital signal sequences, said processor output means producing said N/2-point offset discrete Fourier transformed complex digital signal sequences as said single-set offset discrete Fourier transform processed complex digital signal sequences, respectively;

said first means comprising a post-processing circuit for digitally converting said single-set offset discrete Fourier transformed complex digital signal sequences to baseband complex PAM digital signal sequences, L in number, and also to complex dummy signals, (N/2−L) in number, and an output circuit for converting said baseband complex PAM digital signal sequences to said baseband real PAM digital signal sequences.

* * * * *